(12) United States Patent
Bolton et al.

(10) Patent No.: US 11,200,663 B1
(45) Date of Patent: Dec. 14, 2021

(54) METHOD AND SYSTEM FOR LAYERED WOOD PRODUCT PRODUCTION USING LOCAL ROBOTIC PANEL ASSEMBLY CELLS AND VISION SYSTEM ANALYSIS

(71) Applicant: Boise Cascade Company, Boise, ID (US)

(72) Inventors: David Bolton, Lena, LA (US); Jude Richard Peek, Pineville, LA (US); Curtis Fennell, Boyce, LA (US); Jason Matthew Coutee, Pineville, LA (US)

(73) Assignee: Boise Cascade Company, Boise, ID (US)

( * ) Notice: Subject to any disclaimer, the term of this patent is extended or adjusted under 35 U.S.C. 154(b) by 0 days.

(21) Appl. No.: 17/074,956

(22) Filed: Oct. 20, 2020

Related U.S. Application Data

(63) Continuation-in-part of application No. 16/205,027, filed on Nov. 29, 2018, now Pat. No. 10,825,164.

(Continued)

(51) Int. Cl.
*G06T 7/00* (2017.01)
*G06T 7/60* (2017.01)
(Continued)

(52) U.S. Cl.
CPC .......... *G06T 7/001* (2013.01); *B27D 1/04* (2013.01); *B27D 3/02* (2013.01); *G06T 7/60* (2013.01);
(Continued)

(58) Field of Classification Search
None
See application file for complete search history.

(56) References Cited

U.S. PATENT DOCUMENTS 3,566,937 A 3/1971 Erickson
3,606,942 A 9/1971 Daniels
(Continued)

FOREIGN PATENT DOCUMENTS

JP 2014205306 10/2014

OTHER PUBLICATIONS

Cognex Vision Software, "GigE Vision Cameras User's Guide," Published 2011.

(Continued)

*Primary Examiner* — Lindsay J Uhl
(74) *Attorney, Agent, or Firm* — Hawley Troxell Ennis & Hawley LLP; Philip McKay

(57) ABSTRACT

A method and system for production of layered wood products employs local and independently operating robotic panel assembly cells including a vison system for inspecting and grading veneer sheets, one or more veneer handling robots, one or more core handling robots, and one or more glue application robots to produce stacks of layered wood product panels locally near the pressing stations. Consequently, the stacks of layered wood product panels are independently built at, or near, the location of the pressing stations using inspected and graded veneer sheets. This eliminates the need for traditional panel conveyors, traditional layered wood product panel assembly layup lines, and stack press delivery lines. This, in turn, eliminates thousands of moving parts and dozens of people from the layered wood product production process.

16 Claims, 32 Drawing Sheets

Related U.S. Application Data

(60) Provisional application No. 62/595,489, filed on Dec. 6, 2017.

(51) Int. Cl.
*B27D 3/02* (2006.01)
*B27D 1/04* (2006.01)

(52) U.S. Cl.
CPC ...... *G06T 7/97* (2017.01); *G06T 2207/10024* (2013.01); *G06T 2207/20081* (2013.01); *G06T 2207/30161* (2013.01)

(56) References Cited

U.S. PATENT DOCUMENTS

| | | | |
|---|---|---|---|
| 5,892,808 | A | 4/1999 | Goulding et al. |
| 5,960,104 | A | 9/1999 | Conners et al. |
| 6,495,833 | B1 | 12/2002 | Alfano et al. |
| 9,164,029 | B2 | 10/2015 | Tsuchikawa et al. |
| 10,260,232 | B1 * | 4/2019 | Conboy .................. B27K 3/52 |
| 10,825,164 | B1 | 11/2020 | Bolton et al. |
| 10,933,556 | B2 | 3/2021 | Bolton et al. |
| 10,933,557 | B2 | 3/2021 | Bolton et al. |
| 2003/0042180 | A1 | 3/2003 | Kairi |
| 2004/0146615 | A1 | 7/2004 | McDonald et al. |
| 2005/0098728 | A1 | 5/2005 | Alfano et al. |
| 2005/0161118 | A1 | 7/2005 | Carman et al. |
| 2009/0279773 | A1 | 11/2009 | Gan et al. |
| 2010/0141754 | A1 * | 6/2010 | Hiraoka .................... G06T 7/90 348/93 |
| 2013/0333805 | A1 * | 12/2013 | Gagnon .................... B27L 1/08 144/341 |
| 2016/0067879 | A1 * | 3/2016 | Capps, Jr. ............. B65H 3/0833 156/64 |
| 2017/0023489 | A1 | 1/2017 | Iizuka et al. |
| 2020/0171695 | A1 | 6/2020 | Bolton et al. |
| 2020/0171696 | A1 | 6/2020 | Bolton et al. |
| 2020/0171697 | A1 | 6/2020 | Bolton et al. |
| 2020/0173914 | A1 | 6/2020 | Bolton et al. |
| 2020/0173915 | A1 | 6/2020 | Bolton et al. |
| 2020/0175670 | A1 | 6/2020 | Bolton et al. |
| 2020/0234427 | A1 | 7/2020 | Cui et al. |

OTHER PUBLICATIONS

Cognex, "Vision Controller Installation Manual," 2014.
Cognex, "Vision Product Guide," 2018.
USNR Transverse High Grader information sheet, copyright 2019; retrieved May 23, 2019 from https://www.usnr.com/en/product/THGLM.
USNR Lineal High Grader information sheet, copyright 2019; retrieved May 23, 2019 from https://www.usnr.com/en/product/LHGLM.
USNR LHG E-Valuator Module, copyright 2019; retrieved May 23, 2019 from https://www.usnr.com/en/product/LHGEValuatorLM.
USNR Planer/Dry Mill Optimization information sheet, copyright 2019; retrieved May 23, 2019 from https://www.usnr.com/en/product/mktoptplanermilllm.
Mecano Advantages information sheet, copyright 2019; retrieved May 23, 2019 from http://www.raute.com/mecano-advantages.
Mecano Solutions information sheet, copyright 2019; retrieved May 23, 2019 from http://www.raute.com/mecano-solutions.
Mecano Products information sheet, copyright 2019; retrieved May 23, 2019 from http://www.raute.com/264.
Drying Lines information sheets, copyright 2019; retrieved May 23, 2019 from http://www.raute.com/mecano-drying-lines?redirect=http%3A%2F%2Fwww.raute.com%2Flvl%3Fp_p_id%3%26p_plifecycle%3DO%26p_p_state% . . . .
Layup Lines information sheet, copyright 2019; retrieved May 23, 2019 from http://www.raute.com/mecano-layup-lines.
Veneer Handling Lines information sheet, copyright 2019; retrieved May 23, 2019 from http://www.raute.com/mecano-veneer-handling-lines.
Panel Handling Lines information sheet, copyright 2019; retrieved May 23, 2019 from http://www.raute.com/mecano-panel-handling-lines.
Peeling Lines information sheet, copyright 2019; retrieved May 23, 2019 from http://www.raute.com/268.
Smart Mill Concept information sheet, copyright 2019; retrieved May 23, 2019 from http://www.raute.com/smart-mill-concept.
Conners et al., "Machine vision technology for the forest products industry," 1997, IEEE, Computer, vol. 30, No. 7, pp. 43-48. (Year: 1997).
Nieminen et al., "Laser transillumination imaging for determining wood defects and grain angle," 2013, Measurement Science and Technology, vol. 24, No. 125401, 7 pages. (Year: 2013).
Colares et al., "Near infrared hyperspectral imaging and MCR-ALS applied for mapping chemical composition of the wood specie Swietenia Macrophylla King (Mahogany) at microscopic level," 2016, Microchemical Journal, vol. 124, pp. 356-363. (Year: 2016).
Tsuchikawa et al., "A review of recent application of near infrared spectroscopy to wood science and technology," 2015, Journal of Wood Science, vol. 61, pp. 213-220. (Year: 2015).

* cited by examiner

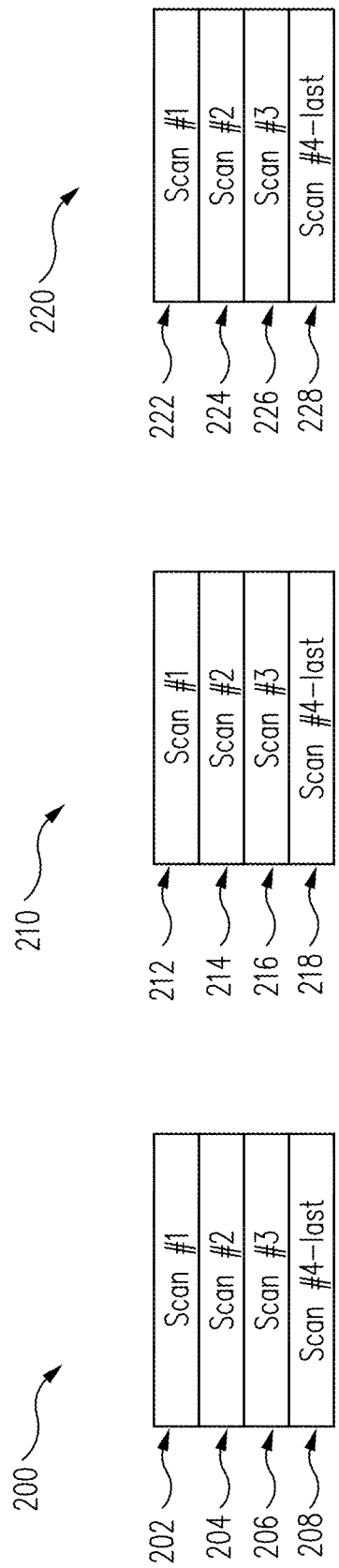

METHOD AND SYSTEM FOR LAYERED WOOD PRODUCT PRODUCTION USING LOCAL ROBOTIC PANEL ASSEMBLY CELLS AND VISION SYSTEM ANALYSIS

RELATED APPLICATIONS

This application is a continuation-in-part of Bolton et al., U.S. patent application Ser. No. 16/205,027, filed Nov. 29, 2018 and issuing Nov. 3, 2020 as U.S. Pat. No. 10,825,164, entitled "VISION SYSTEM FOR ANALYSIS OF WOOD PRODUCTS," which claims the benefit of David Bolton, U.S. Provisional Patent Application No. 62/595,489, filed on Dec. 6, 2017, entitled "VISION SYSTEM FOR ANALYSIS OF WOOD PRODUCTS," which is hereby incorporated by reference in its entirety as if it were fully set forth herein.

BACKGROUND

There are numerous classes and types of wood products currently used in a virtually limitless variety of construction and other applications. Wood product types include, but are not limited to: raw wood products such as logs, debarked blocks, green or dry veneer, and dimensional lumber; intermediate wood components, such as wood I-beam flanges and webs; and layered wood products such as laminated beams, plywood panels, Parallel Laminated Veneer (PLV) products and Laminated Veneer Lumber (LVL) products.

Layered wood products such as plywood, PLV, and LVL are composite products constructed in a factory from both natural wood and one or more chemically blended glues or resins. They are manufactured on a product assembly line and typically fabricated from multiple layers of thin wood, e.g., veneer sheets, assembled with one or more layers of adhesives bonding the sheets together. These layered wood products, sometimes referred to as "man-made" but more commonly referred to as "Engineered Wood," offer several advantages over typical milled lumber. For instance, since layered wood products are fabricated and assembled in a factory under controlled conditions to a set of specific product specifications, they can be stronger, straighter, and more uniform than traditional sawn lumber. In addition, due to their composite nature, layered wood products are much less likely to warp, twist, bow, or shrink than traditional sawn lumber. Layered wood products benefit from the multiple grain orientations of the layers and typically can also have a higher allowable stress than a comparable milled lumber product. However, as discussed below, to achieve this potential it is often critical that the veneer sheets making up the layered wood products are accurately graded to have the correct physical characteristics such as strength, consistent surface texture, and moisture content, combined with the proper application of glue and pressing actions to produce a panel of desired strength, thickness, and visual appearance.

The use of veneer, and particularly veneer that has uniform qualities such as consistent surface texture and moisture content, allows layered wood products of various dimensions to be created without milling a board of the desired thickness or dimension from a single log or single piece of lumber. This, in turn, allows for much more efficient use of natural resources. Indeed, without the use of various layered wood technologies, such as plywood, PLV, and LVL, the forests of the planet would have been depleted long ago simply to meet the construction needs of the ever-increasing world population. In addition, since layered wood products are fabricated in a factory under controlled specifications, layered wood products can be manufactured to virtually any dimensions desired, including dimensions such as length, width, and height well beyond dimensions that can be provided by milling from even the largest trees.

The use of veneer layers in some layered wood products, such as plywood, PLV, and LVL, can also allow for better structural integrity since any imperfections in a given veneer layer, such as a knot hole, can be mitigated by rotating and/or exchanging layers of veneer so that the imperfection is only one layer deep and is supported by layers of veneer below and above the imperfection in the layered wood products structure. However, these advantages are again dependent on the veneer layers being inspected for consistent surface texture, strength, and moisture content.

As noted, the versatility and potential increased structural integrity and uniformity of layered wood products has resulted in the wide use of these products and there is little question that layered wood products are a critical component of construction worldwide. However, the currently used methods and systems for veneer grading and producing layered wood products are antiquated and extremely inefficient in terms of the amount and type of equipment required, the amount of factory production space required, the amount of human interaction and coordination required, and the amount of wasted and/or inefficiently used material.

For example, in some known prior art systems, veneer grading is performed using one line-scan camera that captures only a small portion of the length of the sheet of veneer. In these systems, a sheet of veneer is moved along a conveyor belt and a series of images are captured by the line-scan camera. Each captured image shows the entire width of the veneer sheet but only a small portion of the length of the sheet. These multiple images are then digitally stitched together lengthwise to form a composite image of the entire veneer sheet and the sheet is graded based on this composite image.

FIG. 1 shows a block diagram of one such line-scan system 100 for grading veneer. A sheet of veneer 102 is moved along conveyor 104 in direction 106 shown by the arrow. In the example of FIG. 1, the veneer sheet 102 is passed through an anti-skew device 108 on the way to the scanner 102 to attempt to align the sheet properly before any images are captured.

After the veneer sheet 102 passes through the anti-skew device 108, it passes through the field of view 110 of a line-scan camera (not shown) and a series of snapshots of the veneer sheet are captured by the camera. In order for these multiple images to be formed into a single composite image, the speed of the veneer sheet and the timing of when each image is captured must be accurately managed. In some systems, the camera can be triggered by an encoder driven by the conveyor mechanism that causes each image to be captured after the veneer sheet 102 has moved a certain distance. Any deviations can result in a less accurate composite image being generated.

FIGS. 2A-2C show various example composite images formed from multiple line-scans of a veneer sheet such as veneer sheet 102 of FIG. 1. FIG. 2A shows composite image 200 made up of snapshots 202, 204, 206, 208. In FIG. 2A, the snapshots are properly spaced and aligned and composite image 200 accurately shows the veneer sheet. FIG. 2B shows composite image 210 formed from snapshots 212, 214, 216, 218. FIG. 2B shows what can happen when the veneer sheet slips on the conveyor belt as it moves through the cameras field of view. In this example, the slippage caused the veneer sheet to be in the wrong position when snapshot 214 was taken, thereby presenting an inaccurate composite image when the individual snapshots are spliced together. FIG. 2C shows composite image 220 formed from snapshots 222, 224, 226, 228. In this example, the veneer sheet was misaligned when the images were captured, again resulting in an inaccurate composite image.

As discussed above and illustrated in FIGS. 2B and 2C, this type of prior art system can be error prone and lead to inaccurate images of veneer sheets being taken, which can result in the system improperly grading veneer sheets.

In addition, as noted, the versatility and potential increased structural integrity and uniformity of layered wood products has resulted in the wide use of these products and there is little question that layered wood products are a critical component of construction worldwide. However, the currently used methods and systems for inspecting and grading veneer and then using the graded veneer to produce layered wood products are antiquated and extremely inefficient in terms of the amount and type of equipment required, the amount of factory production space required, the amount of human interaction and coordination required, and the amount of wasted and/or inefficiently used material.

As noted, layered wood products, such as plywood, PLV, and LVL are made of thin layers of veneer. In the case of plywood, in addition to sheets of veneer, layers of "core material" (sheets/partial sheets, or even narrow strips/pieces of veneer) are placed such as to rotate the grain approximately 90 degrees from the sheet, or ply, above and below. These alternating layers of oriented grain material increase the structural rigidity of the panel. Typically, one side (top) of a first sheet of veneer is coated with an adhesive, i.e., glue, and then a layer of core material is applied. Glue is then applied to the layer of core material and a second sheet of veneer is applied to the layer of core material. The resulting three ply structure made up of a first veneer sheet (the first ply), glue, a layer of core material (the second ply), glue, and a second sheet of veneer (the third ply) is referred to as a three-ply "green" panel, with each individual layer of construction, i.e., veneer sheet or core material, within the panel commonly referred to as a "ply". Typically, plywood panels are made up of multiple plys with three to eleven plys or more being common. Once the green panel is created, there remain additional processes that are required to transform the green panel into a cured, or finished, panel. Typically, the first process downstream is to "pre-press" the green panel product. This is typically performed on a stack of green panels with 12-40 panel stacks being common. The typical pre-press is a single opening press into which the entire stack of green panels is conveyed. The press closes, pressing the green panels between an upper and lower rigid surface. This pressing or "compaction" process is at ambient temperature and ensures all the air gaps between plys in each green panel are eliminated and a quality glue to wood contact is formed throughout the panel. After this pre-pressing action is completed, the resulting "pre-pressed panel" has increased rigidity and the stack of panels is ready for the next process, "Hot Pressing".

The stack of pre-pressed green panels is then conveyed into an unstacking mechanism at the hot press. This mechanism sequentially loads a single pre-pressed green panel from the stack into individual separate heating chambers in the hot press. Essentially sandwiching each pre-pressed green panel between two heated metal plates, commonly referred to as heating platens. When each of the individual heating chambers "Platens" have a pre-pressed green panel loaded, the press closes applying pressure and heat to the pre-pressed green panel. The combination of heat and pressure cures the glue and creates a rigid "cured" panel. In this way a continuous material assembly and processing routine is created.

The production of PLV is similar to plywood production except that core material is typically not used so that each layer, i.e., ply, of PLV is a veneer sheet. In this process, one side "top" of a first sheet/ply of veneer is coated with an adhesive, i.e., glue, and then a second veneer sheet/ply is applied, then glue is applied to the second veneer sheet, and a third sheet/ply of veneer is applied. This process is repeated until the desired number of plys is achieved. The resulting multiple veneer ply structure is called a PLV panel. As with plywood production, the resulting PLV panel is still a green panel, that must be "pre-press" to flatten out the veneer layer components and create the wood to glue bond, and then cured using a "hot press" where both pressure and heat are applied to cure the glue and create a cured panel. As with the plywood example discussed above, multiple green panels are produced, stacked, and sent to the pre-press. Then these pre-pressed panel stacks are sent to the hot press. In this way a continuous material assembly and processing routine is created.

As discussed in detail below, prior art layered wood product assembly methods and systems use a conveyor to move material progressively past multiple feeder stations which apply successive layers of veneer, glue, and core if required, to build a panel of a desired number of plys. This system of conveyor, feeder stations, glue applicators, etc. is commonly referred to as a "Layup Line" When the panel reaches the end of the line, it is discharged to form a stack of green layered wood product panels, as referred to herein simply as "green panel stacks."

From the layup line the green layered wood product stacks are conveyed, typically by a second conveying system, to a pressing area and pressing stations. Typical plants utilize multiple press lines with two press lines being commonly used for small plants and up to eight press lines in large plants.

As discussed above, in the pressing area, the stacks of green layered wood product panels are conveyed to a pre-press machine center typically utilizing hydraulic rams to compact the stack, eliminating air between layers of wood, and promoting an even spread of the glue between layers of veneer. After pre-pressing, the now pre-pressed layered wood product stacks are conveyed into an unstacking mechanism which feeds one pre-pressed layered wood product panel at a time from the stack into a multi opening hot press. Typically, hot presses contain between 12 and 40 individual openings, each of which can process one pre-pressed layered wood product panel. When the hot press is loaded with panels, hydraulic systems close the press and heat is applied to cure the glue. It is this combination of heat and pressure that causes the layered wood product panels to bond and become cured plywood, PLV, or LVL panels.

FIGS. 3A through 3H are various representations of prior art layered wood product methods and systems. For simplicity, the prior art layered wood product methods and systems shown in FIGS. 3A through 3H are associated with the production of traditional plywood products. However, as discussed above, other layered wood product methods and systems are similar except that where a layer of core material is laid down in a traditional plywood product assembly line, for other layered wood products all layers would be veneer sheets. Consequently, with this one exception, in actual practice the same prior art equipment and methods shown in FIGS. 3A through 3H are used for all layered wood products.

FIG. 3A is a diagram representing traditional layered wood product panel assembly layup station 340A. As seen in FIG. 3A a traditional layered wood product panel assembly layup station 340A includes traditional panel conveyor 301, which, as discussed later, is a conveyor system that in many cases extends one hundred feet or more, and in some cases three hundred feet or more.

The process of creating a traditional layered wood product panel begins at sheet feeder operator position 321A with a sheet feeder operator SFO1 using a vacuum conveyor 305 of sheet feeder station 302A to move a sheet of veneer 307A from veneer stack 303A to traditional panel conveyor 301. Sheet of veneer 307A then moves via traditional panel conveyor 301 down to first glue applicator 309A. At first glue applicator 309A a layer of glue is applied to a first side of sheet of veneer 307A. Of note is the fact that the amount of glue applied by glue applicator 309A is determined by the flow of glue through glue applicator 309A and the speed of traditional panel conveyor 301. The result is that using prior art methods and systems only a very coarse adjustment can be made to the amount of glue applied by glue applicators such as glue applicator 309A. In addition, if for any reason the speed of traditional panel conveyor 301 changes without a resulting adjustment to the flow of glue through the glue applicators, the result is that too much or too little glue is applied. As discussed below, this, in turn, can adversely affect the quality of the resulting plywood panels.

After glue is applied at glue applicator 309A, the structure is conveyed by traditional panel conveyor 301 to the core feeder station 323A and core stack 313A. At core feeder station 323A, a core placement operator CO1 places a portion of core material onto the assembly to create structure 315A. The assembly then proceeds to a second glue applicator 309B. As seen in FIG. 3A, at this point in the traditional process, even before an entire three-ply panel is created, two distinct glue applicators and at least two people are required.

FIG. 3B is a photograph of an actual traditional layered wood product panel assembly layup station 340A such as that diagramed in FIG. 3A. As can be seen in FIG. 3B, traditional layered wood product panel assembly layup station 340A is of significant size, has many moving parts, and is both complicated and potentially hazardous to operate. In addition, due to the rather large area and set up of traditional layered wood product panel assembly layup station 340A, significant waste products and debris are created that must be removed periodically. This, unfortunately requires the entire line be stopped, as discussed below.

FIG. 3C is a diagram representing a side view of the formation of a three-ply plywood panel being created using a traditional layered wood product panel assembly layup station 340A. As seen in FIG. 3C, at veneer layer sheet feeder operator position 321A, SFO1 places sheet of veneer 307A on traditional panel conveyor 301. Sheet of veneer 307A then moves along traditional panel conveyor 301 to glue applicator 309A where a layer of glue is applied. Then the structure moves along traditional panel conveyor 301 to core feeder station 323A where CO1 places core material to create a core layer and structure 315A. The structure 315A then moves along traditional panel conveyor 301 to second glue applicator 309B where a layer of glue is applied. Then at veneer layer sheet feeder operator position 321B a second sheet feeder operator SFO2 uses sheet feeder station 302B to place second sheet of veneer on structure 315A to create structure 307B. At this point, structure 307B represents a single three-ply plywood panel.

As noted, FIG. 3C is a representation of the creation of a single three-ply plywood panel structure using prior art methods. However, as noted above, in many cases a plywood panel includes even more plys, often eight or more.

Consequently, for each three plys, structures similar to that shown in FIGS. 3A, 3B, and 3C must be linked together along a very long traditional panel conveyor 301 to create a traditional layered wood product panel assembly layup line including, in practice, layup sheet feeder stations, glue application stations, and core feeder stations cumulatively represented as detailed in 340A.

FIG. 3D is a diagram representing a traditional layered wood product panel assembly layup line 350 including five traditional layered wood product panel assembly layup stations 340A through 340E for creating a single plywood panel structure of up to eleven plys, or a plywood structure of a fewer number of plys, or multiple plywood panels structures of a fewer number of plys. As noted above, many plywood and other layered wood products, include a minimum of three plys and eleven or more plys is not uncommon. However, for simplicity of discussion, the illustrative example of a layup line 350 is shown with only five traditional layered wood product panel assembly layup stations 340A through 340E and therefore would produce, at most, an eleven-ply panel. In addition, as discussed in more detail below, by deactivating selected components making up traditional layered wood product panel assembly layup line 350, traditional layered wood product panel assembly layup line 350 could be used to create a plywood structure of a fewer number of plys, or multiple plywood panels structures of a fewer number of plys.

In operation, the process of creating a traditional layered wood product panel using traditional layered wood product panel assembly layup line 350 begins at sheet operator position 321A with a sheet feeder operator SFO1 using a vacuum conveyor of sheet feeder station 302A to move a sheet of veneer 307A from veneer stack 303A to traditional panel conveyor 301. Sheet of veneer 307A then moves via traditional panel conveyor 301 down to first glue applicator 309A. At first glue applicator 309A a layer of glue is applied to a top side of sheet of veneer 307A. Of note is the fact that the amount of glue applied by glue applicators 309A through 309J is determined by the flow of glue through the glue applicator and the speed of traditional panel conveyor 301. The result is that using prior art methods and systems only a very coarse adjustment can be made to the amount of glue applied by glue applicators such as glue applicator 309A through 309J. In addition, if for any reason the speed of traditional panel conveyor 301 changes without a resulting adjustment to the flow of glue through the glue applicators the result is that too much or too little glue is applied. As discussed below, this, in turn, can adversely affect the quality of the resulting plywood panels.

After glue is applied at glue applicator 309A, the structure is conveyed by traditional panel conveyor 301 to the core feeder station 323A and core stack 313A. At core stack 313A, a first core placement operator CO1 places a portion of core material onto the assembly. The resulting structure 315A then moves along traditional panel conveyor 301 to second glue applicator 309B where a layer of glue is applied. Then at veneer layer sheet feeder operator position 321B a second sheet feeder operator SFO2 uses sheet feeder station 302B, to place a second sheet of veneer from veneer stack 303B on structure 315A to create structure 307B. At this point, structure 307B represents a three-ply plywood panel structure.

Referring to FIG. 3D, it is worth noting that if only a three-ply wood product panel is desired, then third glue applicator 309C and fourth glue applicator 309D would be deactivated along with core feeder station 323B. However, if a five ply or greater panel structure is desired, structure 307B then moves along traditional panel conveyor 301 to third glue applicator 309C where a layer of glue is applied. Then the structure moves along traditional panel conveyor 301 to core feeder station 323B and core stack 313B where a second core operator CO2 places core material on structure 307B to create a core layer. The resulting structure 315B then moves along traditional panel conveyor 301 to fourth glue applicator 309D where a layer of glue is applied. Then at veneer layer sheet feeder operator position 321C a third sheet feeder operator SFO3 uses sheet feeder station 302C to place a third sheet of veneer from veneer stack 303C on structure 315B to create structure 307C. At this point, structure 307C represents a five-ply plywood panel structure.

Referring to FIG. 3D, it is again worth noting that if only a five-ply wood product panel is desired, then fifth glue applicator 309E and sixth glue applicator 309F would be deactivated along with core feeder station 323C. However, if a six ply or more structure is desired, structure 307C then moves along traditional panel conveyor 301 to fifth glue applicator 309E where a layer of glue is applied. Then the structure moves along traditional panel conveyor 301 to core feeder station 323C where a third core operator CO3 places core material from core stack 313C on the structure to create a core layer. The resulting structure 315C then moves along traditional panel conveyor 301 to sixth glue applicator 309F where a layer of glue is applied. Then at veneer layer sheet feeder operator position 321D a fourth sheet feeder operator SFO4 uses sheet feeder station 302D to place a fourth sheet of veneer from veneer stack 303D on structure 315C to create structure 307D. At this point, structure 307D represents a seven-ply plywood panel structure.

Referring to FIG. 3D, it is again worth noting that if only a seven-ply wood product panel is desired, then seventh glue applicator 309G and eighth glue applicator 309H would be deactivated along with core feeder station 323D. However, if an eight-ply or more structure is desired, structure 307D then moves along traditional panel conveyor 301 to seventh glue applicator 309G where a layer of glue is applied. Then the structure moves along traditional panel conveyor 301 to core feeder station 323D where a fourth core operator CO4 places core material from core stack 313D on the structure to create a core layer. The resulting structure 315D then moves along traditional panel conveyor 301 to eighth glue applicator 309H where a layer of glue is applied. Then at veneer layer sheet feeder operator position 321E a fifth sheet feeder operator SFO5 uses sheet feeder station 302E, to place a fifth sheet of veneer from veneer stack 303E on structure 315D to create structure 307E. At this point, structure 307E represents a nine-ply plywood panel structure.

Referring to FIG. 3D, it is again worth noting that if only a nine-ply wood product panel is desired, then ninth glue applicator 309I and tenth glue applicator 309J would be deactivated along with core feeder station 323E and veneer layer sheet feeder operator position 321F. However, if a nine-ply or more structure is desired, structure 307E then moves along traditional panel conveyor 301 to ninth glue applicator 309I where a layer of glue is applied. Then the structure moves along traditional panel conveyor 301 to core feeder station 323E and core pile 313E where a fifth core operator CO5 places core material from core stack 313E on the structure to create a core layer. The resulting structure 315E then moves along traditional panel conveyor 301 to tenth glue applicator 309J where a layer of glue is applied. Then at veneer layer sheet feeder operator position 321F a sixth sheet feeder operator SFO6 uses sheet feeder station 302F to place a sixth sheet of veneer from veneer stack 303F on structure 315E to create structure 307F. At this point, structure 307F represents an eleven-ply plywood panel structure.

As seen above, by activating or deactivating various glue applicators, core feeding stations, and/or veneer layer sheet feeder operator positions, traditional layered wood product panel assembly layup line 350, including five traditional layered wood product panel assembly layup stations 340A through 340E, can be used for creating a single plywood panel structure of up to eleven plys, or a plywood structure of a fewer number of plys, or multiple plywood panels structures of a fewer number of plys. However, this requires significant coordination and tracking of complicated components and represents one of numerous opportunities to introduce mechanical and/or human error into these prior art systems and methods as discussed above and depicted in FIG. 3D.

Green panel structure 307F is then moved by traditional panel conveyor 301 to stacker 324 and stacker operator SO. At stacker 324 multiple green panel structures, such as green panel structure 307F, are stacked into green panel stacks 360 for conveyance to the press area discussed below. In many cases, green panel stacks 360 can include forty or more individual green panel structures, such as green panel structure 307F. Consequently, each stack 360 represents a significant investment of resources.

FIG. 3E is a photograph of an actual traditional layered wood product panel assembly layup line 350 including multiple traditional layered wood product panel assembly layup stations such as that diagramed in FIG. 3D.

As seen above, traditional layered wood product panel assembly layup line 350 is a very space intensive structure that extends hundreds of feet. Therefore, traditional layered wood product panel assembly layup line 350 is expensive in terms of factory floor footprint alone. In addition, the size of traditional layered wood product panel assembly layup line 350 also means that housekeeping requirements are continuous and extensive to prevent these large portions of the factory floor from becoming covered with debris, i.e., glue and wood particles. to keep the machinery running and ensure a safe working environment. As noted above, this typically requires continuous housekeeping in the areas safely accessible during operation, and for those areas where moving equipment is located, the entire traditional layered wood product panel assembly layup line 350 has to be shut down to perform housekeeping These are significant costs to maintain an acceptable clean and safe working environment. However, the cost of traditional layered wood product panel assembly layup line 350 is even more evident in the number of moving parts and personnel required to operate traditional layered wood product panel assembly layup line 350. For the eleven-ply layup line shown in traditional layered wood product panel assembly layup line 350 there must be a minimum of: a hundred foot or more traditional panel conveyor; six automated sheet feeder stations, six veneer stacks, and six sheet feeder operators; five core stacks and five core operators; ten glue applicators; a stacker and stacker operator; several forklift and stack replenishing operators; and multiple motors and control and communication systems. This requires thousands of moving parts and sensors, and at least twelve people, all of which must function accurately, safely, and in close coordination. This is a huge maintenance effort and a huge cost in terms of investment of man-hours. In addition, as discussed below, when there is a glitch in any of the thousands of moving parts, or there is any human error generated by the numerous human workers, often the entire line must be stopped, or at a minimum there is product degradation, or both Not only is this inefficient, in and of itself in terms of time, but the increased time period between the glue application and the time when the panel is pressed impacts the glue bonding ability. Consequently, when the line is stopped for any error, or any reason, for more than a short interval, product quality is impacted, and longer intervals often results in large amounts of product waste.

In addition, while the reader can easily recognize the use and maintenance of traditional layered wood product panel assembly layup line 350 is significant, traditional layered wood product panel assembly layup line 350 is only an eleven-ply assembly layup line. Therefore, larger installations are proportionately more complicated, have proportionately more moving parts, and require proportionately more human operators.

The resultant product of traditional layered wood product panel assembly layup line 350 are green panel stacks 360 of multiple green panel structures such as green panel structure 307F. Like all green panels, these structures must be pressed and cured to create finished layered wood products. This process involves moving green panel stacks 360 to one or more press lines where each stack is first pre-pressed in a cold press to flatten the composite green panel structures and then to a hot press where individual pre-pressed panels are subjected to pressure and heat to cure the glue and yield finished layered wood panels.

FIG. 3F is a diagram representing a traditional layered wood product panel assembly layup and press line 351 including traditional layered wood product panel assembly layup line 350 of FIG. 3D, stack press delivery line 362, and four pressing stations 353 through 359.

As seen in FIG. 3F, traditional layered wood product panel assembly layup and press line 351 includes stack production and processing section 399. Stack production and processing section 399 includes traditional layered wood product panel assembly layup line 350 and stack press delivery line 362 that is a conveyor moving multiple green panel stacks 360 to pressing stations 353 through 359.

As seen in FIG. 3F, stack press delivery line 362 conveys green panel stacks 360 to pressing stations 353 through 359 in a continuous movement and individual green panel stacks 360 are positioned in each press line. In FIG. 3F these include green panel stack 360A to press line 353, green panel stack 360B to press line 355, green panel stack 360C to press line 357, and green panel stack 360D to press line 359. In practice, the number of press lines can be fewer or more than the four shown in FIG. 3F. It is important to note that stack press delivery line 362 continues to convey green panel stacks 360 to pressing stations 353 through 359 as green panel stacks 360A through 360D are being processed at pressing stations 353 through 359, respectively.

As seen in FIG. 3F, green panel stacks 360A through 360D are processed at pressing stations 353 through 359, respectively, by press operators PO1, PO2, PO3, and PO4, respectively. Green panel stacks 360A through 360D are first loaded into pre-presses 370A, 370B, 370C, and 370D, respectively, where the green panel stacks 360A through 360D are subjected to cold pre-pressing. In the cold pre-presses 370A, 370B, 370C, and 370D, green panel stacks 360A through 360D are pressed to flatten out the structures and force out any air pockets that may exist in the green panel stacks 360A through 360D.

FIG. 3G is a photograph of an actual pre-press 370 such as any of the pre-presses 370A through 370D of FIG. 3F. It is important to note that each of cold pre-presses 370A, 370B, 370C, and 370D can, in some instances, be capable of processing green panel stacks 360 of different sizes, i.e., of differing numbers of green layered wood structure panels. This is an important factor because it can require significant coordination between the stacker operator SO and each of the press operators PO1, PO2, PO3, and PO4. Otherwise the wrong size green panel stack could be loaded into a cold press that is unable to process it.

The resulting pre-pressed stacks 361A, 361B, 361C, and 361D are conveyed into an unstacking mechanism which feeds one layered wood structure panel at a time from the pre-pressed stacks 361A, 361B, 361C, and 361D into slots of one or more multi-opening hot presses 380A, 380B. 380C, and 380D, respectively. At hot presses 380A, 380B. 380C, and 380D the layered wood structure panels making up pre-pressed stacks 361A, 361B, 361C, and 361D are subjected to pressure and heat to compress and cure the layered wood structure panels making up pre-pressed stacks 361A, 361B, 361C, and 361D. Then the layered wood structure panels are re-stacked resulting in cured layered wood panel product stacks 363A, 363B, 363C, and 363D, respectively.

FIG. 3H is a photograph of an actual hot press 380 such as any of the hot presses 380A through 380D of FIG. 3F. It is important to note that, like each of cold pre-presses 370A, 370B, 370C, and 370D, each of hot presses 380A, 380B, 380C, and 380D can, in some instances, be capable of processing pre-pressed stacks 361A, 361B, 361C, and 361D of different sizes, i.e., of differing numbers of layered wood product panels. This is an important factor because it also can require significant coordination between the stacker operator SO and each of the press operators PO1, PO2, PO3, and PO4. Otherwise the wrong size stack could be loaded into a hot press that is unable to process it. Some hot presses can handle pre-pressed stacks of up to forty or more layered wood structure panels.

Cured layered wood panel product stacks 363A, 363B, 363C, and 363D are then conveyed to panel trim, quality analysis, and shipping area 311 where the individual layered wood panels making up cured layered wood panel product stacks 363A, 363B, 363C, and 363D are trimmed to size, subjected to quality control analysis, and then shipped to customers.

In addition to the cost of operating traditional layered wood product panel assembly layup and press line 351, including stack production and processing section 399, i.e., traditional layered wood product panel assembly layup line 350 and stack press delivery line 362, there is a significant cost associated with any delays in traditional layered wood product panel assembly layup and press line 351 and/or pressing stations 353 through 359 which, in the prior art, are commonly fed by traditional layered wood product panel assembly layup line 350. These delays include delays due to failure of any of the thousands of moving parts associated with traditional layered wood product panel assembly layup and press line 351, and particularly stack production and processing section 399, or any human error introduced by the twelve or more people required to operate traditional layered wood product panel assembly layup and press line 351

Referring to FIGS. 3D and 3F together, when a delay occurs, for whatever reason, the layers of glue applied by glue applicators 309A through 309J may dry out before the green panel stacks 360 reach the pressing stations 353 through 359. This, in turn, results in layered wood product panels that can separate or otherwise fail because the glue could not cure and adhere the layers properly. Unfortunately, this often results in significant loss of product using traditional layered wood product panel assembly layup and press line 351. Currently there is an average loss of product to defects of ten percent or more using traditional layered wood product panel assembly layup and press line 351.

As shown above, prior art methods and systems for producing layered wood products suffer from several serious drawbacks. For instance, using prior art methods and systems for producing layered wood products, the quality of veneer fed into process is often not inspected during feeding operation. Therefore, undetected defects can cause panels to be rejected downstream after significant time and energy has already been devoted to the panels, i.e., pressing is complete and panel quality is analyzed.

In addition, as noted, even if prior art inspection and grading systems were employed, prior art inspection and grading systems can be error prone and lead to inaccurate images of veneer sheets being taken, which can result in the system improperly grading veneer sheets.

As also noted, prior art systems for producing layered wood products are of large physical size, e.g., hundreds of feet, and therefore require substantial factory floor space.

In addition, prior art methods and systems for producing layered wood products have thousands of moving parts and sensors. This makes prior art methods and systems for producing layered wood products extremely maintenance intensive.

In addition, prior art methods and systems for producing layered wood products, including traditional conveyor systems 301 and 362 use a large number of electric motors with substantial power consumption during operation. This makes prior art methods and systems for producing layered wood products expensive to operate and a drain on the environment.

In addition, prior art methods and systems for producing layered wood products are manpower intensive for operation and maintenance. This makes prior art methods and systems for producing layered wood products not only expensive to operate but also subject to human error and a source of potential injury.

In addition, any failure of any one of the thousands of moving parts required by prior art methods and systems for producing layered wood products, or any human error introduced, results in the entire lay-up line and process stopping until repaired. As also noted above, these stoppages often result in substantial product waste due to glue degradation, i.e., glue dry out. In cases where product is lost to an extended stoppage, hundreds of potential layered wood product panels can be lost. As noted above, this significantly contributes to ten percent or more of potential product currently being discarded.

In addition, using prior art methods and systems for producing layered wood products, material and glue systems are configured to run a single product at a time, i.e., only a single three-ply count panel, or single type of product (plywood or PLV), at a time. Changing products requires stopping the machine, removing all in process material, and then reconfiguring controls for new product construction.

In addition, using prior art methods and systems for producing layered wood products, glue spread rates are only manually adjustable and in rather large incremental steps. Consequently, it is difficult to make fine adjustments to the amount of glue applied to compensate for ambient temperature, line speed changes, etc.

In addition, using prior art methods and systems for producing layered wood products, no direct correlation is made, or can readily be made, between individual panel quality and the assembly process variables used for construction of that specific panel.

Finally, using prior art methods and systems for producing layered wood products, housekeeping, i.e., keeping the workplace clean and safe, is a challenge due to physical size, physical construction, and operational characteristics discussed above.

Consequently, prior art methods and systems for producing layered wood products are extremely expensive to operate and extremely inefficient.

What is needed is a method and system for producing layered wood products that addresses the shortcoming of prior art methods and systems for producing layered wood products and thereby provides a solution to the long standing problem of providing a method and system for producing layered wood products that includes improved wood product scanning and grading equipment and is less expensive to operate and is far more efficient.

SUMMARY

Embodiments of the present disclosure provide an effective and efficient technical solution to the long-standing technical problem of providing a method and system for producing layered wood products that includes improved wood product scanning and grading equipment and is less expensive to operate and is more efficient.

In one embodiment, local robotic panel assembly cells are disclosed including: one or more vision systems for veneer grading; and one or more veneer handling robots; one or more glue application robots; and, in some embodiments, one or more core handling robots. In accordance with the disclosed embodiments, the local robotic panel assembly cells are used to locally and independently produce stacks of layered wood product panels at, or near, the pressing stations.

As disclosed, the local robotic panel assembly cells operate independently to assemble the stacks at static locations local to the pressing stations and as the stacks are required. Consequently, using the disclosed embodiments, the stacks of layered wood product panels are built independently and locally at the pressing stations thereby eliminating the need for traditional panel conveyors, traditional layered wood product panel assembly layup lines, and stack press delivery lines. This, in turn, eliminates thousands of moving parts and dozens of people from the layered wood product production process.

In one embodiment, a vision system for analysis of wood products and a veneer inspection/grading robot is used for analysis of wood products to determine the quality of veneer fed into process during feeding operation. In one embodiment, the vision system for analysis of wood products can improve the speed and accuracy of veneer grading.

In operation, before veneer sheets from a veneer stack are made available to a veneer handling robot, the veneer sheets are retrieved by a veneer inspection/grading robot. The veneer inspection/grading robot then presents each veneer sheet to a vision system in accordance with control signals from a robot control system.

At the vision system the veneer sheets are inspected and assigned a grade based on the inspection results. In one embodiment, based on the grade assigned to each veneer sheet, each veneer sheet is placed in one of two or more graded veneer stacks, by the veneer inspection/grading robot. In one embodiment, the veneer stacks can include a first-grade veneer stack that includes veneer sheets that are deemed to be of acceptable appearance and quality to be used for outer veneer layers of a layered wood panel. In one embodiment, the veneer stacks can include a second grade veneer stack that includes veneer sheets that are deemed to be of acceptable structural quality to be used for inner veneer layers of a layered wood panel but perhaps lack the appearance to be used as outer layers of a layered wood panel. In one embodiment, the veneer stacks can include a third grade veneer stack that includes veneer sheets that are deemed to have structural anomalies, such as knot holes, and therefore must be sparingly used for inner veneer layers of a layered wood panel and perhaps must be sandwiched between higher grade veneer sheets to provide adequate structural quality for the layered wood panel. In one embodiment, the veneer stacks can include a trash stack that contains veneer sheets of unacceptable quality.

By accurately grading veneer sheets from the veneer stack and stacking the veneer sheets according to grade, the quality of veneer fed into process during feeding operation is determined before resources are expended processing the veneer, i.e., defects can be detected in the veneer sheets, and the veneer sheets can be graded, and allocated for their best use, before significant time and energy is devoted to their use in processed panels.

In one representative embodiment, a visual inspection method and system can comprise capturing a black and white image of a wood product with a first camera, capturing a color image of the wood product with a second camera, determining from computer processing of the black and white image one or more of the dimensions of the wood product, the existence of voids within the wood product, and the presence of debris on the wood product, determining from computer processing of the color image whether colored defects are present in the wood product, and assigning a grade to the wood product based at least in part on the computer processing of the black and white image and the computer processing of the color image.

In some embodiments, the colored defects can comprise one or more of the presence of closed knots, the position of closed knots, the size and spacing of closed knots, the presence of pitch, the size and position of pitch, the presence of wane, the size and position of wane, and the presence of blue mold.

In some embodiments, the wood product can travel along a conveyor of a production line and the first and second cameras can capture the black and white and color images of the wood product at a first location along the conveyor.

In some embodiments, the first camera can capture a black and white image of an entire surface of the wood product facing the first camera and the second camera can capture a color image of the entire surface of the wood product facing the second camera.

In some embodiments, the first camera can capture a black and white image of a portion of the wood product without digitally stitching together multiple images and the second camera can capture a color image of the portion of the wood product without digitally stitching together multiple images.

In some embodiments, the wood product can be assigned an associated void or undersized grade based on the determination from the computer processing of the black and white image that one or more of the dimensions of the wood product are undersized in comparison to a reference or that voids exist in the wood product. The wood product can be sorted based on this grade.

In some embodiments where an associated void or undersized grade has not been assigned to the wood product, a grade can be assigned to the wood product based on one or more of the presence of closed knots, the position, size and spacing of closed knots, the presence of pitch, the size and position of pitch, the presence of wane, the size and position of wane, and the presence of blue mold as determined from the computer processing of the color image. The wood product can be sorted based upon this grade. In some embodiments, the wood product can be a sheet of wood veneer.

In some embodiments, the computer processing of the black and white image can comprise performing a comparison between the black and white image and a reference image. In some embodiments, the computer processing of the color image can comprise performing a comparison between the color image and a reference image. In some embodiments, the computer processing of the color image can comprise comparing data of the color image to reference data.

In some embodiments, the method can comprise determining a scaling factor between the wood product and the black and white image based at least in part on known dimensions of a reference image.

In some embodiments, the method can comprise auto-rotating the black and white image such that it is parallel with respect to a reference direction before performing the computer processing of the black and white image and auto-rotating the color image such that it is parallel with respect to the reference direction before performing the computer processing of the color image.

In some embodiments, the method can comprise translating the black and white image such that it has the same horizontal spacing as a reference image before performing the computer processing of the black and white image and translating the color image such that it has same horizontal spacing as the reference image before performing the computer processing of the color image.

In some embodiments, the method can further comprise determining from computer processing of the color image whether critical areas containing multiple defects are present in the wood product.

In another representative embodiment, a method can comprise storing a plurality of first images of veneer sheets having a first grade in computer memory, storing a plurality of second images of veneer sheets having a second grade in computer memory, capturing a black and white image of a veneer sheet with a first camera, capturing a color image of a veneer sheet with a second camera, performing a first series of comparisons between the plurality of first images and the black and white image with a computer, performing a second series of comparisons between the plurality of second images and the black and white image with the computer, performing a third series of comparisons between the plurality of first images and the color image with the computer, performing a fourth series of comparisons between the plurality of second images and the color image with the computer, and assigning one of the first grade or the second grade to the wood product based at least in part on one or more of the first series of comparisons, the second series of comparisons, the third series of comparisons, and the fourth series of comparisons.

In another representative embodiment, a method can comprise capturing a black and white image of a wood product with a first camera, capturing a color image of the wood product with a second camera, auto-rotating the black and white image such that it has the same orientation as a reference image, auto-rotating the color image such that it has the same orientation as the reference image, translating the black and white image such that it has the same horizontal spacing as the reference image, translating the color image such that it has the same horizontal spacing as the reference image, determining from computer processing of the black and white image one or more of the dimensions of the wood product, the existence of voids within the wood product, and the presence of debris on the wood product, determining from computer processing of the color image whether colored defects are present in the wood product, and assigning a grade to the wood product based at least in part on the computer processing of the black and white image and the computer processing of the color image.

In some embodiments, the method can comprise determining a scaling factor between the wood product and one of the black and white image or the color image based at least in part on known dimensions of the reference image.

In some embodiments, the first camera can capture a black and white image of an entire surface of the wood product facing the first camera and the second camera can capture a color images of the entire surface of the wood product facing the second camera.

In some embodiments, the first camera can capture a black and white image of a portion of the wood product without digitally stitching together multiple images and the second camera can capture a color image of the portion of the wood product without digitally stitching together multiple images.

In another representative embodiment, an apparatus can comprise a first camera to capture a black and white image of a wood product, a second camera to capture a color image of the wood product, and a vision system controller. The vision system controller can perform computer processing of the black and white image to determine one or more of the dimensions of the wood product, the existence of voids within the wood product, and the presence of debris on the wood product. The vision system controller can perform computer processing of the color image to determine whether colored defects are present in the wood product. The vision system controller can assign a grade to the wood product based at least in part on the computer processing of the black and white image and the computer processing of the color image.

In some embodiments, the first and second cameras can be mounted above a conveyor of a production line in a position to capture respective black and white and color images of the wood product at a first location of the wood product along the conveyor.

In some embodiments, the first camera can be configured to capture a black and white image of an entire surface of the wood product facing the first camera and the second camera can be configured to capture a color image of the entire surface of the wood product.

In some embodiments, the vision system controller can be configured to determine a scaling factor between the wood product and the black and white image based at least in part on known dimensions of a reference image.

In some embodiments, the first camera can be configured to capture a black and white image of an entire surface of the wood product facing the camera and the second camera can be configured to capture a color image of the entire surface of the wood product.

In some embodiments, the vision system controller can be configured to auto rotate the black and white image and the color image such that the black and white image and the color image have the same orientation as a reference image.

In some embodiments, the vision system controller can be configured to translate the black and white image and the color image such that the black and white image and the color image are each oriented to match the orientation of the reference image.

In one embodiment, once the veneer sheets are inspected/graded by the vision system and the sheets are placed in appropriate graded veneer stacks by the veneer inspection/grading robot, a veneer handling robot is directed by control signals from the robot control system to retrieve veneer a sheet from the appropriate graded veneer stack and place the veneer sheet on a green panel stack.

Then a glue application robot is directed by the control signals from the robot control system to apply a layer of glue from a glue reservoir to the veneer sheet.

In embodiments where the robotic panel assembly cell is used to create green plywood panels, the core handling robot is directed by the control signals from the robot control system to retrieve core material from a core stack and place a portion of core material on the green panel stack to create a core layer.

The glue application robot is then directed by the control signals from the robot control system to apply a layer of glue from the glue reservoir on the core layer. Then the veneer handling robot is directed by control signals from the robot control system to retrieve another veneer sheet from the appropriate graded veneer stack and place the veneer sheet on the green layered wood product panel.

Of note, in embodiments where robotic panel assembly cell is used to produce green layered wood product stacks of other types of layered wood products, such as green PLV panels, the core handling robot is either deactivated or not present. In these cases, the veneer handling robot is directed by control signals from the robot control system to retrieve a veneer sheet from the appropriate graded veneer stack and place the veneer sheet on the green panel stack. Then the glue application robot is directed by the control signals from the robot control system to apply a layer of glue from the glue reservoir to the veneer sheet. Then the veneer handling robot is simply directed by the control signals from robot control system to retrieve another veneer sheet from the appropriate graded veneer stack and place the veneer sheet on the previous veneer sheet.

The result of the operations above is a single three-ply green layered wood product panel. As noted above, plywood, and other layered wood product panels often have twenty-one or more plys. However, for simplicity of illustration, the description above is of the creation of a green layered wood product panel that is a single three-ply green layered wood product panel.

Once the green layered wood product panel is constructed by the robotic panel assembly cell, the robotic panel assembly cell begins to construct a second green layered wood product panel of on the green panel stack. To this end, the veneer handling robot is again directed by control signals from the robot control system to retrieve a veneer sheet from the appropriate graded veneer stack and place the veneer sheet on the glue-free side of top veneer sheet of the previously created panel. Importantly, the veneer handling robot is directed by control signals from the robot control system to retrieve the veneer sheet from the appropriate graded veneer stack and place the veneer sheet on the glue-free side of top veneer sheet of the previously created panel directly, without any glue layer being applied by the glue application robot. This creates a dry veneer to veneer layer, or gap. The dry gap therefore separates the first green layered wood product panel and the second green layered wood product panel in the green panel stack.

Then the glue application robot is directed by the control signals from the robot control system to apply a layer of glue from the glue reservoir to the veneer sheet. In embodiments where the robotic panel assembly cell is used to create green plywood panels, the core handling robot is directed by the control signals from the robot control system to retrieve core material from the core stack and place a portion of core material on the green panel stack to a create core layer. Then the glue application robot is directed by the control signals from the robot control system to apply a layer of glue from the glue reservoir on the core layer. Then the veneer handling robot is directed by the control signals from the robot control system to retrieve another veneer sheet from the appropriate graded veneer stack and place the veneer sheet on the green panel stack.

Of note again, in embodiments where robotic panel assembly cell is used to produce green layered wood product stacks of other types of layered wood products, such as green PLV panels, the core handling robot is either deactivated or not present. In these cases, veneer handling robot is directed by the control signals from the robot control system to retrieve the veneer sheet from the appropriate graded veneer stack and place the veneer sheet on green panel stack. Then the glue application robot is directed by the control signals from the robot control system to apply a layer of glue from the glue reservoir to the veneer sheet. Then the veneer handling robot is simply directed by the control signals from the robot control system to retrieve another veneer sheet from the appropriate graded veneer stack and place the veneer sheet on the previously placed veneer sheet.

The result of the operations above is a second single three-ply green layered wood product panel. The process above is then repeated to create the desired number of green layered wood product panels for green panel stack. As noted above, it is not uncommon for a green panel stack to include forty or more individual green layered wood product panels.

It is worth noting that the green panel stacks produced by robot panel assembly cells disclosed herein are virtually identical to green panel stacks 360A of FIG. 3F, or any of the green panel stacks 360 of FIG. 3D or FIG. 3F discussed above, except that the veneer sheets used are accurately inspected and graded. Consequently, each of the robot panel assembly cells disclosed herein literally replaces all of the prior art structure shown in FIG. 3D and the stack production and processing section 399 of FIG. 3F, including traditional layered wood product panel assembly layup line 350 and stack press delivery line 362. This alone means that the local robotic panel assembly and pressing stations disclosed herein eliminate the need for hundreds of square feet of floor space, thousands of moving parts, multiple sensors and motors, and dozens of sub-assemblies and human operators.

In addition, according to the disclosed embodiments, and in contrast to prior art systems, the robot panel assembly cells are located locally at, or near, the pre-presses and hot presses. Therefore, according to the disclosed embodiments, the green panel stacks are assembled by the disclosed robot panel assembly cells locally with respect to the pressing line. Consequently, the disclosed robot panel assembly cells assemble the same green panel stack as any of the green panel stacks 360 of FIG. 3D or FIG. 3F locally with respect to pre-press 370A and hot press 380A and at a single location.

In one embodiment, once the robot panel assembly cell creates green panel stack, the green panel stack is transferred to a pre-press and the green panel stack is loaded into a pre-press where the green panel stack is subjected to pre-pressing by the methods discussed above. In the cold press the green panel stack is pressed to flatten out the structure and force out any air pockets that may exist in the green panel stack and to create a pre-pressed stack.

Once the pre-pressed stack is created, the pre-pressed stack is conveyed to an unstacking mechanism (not shown) which feeds the layered wood structure panels making up the pre-pressed stack one at a time into slots of a hot press. At the hot press, the layered wood structure panels making up the pre-pressed stack are subjected to further pressure and heat to further flatten and cure the layered wood structure panels making up the pre-pressed stack by the methods discussed above. The layered wood structure panels are then re-stacked to form cured layered wood panel product stacks.

In one embodiment, the cured layered wood panel product stacks are then conveyed to panel trim, quality analysis, and shipping area where the individual layered wood panels making up cured layered wood panel product stacks are trimmed to size, subjected to quality control analysis, and then shipped to customers.

In one embodiment, the pressing and trimming/quality control/shipping process is virtually identical to the pressing and finishing/quality control/shipping process discussed above with respect to FIG. 3F. Thus, according to one embodiment, once the disclosed robot panel assembly cell creates the green panel stack, the green panel stack is processed in the same manner, and using the same equipment, as is used to traditionally process layered wood products. Consequently, existing cold and hot press equipment need not be replaced. Therefore, the use of the disclosed local robotic panel assembly and pressing stations results in eliminating the need for hundreds of square feet of floor space, thousands of moving parts, multiple sensors and motors, and dozens of sub-assemblies and human operators of the prior art structure shown in as FIG. 3D and the stack production and processing section 399 of FIG. 3F, while still minimizing the amount of processing equipment that must be replaced.

Using the disclosed embodiments, many of the shortcomings of prior art are minimized or by-passed/resolved. For instance, using the disclosed embodiments, the quality of veneer fed into process is inspected and graded during feeding operation. Therefore, defects can be identified before significant time and energy has been devoted to the panels, i.e., pressing is complete and panel quality is analyzed.

In addition, as noted, the disclosed embodiments include inspection and grading systems that are less error prone and lead to more accurate images of veneer sheets being taken, which can result in the system more accurately grading of veneer sheets without significantly slowing down the process.

In addition, using the methods and systems for producing layered wood products using local robotic panel assembly cells and vision system analysis disclosed herein there is the no need for traditional panel conveyors, traditional layered wood product panel assembly layup lines, nor stack press delivery lines. Therefore, the large physical size, e.g., hundreds of feet, of factory floor space required by prior art methods and systems are not needed.

In addition, since using the methods and systems for producing layered wood products using local robotic panel assembly cells and vision system analysis disclosed herein there is no need for traditional panel conveyors, traditional layered wood product panel assembly layup lines, nor stack press delivery lines, the thousands of moving parts and sensors required by prior art methods and systems are no longer required nor utilized. This makes the disclosed methods and systems for producing layered wood products much less maintenance intensive and is far less susceptible to failure.

In addition, since using the methods and systems for producing layered wood products using local robotic panel assembly cells and vision system analysis disclosed herein there is no need for traditional panel conveyors, traditional layered wood product panel assembly layup lines, nor stack press delivery lines, there is no need of the large number of electric motors and substantial power consumption required by prior art methods and systems. This makes the disclosed methods and systems for producing layered wood products less expensive to operate and a less of a drain on the environment.

In addition, since using the methods and systems for producing layered wood products using local robotic panel assembly cells and vision system analysis disclosed herein there is the no need for traditional panel conveyors, traditional layered wood product panel assembly layup lines, nor stack press delivery lines, the disclosed methods and systems are less manpower intensive for operation and maintenance. This makes the disclosed methods and systems for producing layered wood products not only less expensive to operate but also less subject to human error and potential injury.

In addition, unlike prior art methods and systems, any failure of any one of the substantially fewer moving parts required by the disclosed methods and systems for producing layered wood products, or any human error introduced, does not result in substantial product waste due to glue degradation, i.e., glue dry out. This is because using the methods and systems for producing layered wood products using local robotic panel assembly cells and vision system analysis disclosed herein the stacks of layered wood product panels are built locally and independently at the pressing stations so there is, at most, only one stack that may be lost if there is a failure in the associated pressing station. This means a loss of, at most, forty layered wood product panels, as compared to a potential loss of four hundred or more panels using prior art methods and systems.

In addition, unlike prior art methods and systems, using the methods and systems for producing layered wood products using local robotic panel assembly cells and vision system analysis disclosed herein material and glue systems can be configured to run multiple products at a time, i.e., multiple ply count panels and/or multiple types of product (plywood or PLV), at a time. This is because using the methods and systems for producing layered wood products using local robotic panel assembly cells and vision system analysis disclosed herein the stacks of layered wood product panels are built at the pressing stations independently of each other. Consequently, each pressing station has its own robot panel assembly cell and each robot panel assembly cell can be directed/controlled by control signals to assemble a different product.

In addition, unlike prior art methods and systems, using the methods and systems for producing layered wood products using local robotic panel assembly cells and vision system analysis disclosed herein glue application robots are used to assemble each stack. These glue application robots apply the glue by moving back and forth over the structure, as opposed to having the structure move beneath the glue applicator. Consequently, glue spread rates can be very precisely controlled and it is relatively simple to make fine adjustments to the amount of glue applied to compensate for ambient temperature, line speed changes, etc.

In addition, unlike prior art methods and systems, using the methods and systems for producing layered wood products using local robotic panel assembly cells and vision system analysis disclosed herein the robot panel assembly cells and robot control systems can be used to make a direct correlation between individual panel quality and the assembly process variables/control signals used for construction of that specific panel.

In addition, since using the methods and systems for producing layered wood products using local robotic panel assembly cells and vision system analysis disclosed herein there is no need for traditional panel conveyors, traditional layered wood product panel assembly layup lines, nor stack press delivery lines, housekeeping, i.e., keeping the workplace clean and safe, is a much simpler since the assembly locations are static and of relatively small physical size. In addition, since using the methods and systems for producing layered wood products using local robotic panel assembly cells and vision system analysis disclosed herein each robot panel assembly cell can operate a local robot panel assembly and pressing line completely independently of other local robot panel assembly and pressing lines, when keep up is required at one local robot panel assembly and pressing line, only that local and independently operating robot panel assembly and pressing line need be shut down while the other local robot panel assembly and pressing lines continue to operate.

In addition, since the disclosed method and system for producing layered wood products includes an vision system and a veneer inspection/grading robot for analysis of wood products to determine the quality of veneer fed into process during feeding operation, defects can be detected, and the veneer sheets can be graded before significant time and energy has already been devoted to the panels.

As a result of these and other disclosed features, which are discussed in more detail below, the disclosed embodiments address the short comings of the prior art.

BRIEF DESCRIPTION OF THE DRAWINGS

FIGS. 2A-2C show illustrations of a prior art line scan system.

Figure 1:
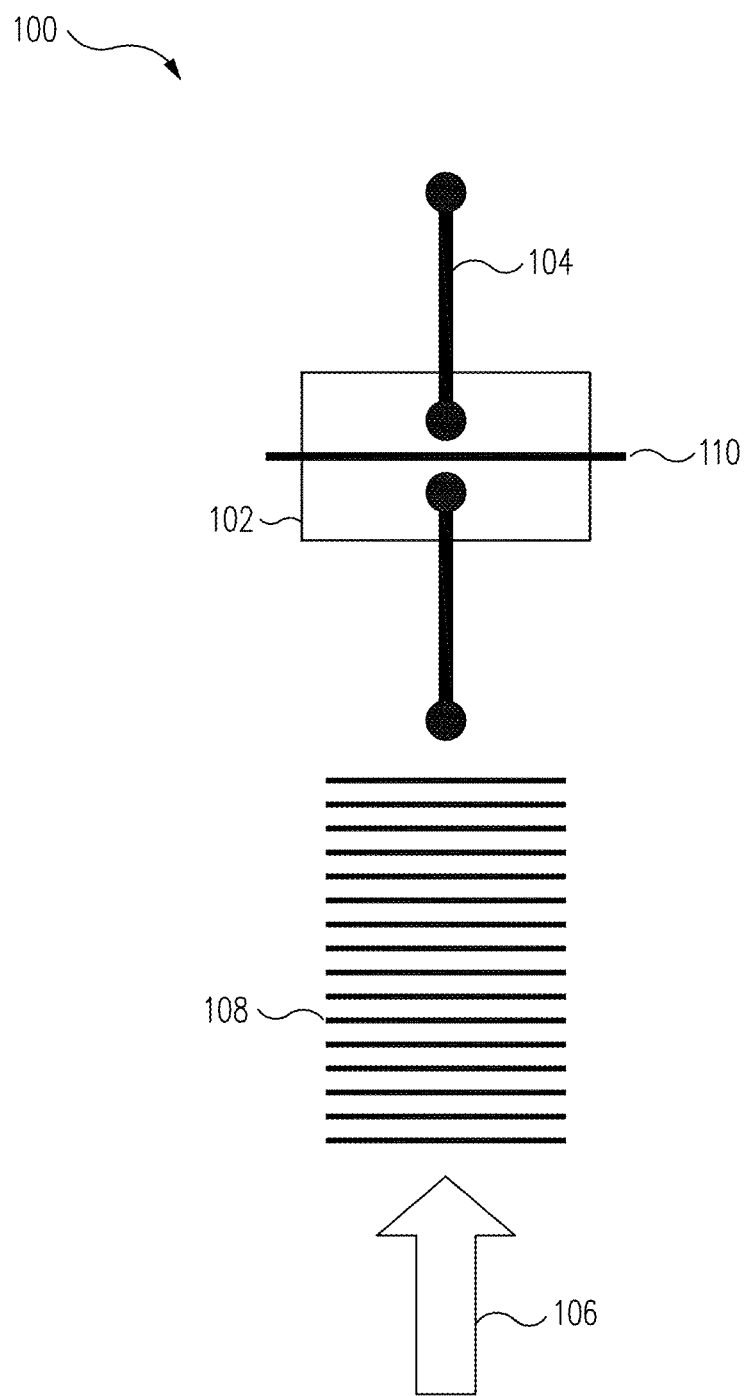
FIG. 1 shows a block diagram of a prior art system for grading veneer.

Common reference numerals are used throughout the figures and the detailed description to indicate like elements. One skilled in the art will readily recognize that the above figures are merely illustrative examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying figures, which depict one or more exemplary embodiments. Embodiments may be implemented in many different forms and should not be construed as limited to the embodiments set forth herein, shown in the figures, or described below. Rather, these exemplary embodiments are provided to allow a complete disclosure that conveys the principles of the invention, as set forth in the claims, to those of skill in the art.

The disclosed embodiments of methods and systems for layered wood product production include a local robotic panel assembly and pressing system. In one embodiment, the disclosed local robotic panel assembly and pressing system includes one or more local robotic panel assembly cells. In one embodiment, at least one local robotic panel assembly cell includes one or more vision systems for veneer grading; one or more veneer handling robots; one or more glue application robots; and, in some embodiments, one or more core handling robots. According to the disclosed embodiments, the local robotic panel assembly cells are used to independently produce stacks of layered wood product panels at static positions at, or near, the pressing stations. Consequently, the disclosed local robotic panel assembly cells replace the prior art/traditional panel conveyors, traditional layered wood product panel assembly layup lines, and stack press delivery lines discussed above with respect to FIGS. 3A through 3H. This, in turn, eliminates thousands of moving parts and dozens of people from the layered wood product production process. In addition, using the disclosed embodiments, hundreds of square feet of factory floor space traditionally used in the layered wood product production process are no longer required.

Consequently, using the disclosed embodiments, many of the shortcomings of prior art are minimized or by-passed/resolved. In addition, as discussed below, using the disclosed embodiments, not only are there significant cost savings in the layered wood product production process, but the resulting layered wood products produced using the disclosed embodiments are of a higher and more consistent quality.

Figure 4A:
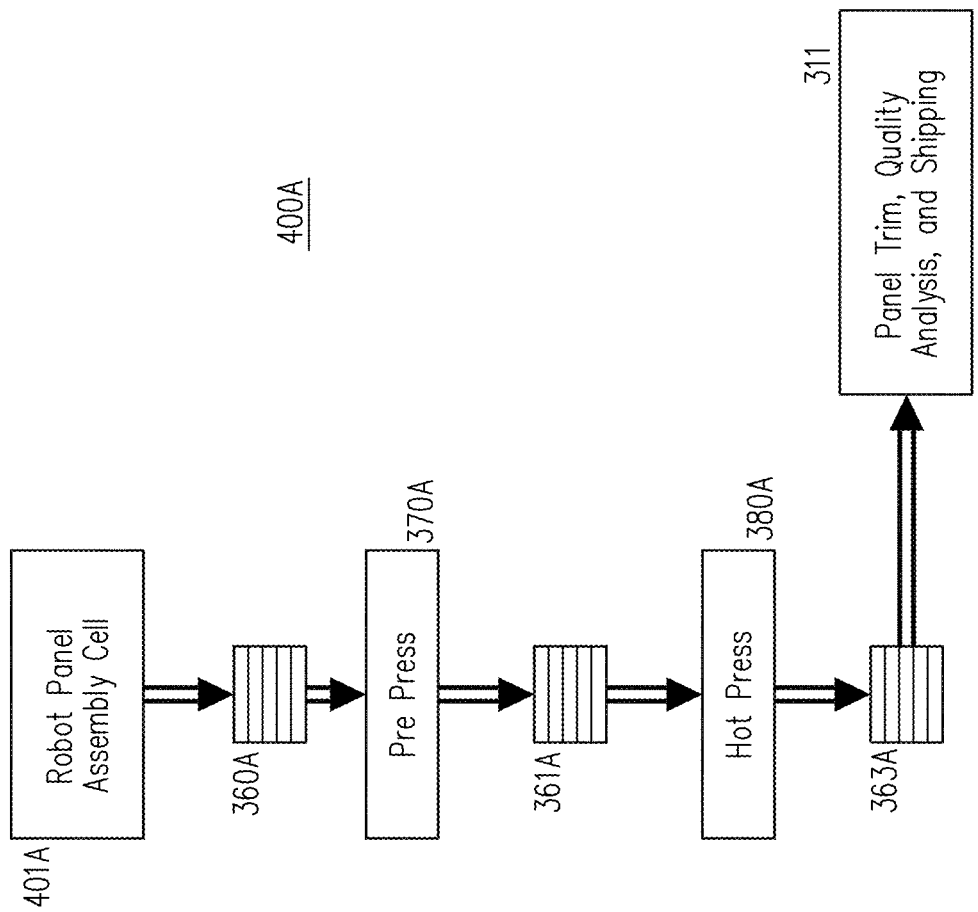
FIG. 4A is a diagram of a local robotic panel assembly and pressing station in accordance with one embodiment.

FIG. 4A is a high-level diagram of a local robotic panel assembly and pressing station 400A in accordance with one embodiment. As seen in FIG. 4A, local robotic panel assembly and pressing station 400A includes robot panel assembly cell 401A that is used to create green panel stacks, such as green panel stack 360A.

Figure 3A:
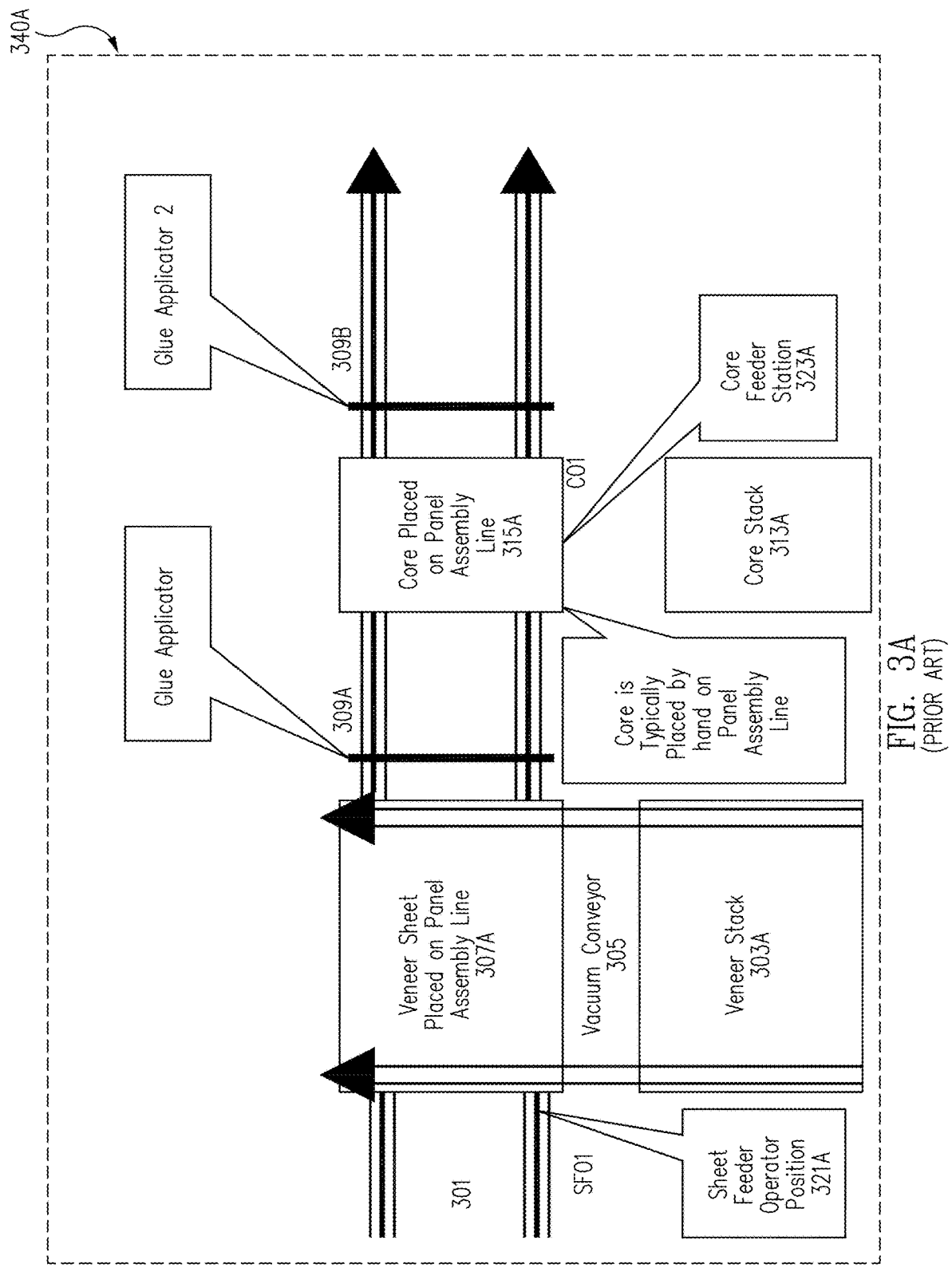
FIG. 3A is a diagram representing prior art layered wood product panel assembly layup feeder station.
Figure 3B:
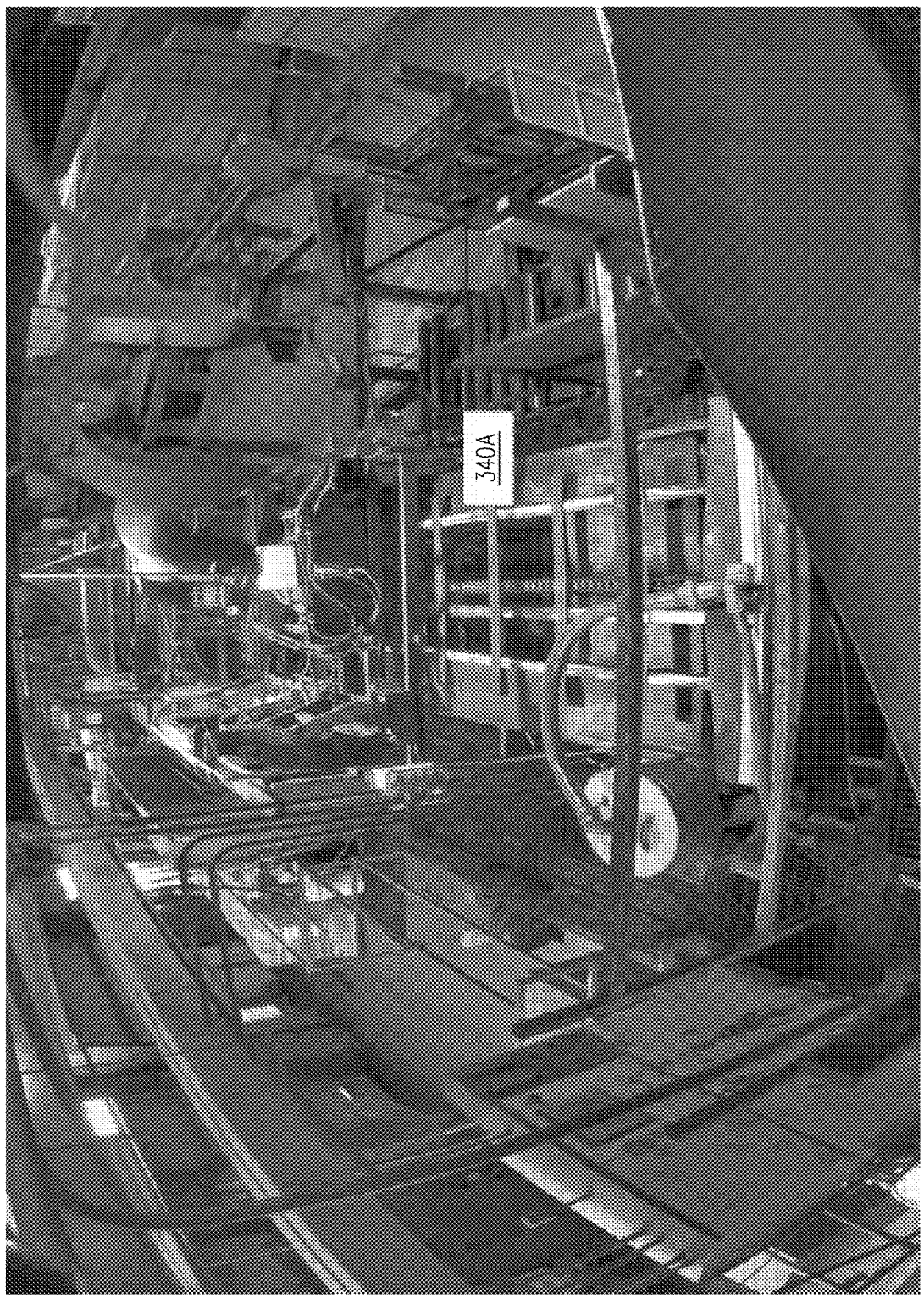
FIG. 3B is a photograph of an actual traditional layered wood product panel assembly layup feeder station such as that diagramed in FIG. 3A.
Figure 3C:
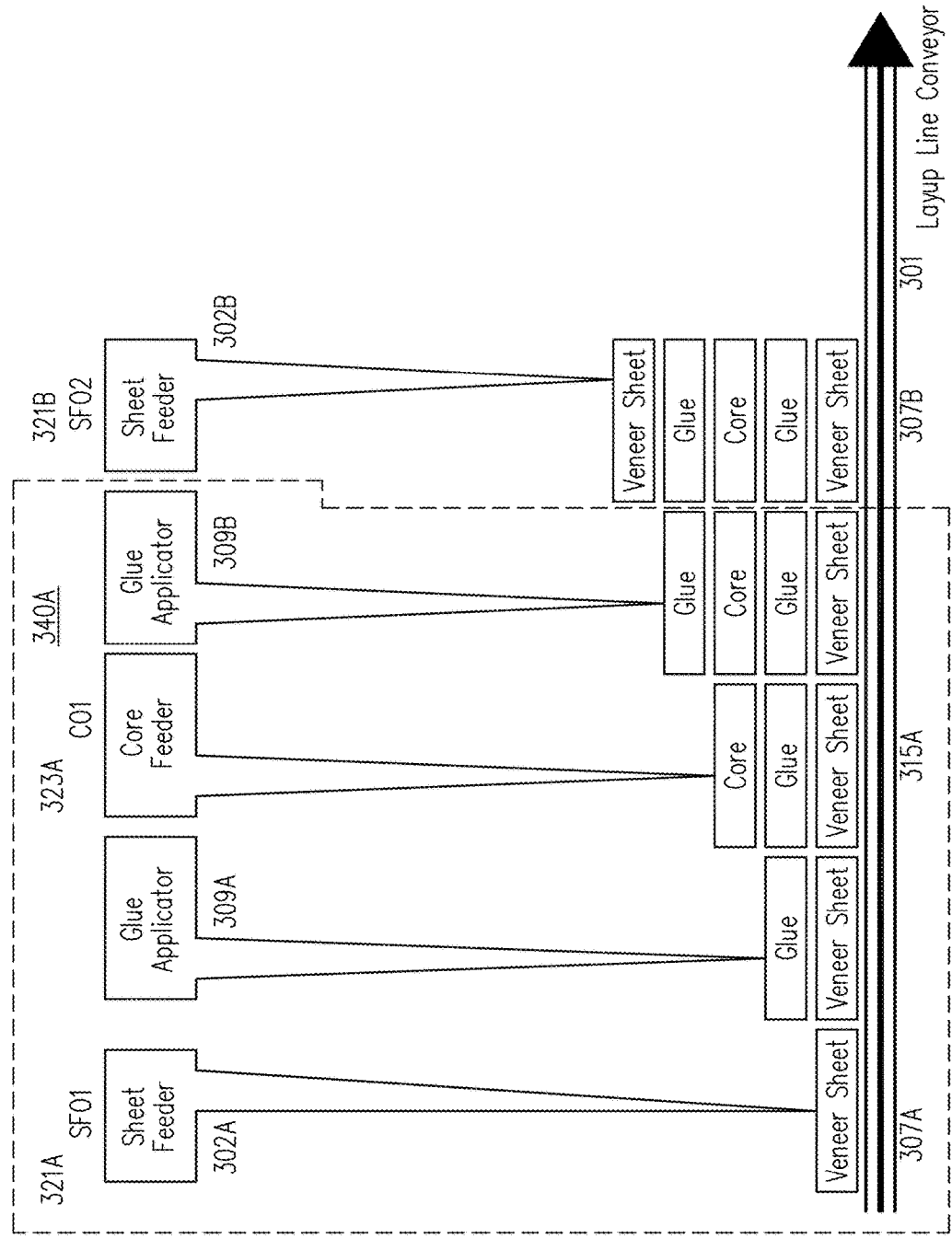
FIG. 3C is a diagram representing a side view of the formation of layers, or plys, being created using a prior art layered wood product panel assembly layup feeder station.
Figure 3D:
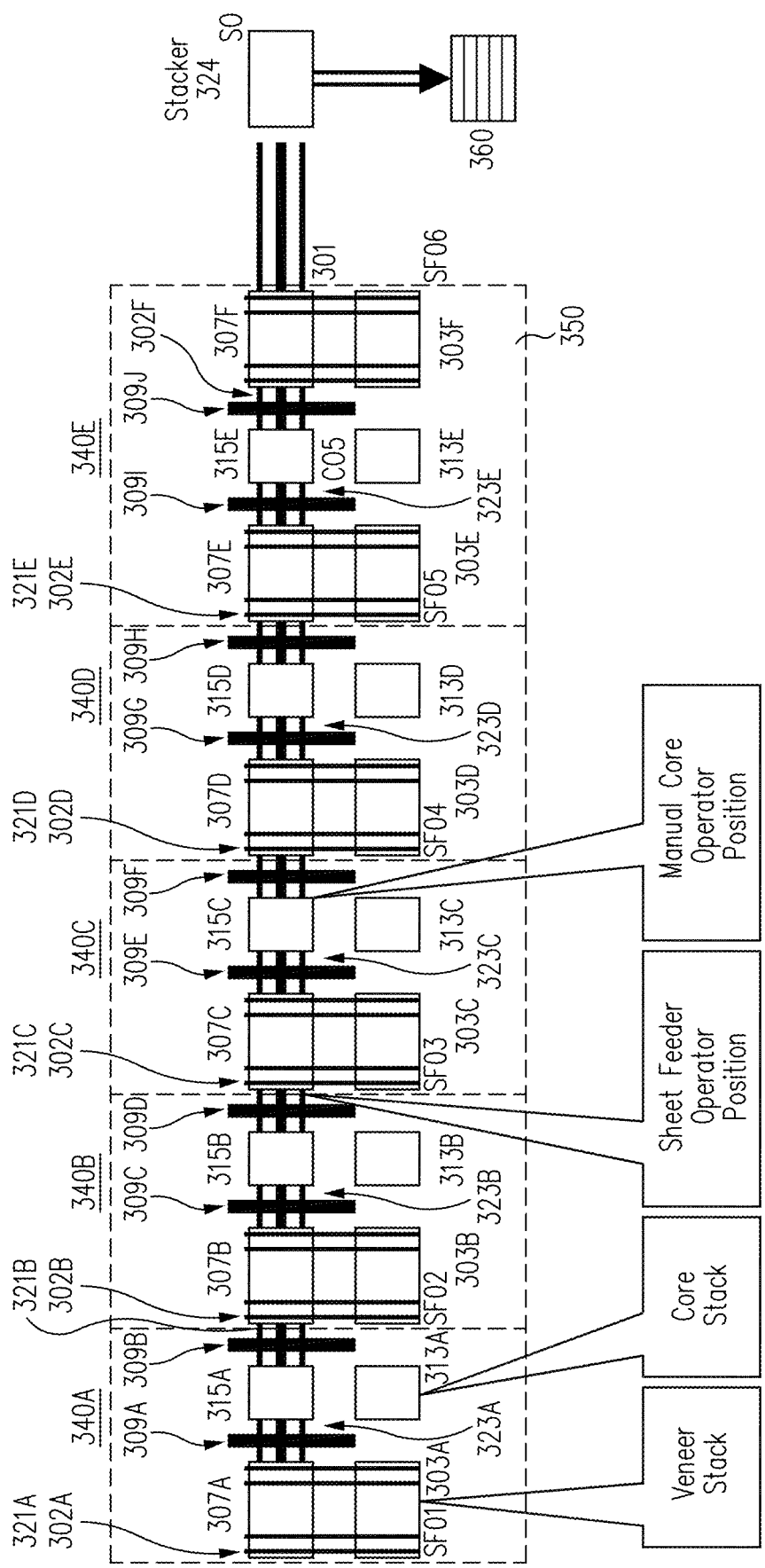
FIG. 3D is a diagram representing a prior art layered wood product panel assembly layup line including five prior art layered wood product panel assembly layup feeder stations.
Figure 3E:
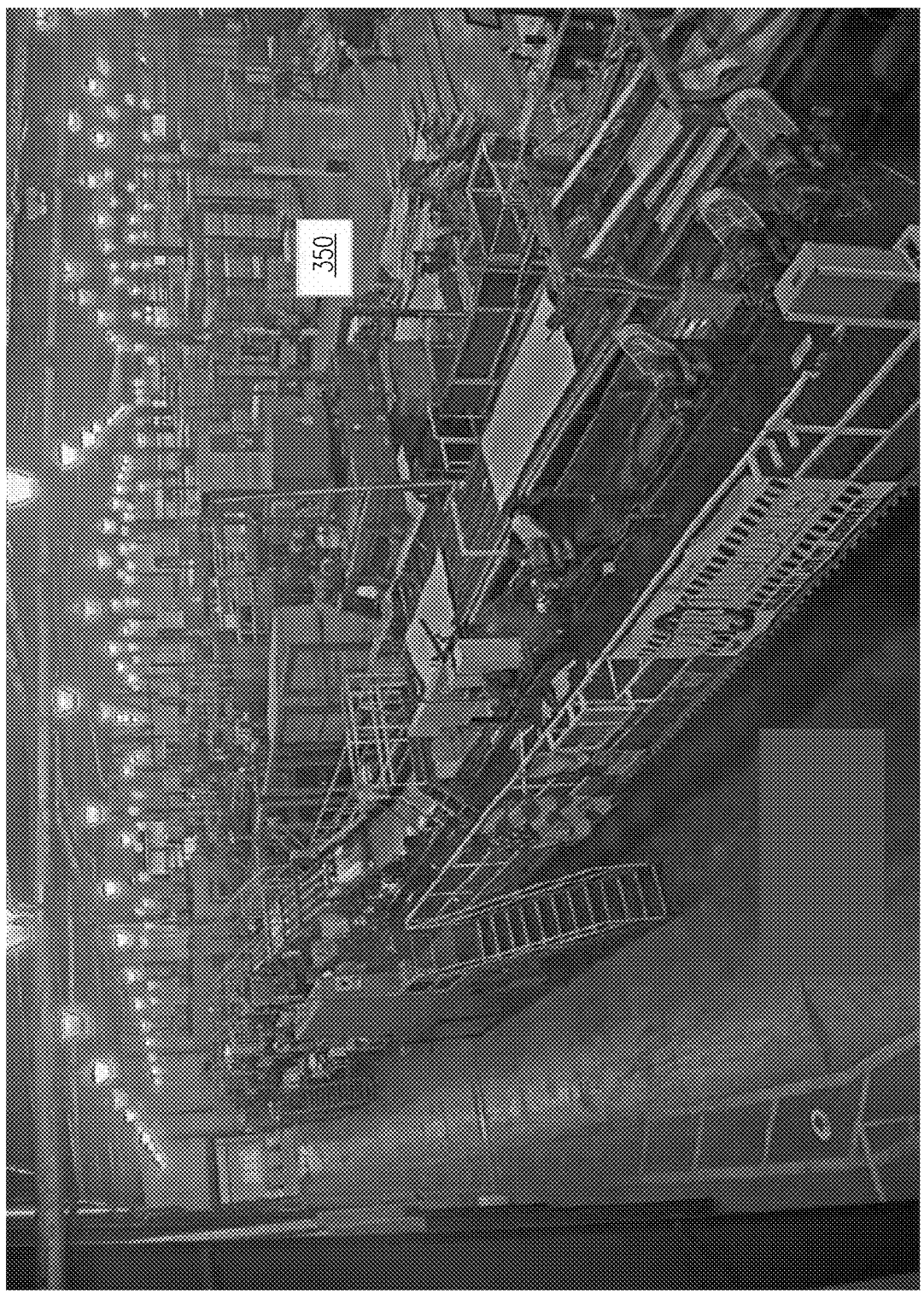
FIG. 3E is a photograph of an actual prior art layered wood product panel assembly layup line including five prior art layered wood product panel assembly layup feeder stations such as that diagramed in FIG. 3D.
Figure 3F:
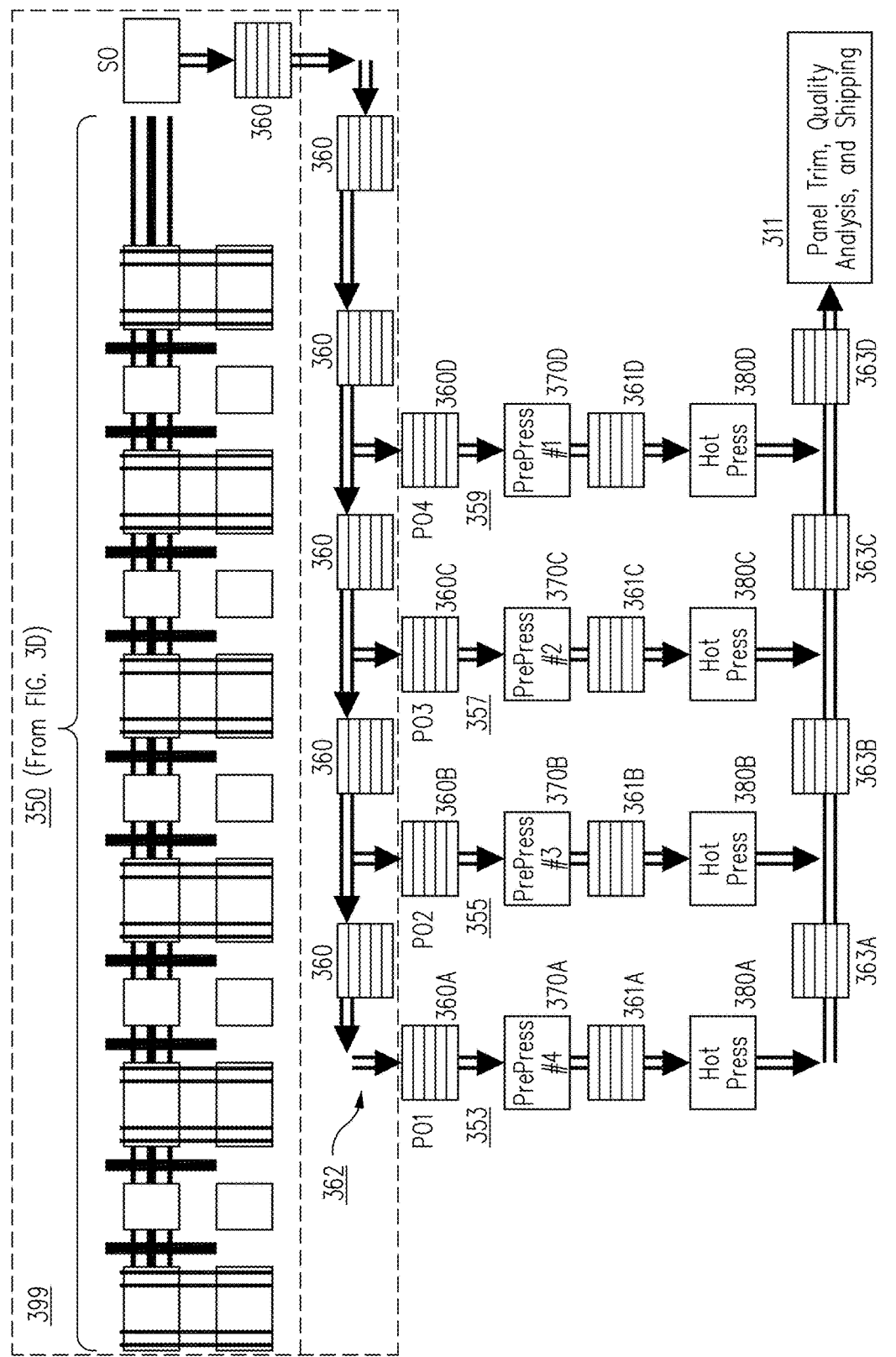
FIG. 3F is a diagram representing a prior art layered wood product panel assembly layup and press line including the prior art layered wood product panel assembly layup line of FIG. 3D and a press area including four pressing stations.
Figure 3H:
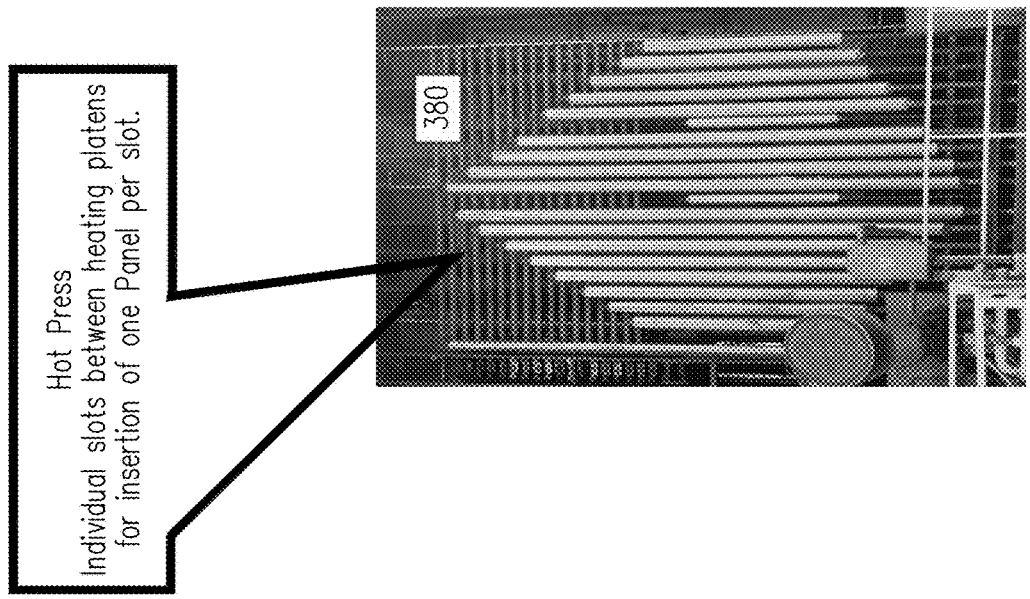
FIG. 3H is a photograph of an actual hot press such as any of the hot presses as any of the pre-presses of any of the FIGS. included herein.
Figure 3G:
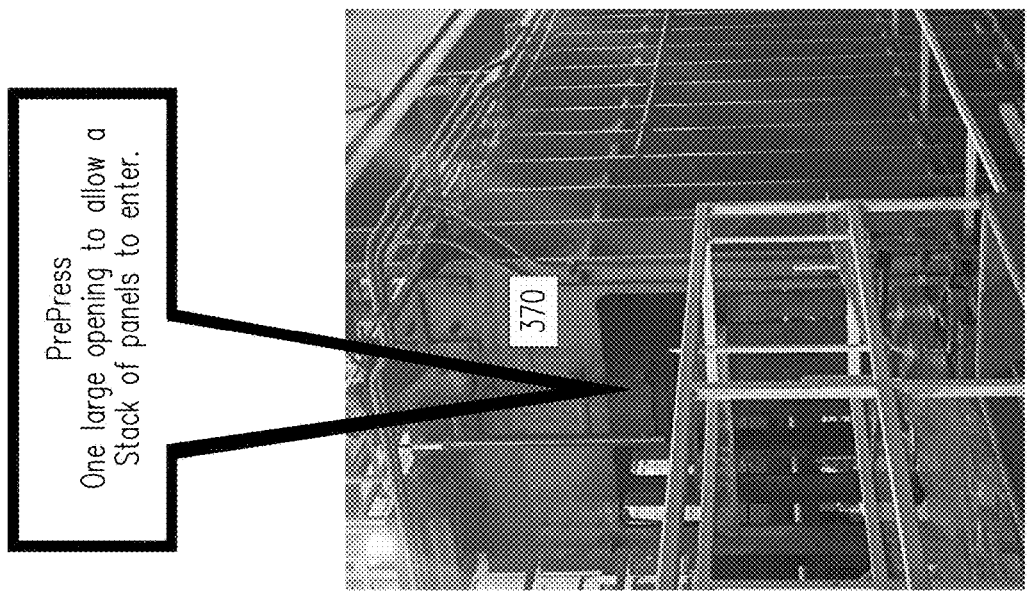
FIG. 3G is a photograph of an actual pre-press such as any of the pre-presses of any of the FIGS. included herein.

It is worth noting that green panel stack 360A of FIG. 4A produced by robot panel assembly cell 401A is virtually identical to green panel stack 360A of FIG. 3F, or any of the green panel stacks 360 of FIG. 3D or FIG. 3F, except that the veneer sheets used are more accurately inspected and graded. Consequently, robot panel assembly cell 401A literally replaces all of the prior art structure shown in as FIG. 3D and the stack production and processing section 399 of FIG. 3F, including traditional layered wood product panel assembly layup line 350 and stack press delivery line 362. This alone means that local robotic panel assembly and pressing station 400A eliminates the need for hundreds of square feet of floor space, thousands of moving parts, multiple sensors and motors, and dozens of sub-assemblies and human operators and produces a product that is composed of veneer sheets that are more accurately inspected and graded.

As also seen in FIG. 4A, once robot panel assembly cell 401A creates green panel stack 360A, green panel stack 360A is transferred to pre-press 370A and green panel stack 360A is loaded into pre-press 370A where the green panel stack 360A is subjected to cold pre-pressing in the same pre-pressing process as discussed above. In the press 370A green panel stack 360A is pressed to flatten out the structure and force out any air pockets that may exist in the green panel stack 360A and to create pre-pressed stack 361A.

Once pre-pressed stack 361A is created, pre-pressed stack 361A is conveyed to an unstacking mechanism (not shown) which feeds the layered wood structure panels making up pre-pressed stack 361A one at a time into slots of hot press 380A and is then subjected to hot pressing in the same pre-pressing process as discussed above. At hot press 380A the layered wood structure panels making up pre-pressed stack 361A are subjected to further pressure and heat to further flatten and cure the layered wood structure panels making up pre-pressed stack 361A. The layered wood structure panels are then re-stacked to form cured layered wood panel product stack 363A.

Cured layered wood panel product stack 363A is then conveyed to panel trim, quality analysis, and shipping area 311 where the individual layered wood panels making up cured layered wood panel product stack 363A are trimmed to size, subjected to quality control analysis, and then shipped to customers.

As noted, the pressing and trimming/quality control/shipping process shown in FIG. 4A is virtually identical to the pressing and finishing/quality control/shipping process discussed above with respect to FIG. 3F. Thus, according to one embodiment, once robot panel assembly cell 401A creates green panel stack 360A, green panel stack 360A is processed in the same manner, and using the same equipment, as is used to traditionally process layered wood products. Consequently, existing cold and hot press equipment need not be replaced. Therefore, the use of the disclosed local robotic panel assembly and pressing station 400A results in eliminating the need for hundreds of square feet of floor space, thousands of moving parts, multiple sensors and motors, and dozens of sub-assemblies and human operators of the prior art structure shown in as FIG. 3D and the stack production and processing section 399 of FIG. 3F, while still minimizing the amount of processing equipment that must be replaced.

According to the disclosed embodiments, multiple local robotic panel assembly and pressing stations, such as local robotic panel assembly and pressing station 400A, can be operated at once, and independently, to form a robotic panel assembly and pressing system 420.

Figure 4B:
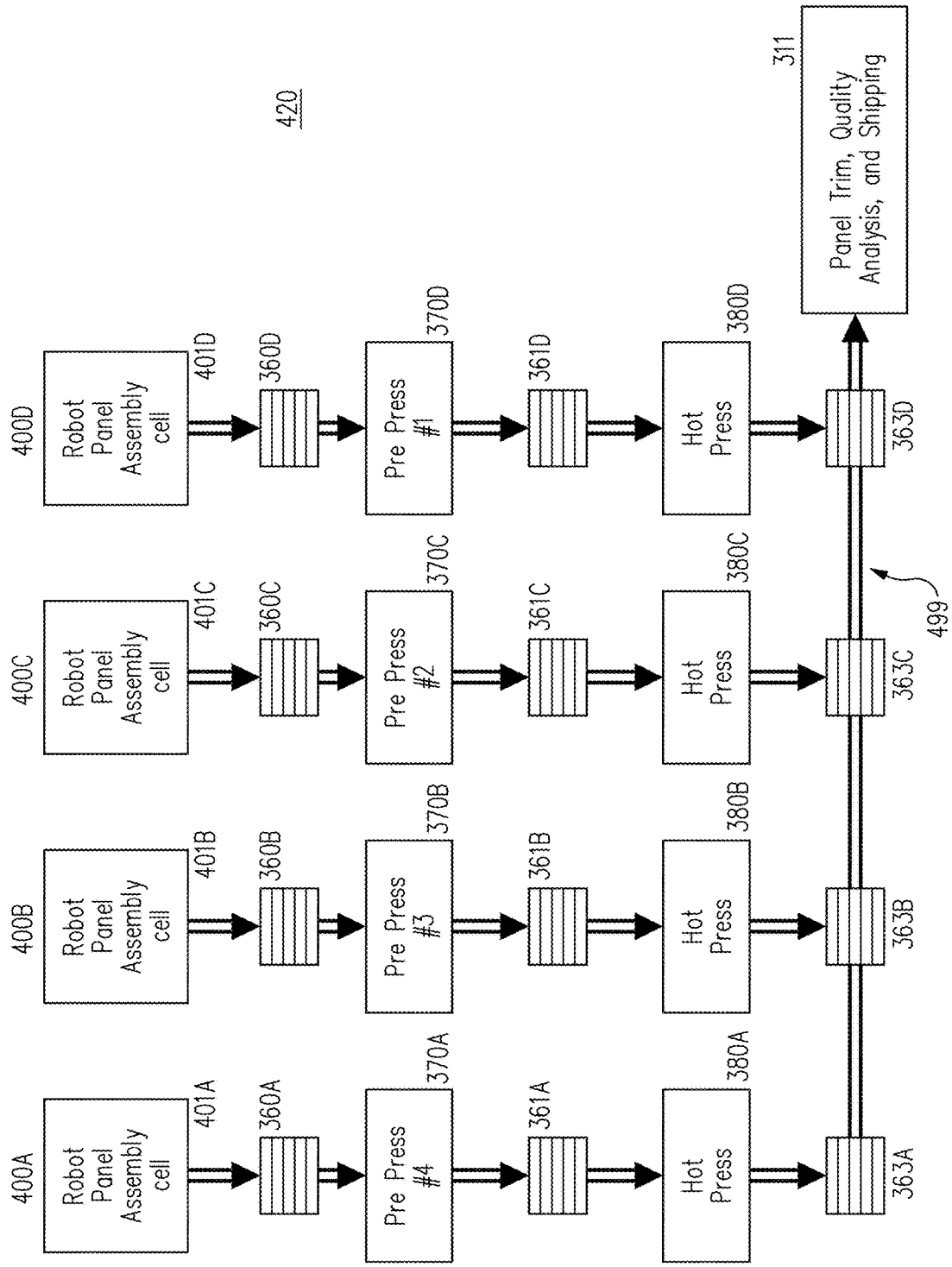
FIG. 4B is a diagram of a robotic panel assembly and pressing system including four local robotic panel assembly and pressing stations in accordance with one embodiment.

FIG. 4B is a diagram of a robotic panel assembly and pressing system 420 including four local robotic panel assembly and pressing stations 400A through 400D in accordance with one embodiment. In practice, the number of local robotic panel assembly and pressing stations can be fewer, or more, than the four shown in FIG. 4B.

As seen in FIG. 4B, each of local robotic panel assembly and pressing stations 400A, 400B, 400C, and 400D includes its own independently operating robot panel assembly cell 401A, 401B, 401C, and 401D, respectfully, that are used to independently create green panel stacks 360A, 360B, 360C, and 360D.

It is worth noting again that green panel stacks 360A, 360B, 360C, and 360D of FIG. 4B produced by local robot panel assembly cells 401A, 401B, 401C, and 401D are virtually identical to green panel stacks 360A, 360B, 360C, and 360D of FIG. 3F, except that the veneer sheets used are accurately inspected and graded. Consequently, the set of local robot panel assembly cells 401A, 401B, 401C, and 401D literally replaces all of the prior art structure shown in as FIG. 3D and the stack production and processing section 399 of FIG. 3F, including traditional layered wood product panel assembly layup line 350 and stack press delivery line 362. This alone means that the set of local robotic panel assembly and pressing stations 400A, 400B, 400C, and 400D eliminates the need for hundreds of square feet of floor space, thousands of moving parts, multiple sensors and motors, and dozens of sub-assemblies and human operators.

As also seen in FIG. 4B, once local robot panel assembly cells 401A, 401B, 401C, and 401D create green panel stacks 360A, 360B, 360C, and 360D, green panel stacks 360A, 360B, 360C, and 360D are transferred to pre-presses 370A, 370B, 370C, and 370D, respectively, where the green panel stacks 360A, 360B, 360C, and 360D are subjected to cold pre-pressing. In the pre-presses 370A, 370B, 370C, and 370D, green panel stacks 360A, 360B, 360C, and 360D are pressed to flatten out the structures and force out any air pockets that may exist in the green panel stacks 360A, 360B, 360C, and 360D and to create pre-pressed stacks 361A, 361B, 361C, and 361D by the same pre-pressing process as discussed above.

Once pre-pressed stacks 361A, 361B, 361C, and 361D are created, pre-pressed stacks 361A, 361B, 361C, and 361D are conveyed into one or more unstacking mechanisms (not shown) which feed one layered wood structure panel at a time from the pre-pressed stacks 361A, 361B, 361C, and 361D into slots of one or more multi opening hot presses 380A, 380B. 380C, and 380D, respectively. At hot presses 380A, 380B, 380C, and 380D the layered wood structure panels making up pre-pressed stacks 361A, 361B, 361C, and 361D are subjected to further pressure and heat to further flatten and cure the layered wood structure panels making up pre-pressed stacks 361A, 361B, 361C, and 361D by the same hot pressing process as discussed above. Then the layered wood structure panels are re-stacked resulting in cured layered wood panel product stacks 363A, 363B, 363C, and 363D, respectively.

Cured layered wood panel product stacks 363A, 363B, 363C, and 363D are then conveyed by conveyor 499 to panel trim, quality analysis, and shipping area 311 where the individual layered wood panels making up cured layered wood panel product stacks 363A, 3634B, 363C, and 363D are trimmed to size, subjected to quality control analysis, and then shipped to customers.

The pressing and trimming/quality control/shipping process shown in FIG. 4B is virtually identical to the pressing and finishing/quality control/shipping process discussed above with respect to FIG. 3F. Thus, according to one embodiment, once robot panel assembly cells 401A, 401B, 401C, and 401D create green panel stacks 360A, 360B, 360C, and 360D, green panel stacks 360A, 360B, 360C, and 360D are processed by local robotic panel assembly and pressing stations 400A through 400D in the same manner, and using the same equipment, as used to traditionally process layered wood products. Consequently, existing cold and hot press equipment need not be replaced. Therefore, the use of the disclosed robotic panel assembly and pressing system 420 results in eliminating the need for hundreds of square feet of floor space, thousands of moving parts, multiple sensors and motors, and dozens of sub-assemblies and human operators of the prior art structure shown in FIG. 3D and the stack production and processing section 399 of FIG. 3F, while still minimizing the amount of processing equipment that must be replaced.

In addition, robotic panel assembly and pressing system 420 has several other processing advantages over prior art systems. First, recall that using prior systems such as that shown in FIG. 3F, in addition to the cost of operating traditional layered wood product panel assembly layup and press line 351, including stack production and processing section 399, i.e., traditional layered wood product panel assembly layup line 350 and stack press delivery line 362, there was a significant cost associated with any delays in traditional layered wood product panel assembly layup and press line 351. These delays included delays due to failure of any of the thousands of moving parts associated with traditional layered wood product panel assembly layup and press line 351, and particularly stack production and processing section 399, or any human error introduced by the twelve or more people required to operate traditional layered wood product panel assembly layup and press line 351.

Further recall that, referring to FIGS. 3D and 3F together, when a delay occurred, for whatever reason, the layers of glue applied by glue applicators 309A through 309J could dry out before the green panel stacks 360 reached the pressing stations 353 through 359. This, in turn, resulted in layered wood product panels that could separate or otherwise fail because the glue could not cure and adhere the layers properly. Unfortunately, this resulted in significant loss of product using traditional layered wood product panel assembly layup and press line 351. Using prior art/traditional systems and methods there is an average loss of product to defects of ten percent or more using traditional layered wood product panel assembly layup and press line 351.

However, referring back to FIG. 4B, in direct contrast to prior art systems, using independently operating robotic panel assembly and pressing system 420, the green panel stacks 360A, 360B, 360C, and 360D are independently built at individual static locations at, or near, the pressing area by individual and independently operating robot panel assembly cells 401A, 401B, 401C, and 401D. Consequently, using robotic panel assembly and pressing system 420 if there is a delay in any of the local robotic panel assembly and pressing stations 400A through 400D, the delay only affects the panels being processed by that particular local robotic panel assembly and pressing station, i.e., only one of pressing stations 400A through 400D. As a result, any such delay can, at most, cause a single stack of panels to be lost. This is in direct contrast to the multiple stacks that can be lost as a result of delays in traditional layered wood product panel assembly layup and press line 351. The product savings can literally be an order of magnitude or more as a delay in traditional layered wood product panel assembly layup and press line 351 can result in the loss of four hundred or more individual layered wood product panels while a delay in any of local robotic panel assembly and pressing stations 400A through 400D would typically result in, at most, forty individual layered wood product panels.

In addition, as noted above, using prior art methods and systems for producing layered wood products, such as using traditional layered wood product panel assembly layup and press line 351, material and glue systems are configured to run a single product at a time, i.e., only a single ply count panel, or single type of product (plywood or PLV), at a time. Changing products required stopping the machine, removing all in process material, and then reconfiguring controls for new product construction.

However, and again in direct contrast to prior art systems, using robotic panel assembly and pressing system 420, and local robotic panel assembly and pressing stations 400A through 400D, the green panel stacks 360A, 360B, 360C, and 360D are built independently at individual static locations at, or near, the pressing area by individual robot panel assembly cells 401A, 401B, 401C, and 401D. As a result, each of the local robotic panel assembly and pressing stations 400A through 400D can independently generate different products. Consequently, each of the local robotic panel assembly and pressing stations 400A through 400D can produce different ply count panels, or different types of products, plywood or PLV, made of different grades of veneer, independently and at the same time.

The fact that using robotic panel assembly, and pressing system 420, local robotic panel assembly and pressing stations 400A through 400D, green panel stacks 360A, 360B, 360C, and 360D are built at independently operating individual static locations at or near the pressing area by individual robot panel assembly cells 401A, 401B, 401C, and 401D eliminates the issues discussed above associated with prior art systems where it was critical to ensure coordination between the stacker operator SO and each of the press operators PO1, PO2, PO3, and PO4 of FIGS. 3D and 3F so that the wrong size stacks were not loaded into a pre-press or hot press that is unable to process them.

Figure 4C:
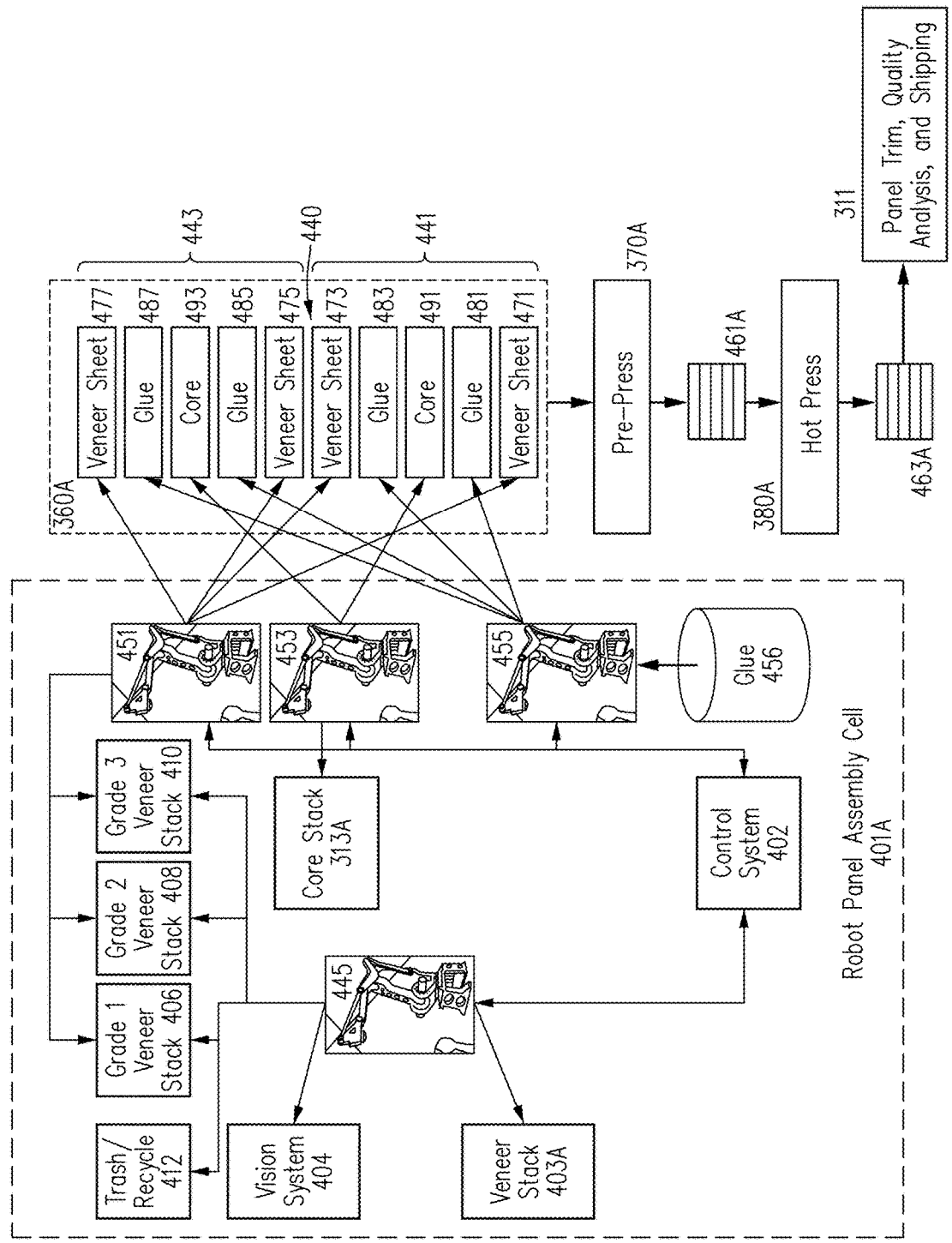
FIG. 4C is a diagram of a local robot panel assembly cell of FIGS. 4A and 4B including a vision system for veneer inspection and grading in accordance with one embodiment.

FIG. 4C is a diagram of a local robot panel assembly cell 401A of FIGS. 4A and 4B that includes a vision system 404 for veneer inspection and grading and multiple graded veneer stacks 406, 408, 410 and 412 in accordance with one embodiment.

In operation, before veneer sheets from veneer stack 403A are made available to veneer handling robot 451 the veneer sheets are retrieved by veneer inspection/grading robot 445 which is representative of one or more veneer inspection/grading robots. Veneer inspection/grading robot 445 then presents each veneer sheet to the vision system 404 in accordance with control signals from robot control system 402.

At the vision system 404 the veneer sheets are inspected and assigned a grade based on the inspection results. In one embodiment, based on the grade assigned to each veneer sheet, each veneer sheet is placed in one of graded veneer stacks, such as graded veneer stacks 406, 408, 410 and 412 of FIG. 4C by veneer inspection/grading robot 445. In one embodiment, veneer stack 406 is a grade 1 veneer stack that includes veneer sheets that are deemed to be of acceptable appearance and quality to be used for outer veneer layers of a layered wood panel. In one embodiment, veneer stack 408 is a grade 2 veneer stack that includes veneer sheets that are deemed to be of acceptable structural quality to be used for inner veneer layers of a layered wood panel but perhaps lack the appearance to be used as outer layers of a layered wood panel. In one embodiment, veneer stack 410 is a grade 3 veneer stack that includes veneer sheets that are deemed to have structural anomalies, such as knot holes, and therefore must be sparingly used for inner veneer layers of a layered wood panel and perhaps must be sandwiched between higher grade veneer sheets to provide adequate structural quality for the layered wood panel. Finally, in one embodiment, trash 412 contains veneer sheets of unacceptable quality.

By grading veneer sheets from veneer stack 403A and stacking the veneer sheets according to grade, the quality of veneer fed into process during feeding operation is determined before resources are expended processing the veneer, i.e., defects can be detected in the veneer sheets, and the veneer sheets can be graded, and allocated for their best use, before significant time and energy is devoted to their use in processed panels.

Once the veneer sheets from veneer stack 403A are inspected/graded by vision system 404, and the sheets are placed in appropriate graded veneer stacks 406, 408, 410 and 412 by veneer inspection/grading robot 445, veneer handling robot 451 is directed by control signals from robot control system 402 to retrieve veneer sheet 471 from the appropriate graded veneer stack 406, 408, 410 and place the veneer sheet 471 on green panel stack 360A.

Then glue application robot 455 is directed by the control signals from robot control system 402 to apply a layer of glue 481 from glue reservoir 456 to veneer sheet 471.

In embodiments where robotic panel assembly cell 401A is used to create green plywood panels, then core handling robot 453 is directed by the control signals from robot control system 402 to retrieve core material from core stack 313A and place a portion of core material on green panel stack 360A to create core layer 491.

Glue application robot 455 is then directed by the control signals from robot control system 402 to apply a layer of glue 483 from glue reservoir 456 on core layer 491. Then veneer handling robot 451 is directed by control signals from robot control system 402 to retrieve veneer sheet 473 from the appropriate graded veneer stack 406, 408, 410 and place the veneer sheet 473 on green layered wood product panel 360A.

Of note, in embodiments where robotic panel assembly cell 401A is used to produce green layered wood product stacks of other types of layered wood products, such as green PLV panels, core handling robot 453 is either deactivated or not present. In these cases, veneer handling robot 451 is directed by control signals from robot control system 402 to retrieve veneer sheet 471 from the appropriate graded veneer stack 406, 408, 410 and place the veneer sheet 471 on green panel stack 360A. Then glue application robot 455 is directed by the control signals from robot control system 402 to apply a layer of glue 481 from glue reservoir 456 to veneer sheet 471. Then veneer handling robot 451 is simply directed by control signals from robot control system 402 to retrieve another veneer sheet 473 from the appropriate graded veneer stack 406, 408, 410 and place the veneer sheet 473 on veneer sheet 471.

The result of the operations above is a single three-ply green layered wood product panel 441. As noted above, plywood, and other layered wood product panels often have twenty-one or more plys. However, for simplicity of illustration, green layered wood product panel 441 is a single three-ply green layered wood product panel 441.

Once green layered wood product panel 441 is constructed by robotic panel assembly cell 401A, robotic panel assembly cell 401A begins to construct a second green layered wood product panel 443 of green panel stack 360A. To this end, veneer handling robot 451 is again directed by control signals from robot control system 402 to retrieve veneer sheet 475 from the appropriate graded veneer stack 406, 408, 410 and place the veneer sheet 475 on the glue-free side of veneer sheet 473. Importantly, veneer handling robot 451 is directed by control signals from robot control system 402 to retrieve veneer sheet 475 from the appropriate graded veneer stack 406, 408, 410 and place the veneer sheet 475 on the veneer sheet 473 directly, without any glue layer being applied by glue application robot 455. This creates a dry veneer to veneer layer, or gap 440. Gap 440 therefore separates green layered wood product panel 441 and green layered wood product panel 443 in green panel stack 360A.

Then glue application robot 455 is directed by the control signals from robot control system 402 to apply a layer of glue 485 from glue reservoir 456 to veneer sheet 475. In embodiments where robotic panel assembly cell 401A is used to create green plywood panels, then core handling robot 453 is directed by the control signals from robot control system 402 to retrieve core material from core stack 313A and place a portion of core material on green panel stack 360A to create core layer 493. Then glue application robot 455 is directed by the control signals from robot control system 402 to apply a layer of glue 487 from glue reservoir 456 on core layer 493 Then veneer handling robot 451 is directed by control signals from robot control system 402 to retrieve veneer sheet 477 from the appropriate graded veneer stack 406, 408, 410 and place the veneer sheet 477 on green panel stack 360A.

Of note again, in embodiments where robotic panel assembly cell 401A is used to produce green layered wood product stacks of other types of layered wood products, such as green PLV panels, core handling robot 453 is either deactivated or not present. In these cases, veneer handling robot 451 is directed by control signals from robot control system 402 to retrieve veneer sheet 475 from the appropriate graded veneer stack 406, 408, 410 and place the veneer sheet 475 on green panel stack 360A. Then glue application robot 455 is directed by the control signals from robot control system 402 to apply a layer of glue 485 from glue reservoir 456 to veneer sheet 475. Then veneer handling robot 451 is simply directed by control signals from robot control system 402 to retrieve another veneer sheet 477 from the appropriate graded veneer stack 406, 408, 410 and place the veneer sheet 477 on veneer sheet 475.

The result of the operations above is a second single three-ply green layered wood product panel 443. The process above is then repeated to create the desired number of green layered wood product panel for green panel stack 360A. As noted above, it is not uncommon for green panel stack 360A to include forty or more individual green layered wood product panels.

It is worth noting again that green panel stack 360A of FIG. 4C produced by robot panel assembly cell 401A is virtually identical to green panel stack 360A of FIG. 3F, or any of the green panel stacks 360 of FIG. 3D or FIG. 3F, except that the veneer sheets used are accurately inspected and graded. Consequently, robot panel assembly cell 401A literally replaces all of the prior art structure shown in as FIG. 3D and the stack production and processing section 399 of FIG. 3F, including traditional layered wood product panel assembly layup line 350 and stack press delivery line 362.

This alone means that local robotic panel assembly and pressing station 400A eliminates the need for hundreds of square feet of floor space, thousands of moving parts, multiple sensors and motors, and dozens of sub-assemblies and human operators while producing a product that is of higher quality.

In addition, according to the disclosed embodiments, and in contrast to prior art systems, robot panel assembly cell 401A is located locally at, or near, pre-press 370A and hot press 380A. Therefore, green panel stack 360A is assembled by robot panel assembly cell 401A locally with respect to the pressing line. Consequently, robot panel assembly cell 401A assembles the same green panel stack 360A as any of the green panel stacks 360 of FIG. 3D or FIG. 3F locally with respect to pre-press 370A and hot press 380A and at a single location.

As seen in FIG. 4C, once robot panel assembly cell 401A creates green panel stack 360A, green panel stack 360A is transferred to pre-press 370A and green panel stack 360A is loaded into pre-press 370A where the green panel stack 360A is subjected to pre-pressing by the methods discussed above. In the cold press 370A green panel stack 360A is pressed to flatten out the structure and force out any air pockets that may exist in the green panel stack 360A and to create pre-pressed stack 361A.

Once pre-pressed stack 361A is created, pre-pressed stack 361A is conveyed to an unstacking mechanism (not shown) which feeds the layered wood structure panels making up pre-pressed stack 361A one at a time into slots of hot press 380A. At hot press 380A the layered wood structure panels making up pre-pressed stack 361A are subjected to further pressure and heat to further flatten and cure the layered wood structure panels making up pre-pressed stack 361A by the methods discussed above. The layered wood structure panels are then re-stacked to form cured layered wood panel product stack 363A.

Cured layered wood panel product stack 363A is then conveyed to panel trim, quality analysis, and shipping area 311 where the individual layered wood panels making up cured layered wood panel product stack 363A are trimmed to size, subjected to quality control analysis, and then shipped to customers.

The pressing and trimming/quality control/shipping process shown in FIG. 4C is virtually identical to the pressing and finishing/quality control/shipping process discussed above with respect to FIG. 3F. Thus, according to one embodiment, once robot panel assembly cell 401A creates green panel stack 360A, green panel stack 360A is processed in the same manner, and using the same equipment, as is used to traditionally process layered wood products. Consequently, existing cold and hot press equipment need not be replaced. Therefore, the use of the disclosed local robotic panel assembly and pressing station 400A results in eliminating the need for hundreds of square feet of floor space, thousands of moving parts, multiple sensors and motors, and dozens of sub-assemblies and human operators of the prior art structure shown in as FIG. 3D and the stack production and processing section 399 of FIG. 3F, while still minimizing the amount of processing equipment that must be replaced.

As noted above, veneer is a type of wood product that is manufactured into sheets. As they are manufactured, various defects may exist in the veneer sheets. Depending on the number and type of defects on a particular sheet of veneer, that sheet may be unsatisfactory for use in particular applications. Accordingly, sheets of veneer are typically graded following manufacture and the grade determines the value and the possible uses that a sheet of veneer is suitable for. Grading of veneer is typically automated and performed by machines. A grade assigned to a sheet of veneer can be used to determine its best use; for example, whether it is suitable as a face sheet for plywood, whether it is suitable for clipping and edge gluing to form a sheet, whether it is suitable for use in laminated wood beams, should be discarded, or suitable for other uses.

Figure 5:
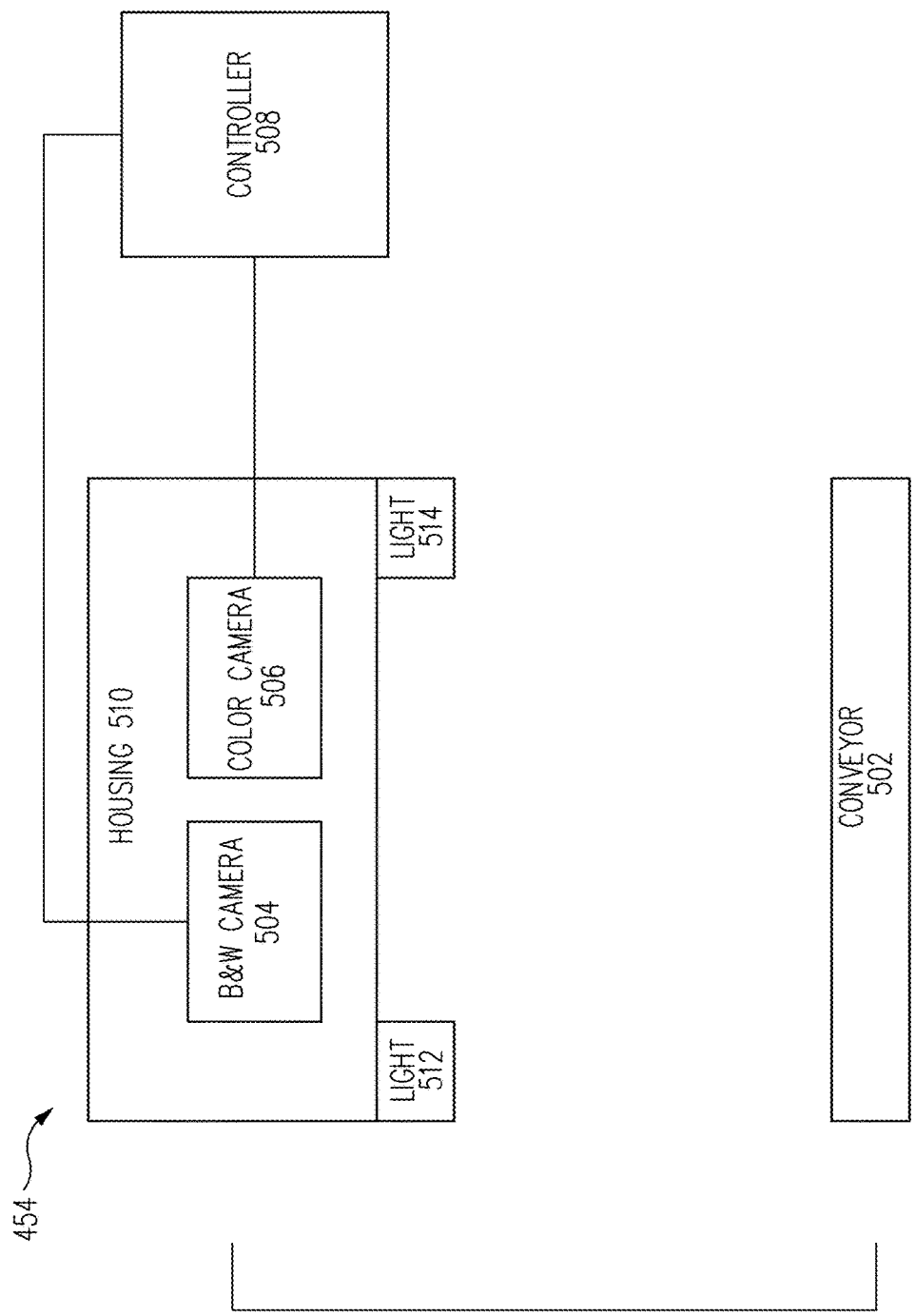
FIG. 5 shows a block diagram of an example of the vision system for veneer inspection and grading of FIG. 4C including in accordance with this disclosure.
Figure 6:
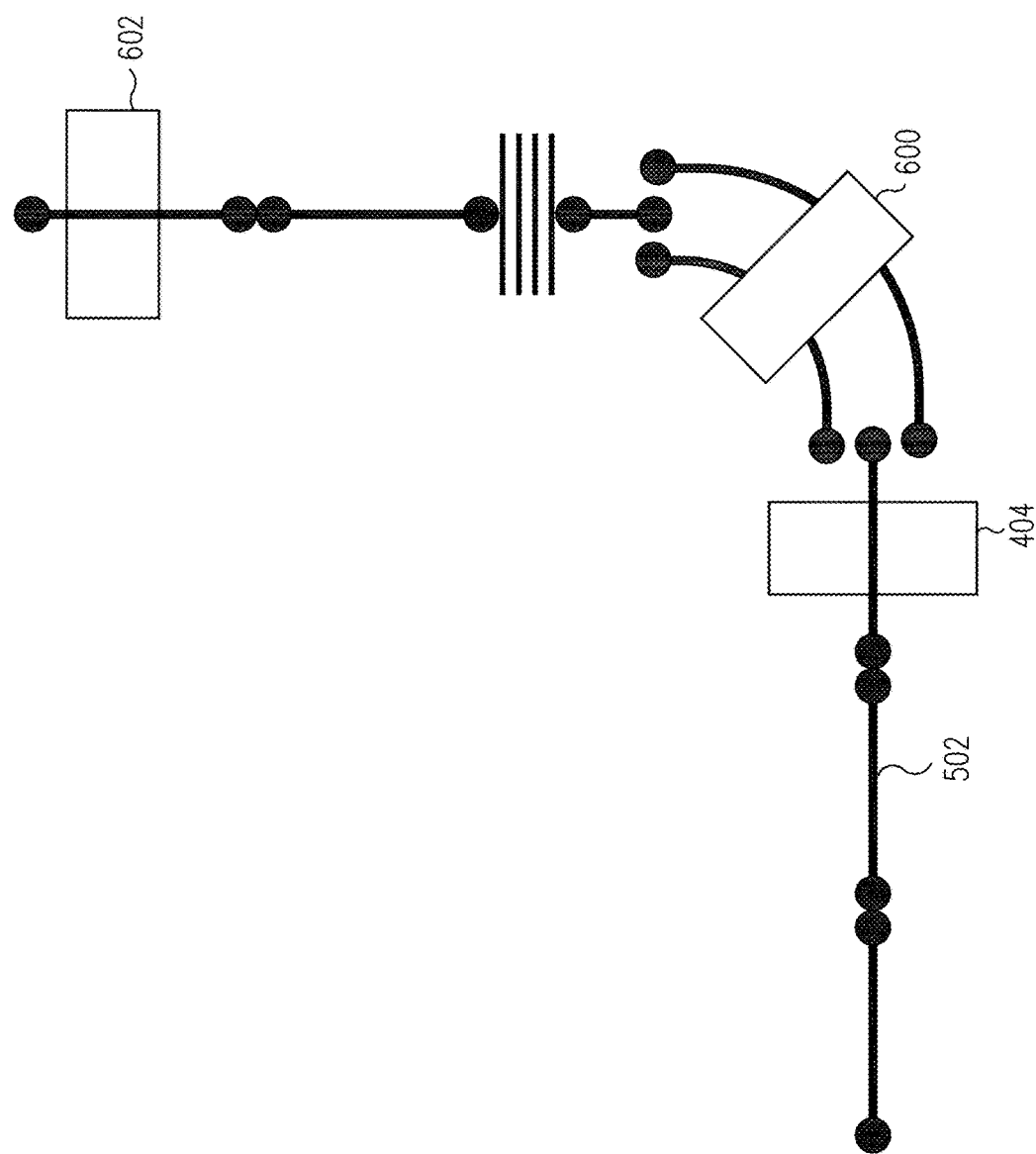
FIG. 6 shows a block diagram of an example conveyor for use with the vision system of FIG. 5.

FIG. 5 shows a block diagram of the vision or imaging system 404 of FIG. 4C in accordance with this disclosure for grading veneer according to one embodiment. In the example of FIG. 5, the vision system 404 can grade veneer sheets or other wood materials as they move along a conveyor 502 of a production line, as shown in FIG. 6. For convenience, the focus of the description below is on the use of the system with veneer, without excluding the use in connection with other wood comprising products. FIG. 6 shows an overhead view of an example conveyor 502. The conveyor 502 can have any shape and can move sheets of veneer such as veneer sheets 600, 602 along its length using belts, a vacuum system, or any other mode of transporting the veneer sheets. In contrast to the line-scan system discussed above, a greater variety of veneer transporting options can be used with the conveyor 502. As veneer sheets are moved along by the conveyor 502, they pass under the vision system 404 where they are graded as disclosed herein.

The vision system 404 comprises both a black and white camera 504 and a color camera 506. Each camera desirably captures an area scan image of the entire area of the wood product, such as a veneer sheet, to be analyzed; which can be an entire surface area of the wood product or a portion thereof. As a result, desirably there is no need to stitch images together to form the entire area of the wood product to be analyzed. As used herein, the phrases "entire surface of a sheet facing a camera" or "entire surface of a wood product facing a camera means the entire surface of the sheet or wood product facing the camera and not including the sides thereof that are perpendicular to the surface facing the camera. Although stitching of images together can be performed using both color and black and white cameras in accordance with this disclosure, by capturing an area scan image, errors introduced from stitching together portions of an image to form a composite image are eliminated. In addition, capturing a single area scan of each veneer sheet or other wood product allows the vision system 404 to operate at a higher rate of speed than veneer grading systems that use line scan technology since it takes longer to capture a series of line scans rather than a single area scan.

In some examples, the cameras 504, 506 can each capture an image of a portion of the veneer sheet to be analyzed and/or graded. This portion of the veneer sheet can be less than the entire sheet. In these examples, the black and white camera 504 and the color camera 506 can each capture an area scan of this entire portion of the veneer sheet without the need to digitally stitch together multiple line scans. The cameras 504, 506 can be positioned above a particular location along the conveyor such that they can capture respective black and white and color images of the veneer sheet as the sheet is moved by the conveyor past that location. In some examples, the cameras 504, 506 can be positioned below the conveyor, to the sides of the conveyor, or at various angles with respect to the conveyor. The cameras can be positioned at locations with respect to the conveyor to best view a particular material being graded.

The use of a plurality of cameras also allows for more accurate grading of veneer than is possible using only a single camera. In particular, black and white images can be used for, and are typically preferable for measuring the dimensions of a veneer sheet and identifying void areas within the sheet; while color images can be used for and are typically preferable for detecting defects on the surface of the sheet. By using both types of cameras to grade veneer sheets, the system 404 can take advantage of the defect detection strengths of each camera type. That is, the system 404 can use the black and white camera to detect certain defects of veneer sheets and the color camera to detect others. This improves the quality of veneer grading performed by the system 404. More than one of each type of camera can be used.

In some embodiments, infrared cameras can be used in addition to black and white and color cameras 504, 506 to capture heat signatures from veneer. In these embodiments, veneer temperature can be considered when assigning a grade to the veneer. In embodiments where a green veneer sheet is to be graded, infrared cameras can be used to measure temperature deviations on the sheet, which can be an indication of moisture content that can be used in sorting the sheet. In embodiments involving intermediate processes, infrared cameras can be used to measure the distribution of heat or whether an appropriate temperature for bonding to occur has been reached. Infrared cameras can also be used to monitor catalytic processes where heat is generated to determine if a process is within certain parameters (e.g., a desired ratio of resin and wood chips in OSB). Deviations from ideal parameters can indicate improper mix ratios or application issues, which can affect the strength of a finished product.

In some embodiments, cameras that can detect non-visible portions of the infrared spectrum can be used in addition to black and white and color cameras 504, 506. In these embodiments, "invisible" inks that are only visible when illuminated with certain wavelengths of light can be detected on marked panels.

Figure 24:
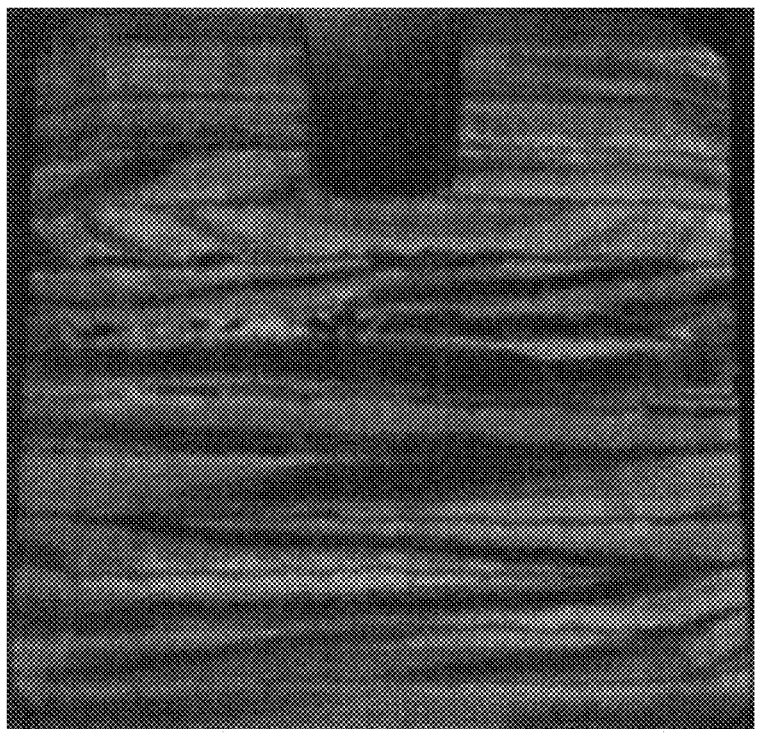
FIG. 24 shows an image of an example wood flange.

In some embodiments, a laser profiler can be used in addition to black and white and color cameras 504, 506. In these embodiments, the laser profiler can have a laser sensor to profile veneer to be analyzed. This can allow non-contact measurement of a thickness or other dimensions of veneer as long as the veneer is within the range of the laser profiler. A plurality of laser profilers used in combination can be used to create a three-dimensional image of veneer. This can be used for real-time monitoring of flange stock or other wood products that have multiple critical dimensions. An example of such a flange is shown in FIG. 24.

In some embodiments, a plurality of laser profilers and/or cameras can be used as part of a quality verification process to produce an image that can be compared to a reference image to determine if certain characteristics are within control parameters for a particular wood product. Such a quality verification process can also be used to measure deviations of control parameters from expected mean values as an indication of process trending. In some embodiments, multiple cameras can be used to simultaneously capture images of a wood product from multiple angles and/or directions.

Referring to FIG. 5, the cameras 504, 506 each have a certain field of view and these fields of view substantially overlap with each other and preferably entirely overlap one another in the region of the veneer sheet to capture the entire veneer sheet. As long as a veneer sheet is within the field of view of the respective cameras when the entire veneer sheet images are captured, an accurate grading of the veneer sheet can be accomplished. Additionally, because an image of the entire veneer sheet is captured, the orientation of the veneer sheet is not critical. In the example of FIG. 6, the cameras could be placed over the conveyor 502 at the location of veneer sheet 600, veneer sheet 602, or any other location along the conveyor, with one such placement of vision system 404 being shown in FIG. 6. The cameras 504, 506 can be placed any distance above the conveyor 502 such that a veneer sheet moving along the conveyor easily fits within the field of view of each camera as the sheet passes under the cameras, regardless of the orientation of the veneer sheet.

Referring back to FIG. 5, the vision system 404 further comprises a vision system controller 508 to control the operation of the cameras 504, 506 and to perform analysis of the images captured by the cameras to grade the veneer sheets that pass along the conveyor 502. In the illustrated example, the cameras 504, 506 can be Cognex GigE Vision cameras and the vision system controller 508 can be a Cognex VC5 Vision Controller. In other examples, other cameras and vision system controllers can be used that are capable of capturing images of veneer sheets and performing image analysis. In some examples, the vision system controller 508 is a dedicated hardware device capable of performing the operations disclosed herein. The image analysis performed by the example vision system 404 is discussed in further detail below.

The vision system 404 further comprises a housing 510 to house the cameras 504, 506. The housing 510 can be attached to or suspended from a ceiling, or mounted to any type of structural support, such that the vision system 404 is positioned above the conveyor 502 and such that veneer sheets moving along the conveyor pass through the field of views of the cameras 504, 506. Lights 512 and 514 can be affixed to the lower end of the housing 510 to illuminate veneer sheets passing along the conveyor 502 such that images of the veneer can be captured by the cameras 504, 506. In the illustrated example, the lights 512 and 514 can be LED lights. In other examples, the lights 512, 514 can be any type of lighting capable of illuminating veneer sheets that pass along the conveyor 502 and can be mounted on supports other than the housing 510.

In operation, with reference to FIG. 6, sheets of veneer are moved along the conveyor 502 while the conveyor and the veneer sheets are illuminated by lights 512, 514. When a sheet of veneer is within the field of view of the respective cameras 504, 506, the camera 504 captures a black and white image of the veneer sheet and the camera 506 captures a color image of the veneer sheet. These images can be captured simultaneously if the veneer sheet is simultaneously in the field of view of both cameras. Alternatively, the images can be captured sequentially by one camera and then the other camera. After these images are captured, the vision system controller 508 analyzes the images to determine a grade for the veneer sheet, as discussed below. This process is then repeated for any number of veneer sheets. This process can operate at a high rate of speed so long as the cameras 504, 506 each capture an image of each sheet of veneer that moves along the conveyor 502. In some examples, the conveyor 502 directs each veneer sheet to a different location based on its grade. In other examples, the result of the grading of each veneer sheet is stored for later use. In some embodiments, the vision system controller 508 can also receive inputs from other devices such as a stress wave grader or a moisture scanner. In these embodiments, the vision system controller 508 can use each of these additional inputs in combination with the visual information received from cameras 504, 506 to determine a grade for a veneer sheet.

To analyze a sheet of veneer after a black and white image and a color image are captured by cameras 504, 506, respectively, first the captured images can be and are desirably auto-rotated so that the images are properly oriented. Because the cameras 504, 506 capture an area scan of the veneer sheet, the sheet need not be oriented perfectly parallel with respect to the cameras when the images are captured, which is one of the advantages of using area scans rather than line scans. Auto rotating the images such that the image of the veneer sheet is oriented parallel with respect to a reference direction facilitates further analysis and comparison to reference images. In some examples, the black and white and color images are auto-rotated such that they have the same orientation as a reference image. In another example, a reference image can be auto rotated to match the orientation of the images captured by the cameras 504, 506, without rotating the captured images.

After this autorotation is performed, the images can be translated such that they are properly centered, with respect to one another. That is, the images are digitally overlapped on top of one another such that the same portion of the sheet captured by each camera is registered (overlaid) in a composite view and the images have the same horizontal spacing. This is desirable in one embodiment where the cameras 504 and 506 are offset from each other at the time the images are captured, such as horizontally offset on the housing 510. As such, the veneer sheet will be off to one side of the image captured by camera 504 and off to the other side of the image captured by camera 506. Translating each of these images in a complementary direction assures that both images can be compared to a centered reference image.

Once these initial steps are performed, if needed, the images can be analyzed to grade the veneer. As discussed above, the black and white image can be used to analyze certain defects of the veneer sheet while the color image can be used to analyze other defects of the veneer. In particular, black and white images can desirably be used to measure dimensional issues, such as the size of a veneer sheet and void areas on the sheet. For detecting this type of defect, the vision system need only determine whether or not material is present, and the use of a black and white image is preferable for this. Alternatively, differentiating between colors is key to detecting surface defects such as pitch and mold. Accordingly, color images can desirably be used to detect this type of colored defect. The specific defects that are measured with each camera are discussed below.

In some examples, the vision system controller 508 utilizes a learning algorithm software to "learn" to grade veneer sheets over time. In these examples, several images of veneer sheets having a first grade and several images of veneer sheets having a second grade, e.g. as determined by manual grading, can be stored in computer memory and analyzed by the learning algorithm software executed by a computer. The software can then determine what features of the images differentiate the different grades of sheets. Then, when an image or images of a new veneer sheet is analyzed by the software, the features of this new sheet can be compared to the learned features to determine a grade of the new veneer sheet.

In some examples, a reference image is stored in computer memory showing an ideal veneer sheet and as images are captured of veneer sheets to be graded, the images are compared to the reference image. In these examples, veneer sheets can be graded based on differences between the captured images and the reference image. In some examples, multiple reference images are stored corresponding to different grades of veneer and veneer sheets are assigned a grade based on which reference image a veneer sheet most closely resembles.

In some examples, the vision system controller 508 can perform computer processing of a captured black and white and/or color image of a veneer sheet to assign a grade to the veneer sheet. Computer processing of an image can comprise one or more of the following actions: comparing the image to a reference image, comparing data from the image to reference data, comparing data of the image to certain parameters, using image processing tools to detect features in the image. Alternative computer processing approaches can also be used.

In one example, a captured image of a veneer sheet to be graded (e.g., a black and white image) can be compared to a reference image to establish a scaling factor. That is, if the dimensions of the reference image are known, then the vision system controller 508 can compare the reference image to the captured image to determine the actual distance that each pixel of the reference image and the captured images corresponds to. Once this scaling factor is determined, the dimensions of the veneer sheet can be determined by overlaying the captured black and white image on the reference image and determining the differences (e.g., missing material on the captured image compared to the reference image). Based on this comparison, the vision system controller 508 can determine the length and width of the veneer sheet, as well as determine how sharp the corners are (for example, if a corner of the sheet is missing). In some examples, the dimensional analysis can be done without directly comparing the captured image to the reference image but instead by using the scaling factor and analyzing the captured image directly to determine the length and width of the veneer sheet and the sharpness of the corners. In some examples, the vision system controller 508 determines the scaling factor once for a particular type of product and uses this scaling factor every subsequent time that this product is graded. If the cameras are not moved, or the camera lenses are unchanged, the scaling factor would remain the same every time the same type of product is graded but could change for different products having different thicknesses. In some examples, the scaling factor can be determined manually (e.g., by analyzing the geometry and placement of the lenses of the cameras 504, 506 with respect to the veneer sheet when the images are captured).

Simultaneously, before, or after, and more desirably after, the dimensions of the veneer sheet are determined by processing the black and white image, a color image of the veneer sheet can be analyzed by the vision system controller 508 to determine additional defects in the veneer sheet as discussed below. In some examples, the color image is first converted to greyscale before it is analyzed to determine defects in the veneer sheet.

The vision system controller 508 can use a variety of image processing tools to determine these defects. For example, the vision system controller 508 can detect geometric circles which correspond to closed knots and a blob tool can be used to look for irregular shapes on the veneer sheet indicative of the presence of pitch. Any number of such tools can be run simultaneously or concurrently to determine any number of defects. Depending on the analysis to be performed for the particular veneer sheet, different tools can be used to analyze the veneer sheet. For example, a veneer sheet to be used for one particular purpose might be analyzed using different tools than the tools used to analyze a veneer sheet to be used for a different purpose.

The vision system controller 508 can be programmed with certain parameters to be used by the various image processing tools to detect various defects. In some examples, a machine learning algorithm can be used to help determine these parameters. In these examples, a first set of images that have a certain grade (e.g., G1 as determined by manual grading) can be input to the vision system controller 508. Then, a second set of images having a different grade (e.g., G2 as determined by manual grading) can be input to the vision system controller 508. This can be continued for any number of images having any number of different grades. The vision system controller 508 can then use these images and their assigned grades as training data for a machine learning algorithm to determine the optimal parameters to be used with certain image processing tools to determine a grade for veneer sheets. Once these parameters are determined, the vision system controller 508 can use the determined parameters with the image processing tool analyze captured images of veneer sheets and determine grades for the veneer sheets.

Discussed below are different types of defects that can be found in veneer sheets and that can be detected and/or measured by the vision system 404 using images captured by either the black and white camera 504 or the color camera 506. Also discussed below are parameters that can be measured for these defects (i.e., measurable deviations from an ideal veneer sheet). In some examples, the vision system 404 determines whether or not each detected defect is within an acceptable range. In other examples, the vision system 404 determines a magnitude of deviation of one or more parameters from an ideal veneer sheet in order to grade the veneer. In these examples, the vision system 404 can use a combination of detected defects to determine a grade for veneer and/or whether or not a sheet of veneer is acceptable for a particular purpose. In some examples, a magnitude of deviation can be determined as a percentage difference from a desired value. In other examples, a magnitude of deviation can be determined as an absolute value of a difference from a desired value. In some examples, the vision system 404 can monitor the trend of a certain value over time. For example, if dimensional offsets are increasing, this provides an indication of upstream problems in equipment used with the veneer.

In the examples discussed below, acceptable ranges for certain defects are given. These ranges correspond to exemplary ranges that make veneer sheets acceptable for one particular application. For other applications, other ranges could be used to define what is acceptable. Furthermore, in the illustrated example of FIG. 5, the vision system controller 508 can be programmable such that acceptable ranges for various defects can be programmed into the vision system controller for any given application.

Figure 7B:
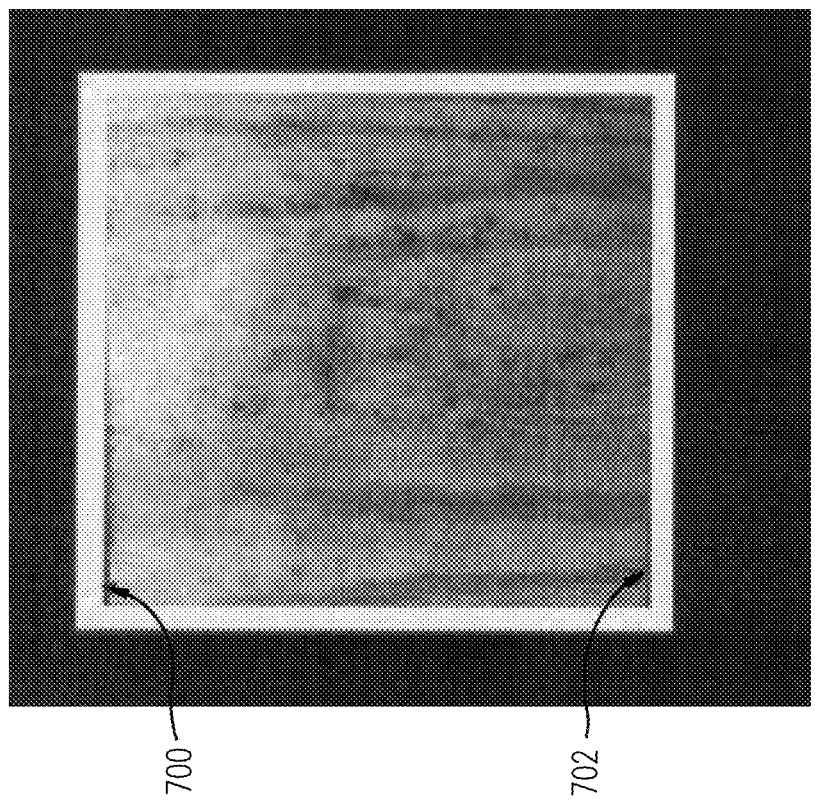
FIG. 7B shows an example image of a veneer sheet with dimensional discrepancies.
Figure 7A:
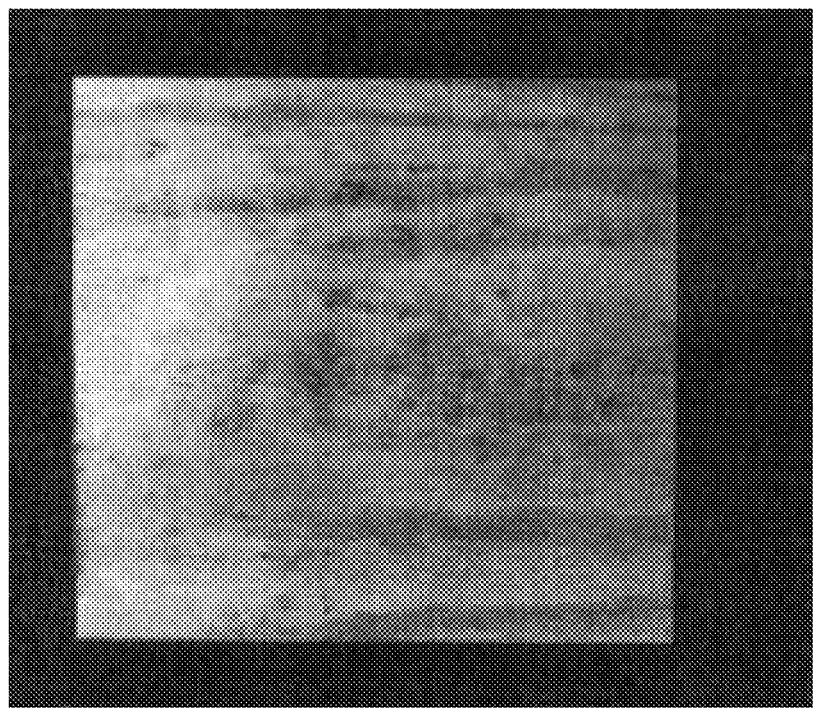
FIG. 7A shows a reference veneer sheet without any dimensional discrepancies.

FIGS. 7A-7B illustrate a dimensional analysis that can be performed by the example vision system 404. FIG. 7A shows an image of an ideal veneer sheet and FIG. 7B shows an image of a veneer sheet that has dimensional discrepancies in corners 700 and 702, wherein the veneer sheet is undersized. This is a type of defect that can be best detected from a black and white image. In the illustrated example, the acceptable width of a veneer sheet can be, for example, between 49.75 inches and 51.5 inches with an ideal mean width of 50.5 inches for use in four-foot-wide plywood sheets. In some examples, the vision system controller 508 calculates a deviation in magnitude between the mean width and the actual width of a veneer sheet in order to determine a grade for the sheet. Additionally, detecting deviations from the mean width that are increasing over time but still within the acceptable range can allow personnel to become aware of a veneer manufacturing problem and correct it before deviations from the acceptable range are exceeded. In some examples, dimensional analysis can be performed by counting a number of pixels in a certain area within a certain range of values.

Similar measurements can be performed with respect to the length of a veneer sheet. In the illustrated example, the minimum acceptable length can be 101.75 inches (for example, a veneer sheet to be used as a face sheet in four foot by eight-foot plywood) and there is no maximum required length as any excess material can be removed as waste.

Another defect that can be detected by the example vision system 404 from black and white images is the shape of a veneer sheet and how close it is to a rectangle. In the illustrated example, acceptable deviations from a rectangular shape are no more than ¾ of an inch measured diagonally across a sheet. In some examples, the vision system controller 508 calculates the magnitude of deviation from a perfectly rectangular shape. Deviations above the allowable limit can contribute to edge defects in finished products.

Figure 8:
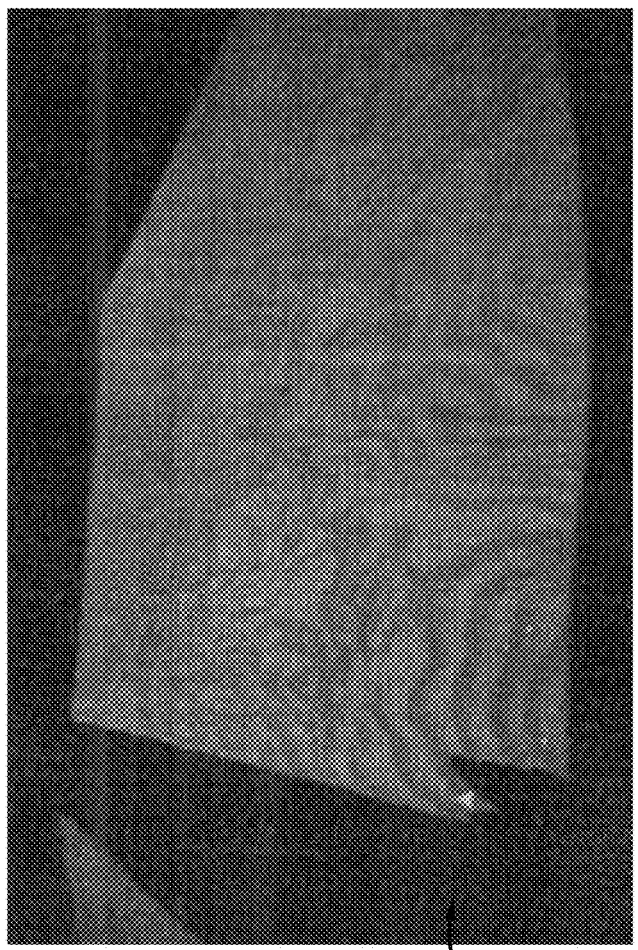
FIG. 8 shows an image of a veneer sheet with a broken corner.

Another defect that can be detected by the example vision system 404 from black and white images is misshapen corners. In an illustrated example, each of the corners of a veneer sheet must be a right triangle, such as being a right triangle with a minimum of 6-inch base dimensions. FIG. 8 shows a veneer sheet with a broken corner 800 that would not meet this criteria. Another defect that can be detected by the system 404 is the presence of more or less than four corners, which indicates a misshapen or damaged sheet.

Figure 9:
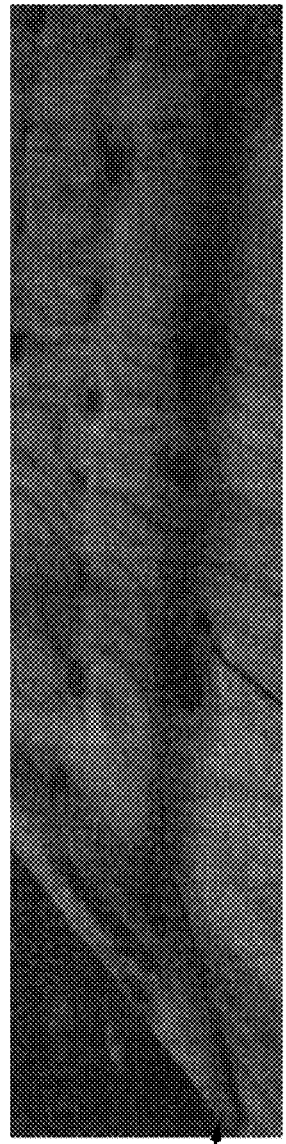
FIG. 9 shows an image of a veneer sheet with foreign material (an extraneous piece of veneer on top of the veneer sheet).

Another defect that can be detected by the example vision system 404 from a black and white image is the presence of foreign materials or debris such as grease, paint, dirt, wood chips, etc. In one desirable example, no such foreign materials are allowable. FIG. 9 shows a veneer sheet with a wood chip 900 present on its surface.

Figure 10B:
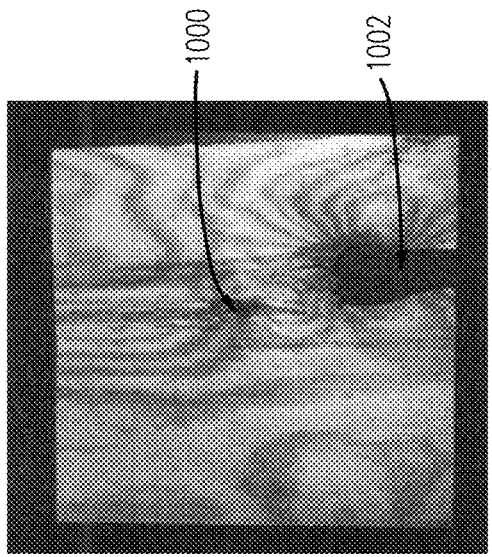
FIGS. 10B-10C show images of a veneer sheet with void spaces.
Figure 10C:
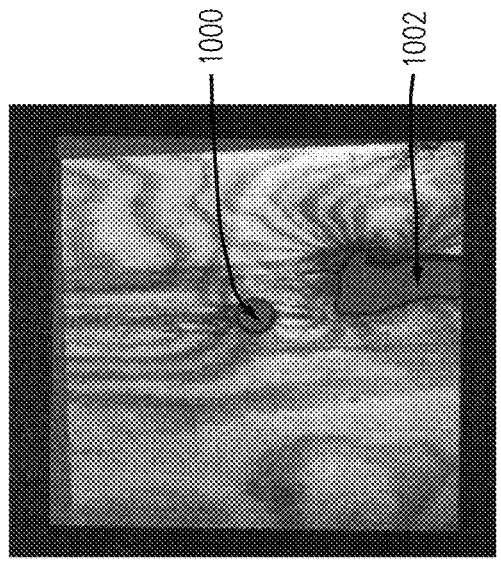
Figure 10A:
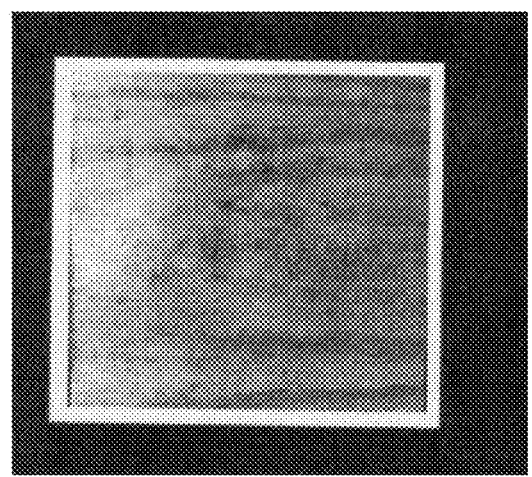
FIG. 10A shows a reference image of a veneer sheet without any void spaces.

Another defect that can be detected by the example vision system 404 from a black and white image is void areas. Void areas can comprise open knots, broken, missing or irregular corners or boundary portions, splits, or any material missing from a sheet. FIG. 10A shows an image of a reference veneer sheet without any void areas while FIGS. 10B and 10C respectively show images of a veneer sheet having open knot 1000 and broken out area 1002.

Figure 11A:
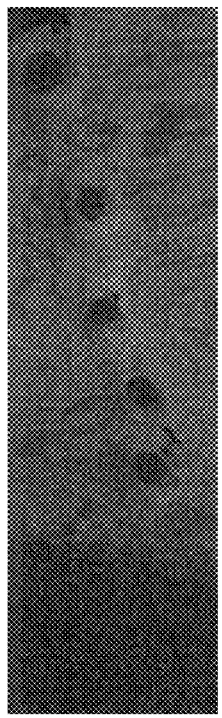
FIGS. 11A-11B show images of a veneer sheet with tight knots.
Figure 11B:
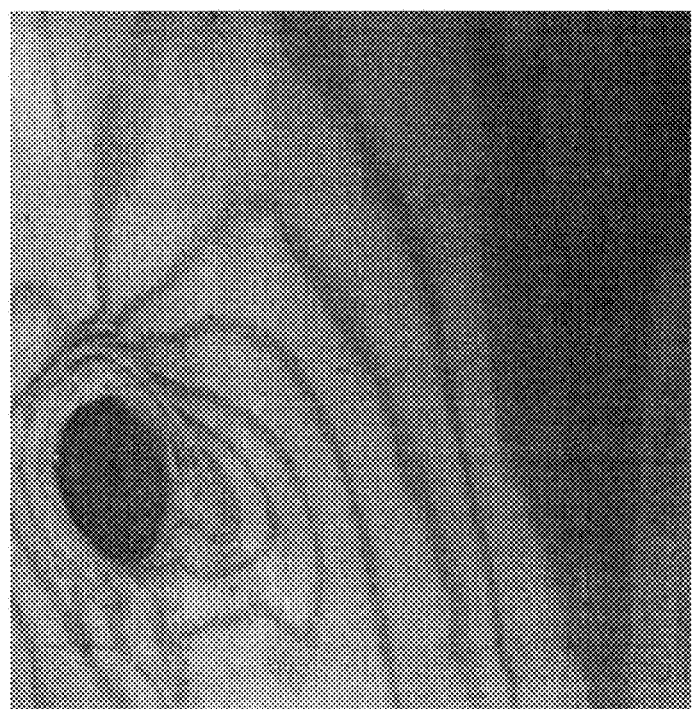

The remaining defects discussed below are defects in veneer sheets that the example vision system 404 can desirably detect from color images. Closed knots are one such defect that can be detected by the vision system. FIGS. 11A-11B show example veneer sheets with tight or closed knots. Tight knots are knots where there is no material missing within the knot perimeter. In one grading example, veneer sheets meeting this grade can have tight or closed knots that have a maximum allowable diameter of 3.5 inches. For loose knots, where a portion of the material within the perimeter of the knot is missing, in one grading example, the knot can have a maximum diameter of 3 inches. For any knots having a diameter greater than 2 inches, in one grading example, there must be a minimum spacing of 6 inches between knots across the sheet and there must be clear, straight grain with no additional defects in the space between the knots. The grading standards can vary for different grades of sheets.

Figure 12:
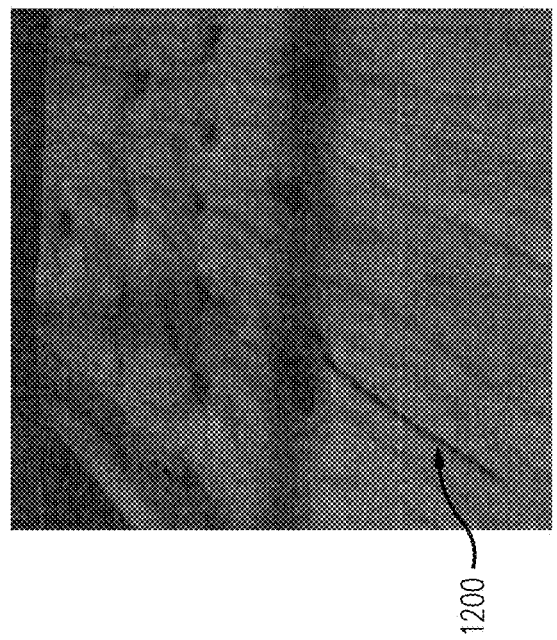
FIG. 12 shows an image of a veneer sheet with at least one split and tight knots.

Another defect that can be detected by the vision system 404 is splits. FIG. 12 shows an example veneer sheet that has a split 1200. In one specific grading example, splits can have a maximum length of 24 inches, the maximum number of allowable splits is 6, and the total cumulative length of all splits in a veneer sheet cannot exceed 48 inches. Splits can be detected from both black and white and color images. In some examples, backlighting of a veneer sheet can be used to improve the contrast of captured images, such as to better detect splits or other defects.

Figure 13:
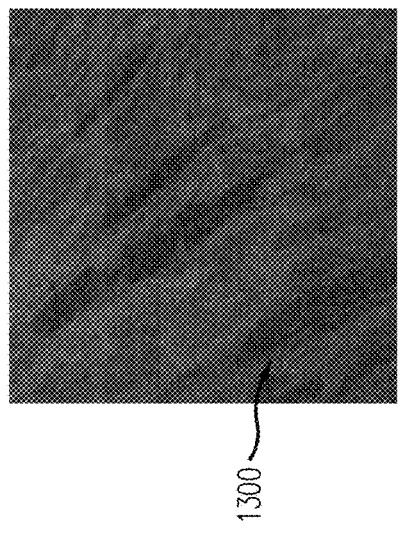
FIG. 13 shows an image of a veneer sheet containing pitch.

Another defect that can be detected by the vision system 404 is pitch. FIG. 13 shows a veneer sheet that contains pitch 1300 on its surface. In one grading example, individual pitch pockets can have a maximum surface of 6 square inches and there can be at most 3 pockets per veneer sheet. In addition, pitch pockets must be separated by at least 24 inches and there must be clear, straight grain with no defects in the area between pitch pockets.

Figure 14:
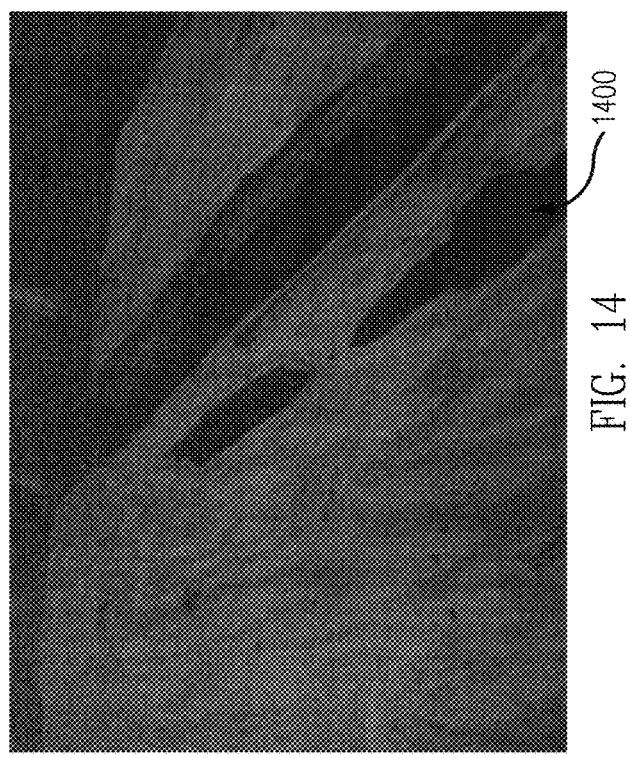
FIG. 14 shows an image of a veneer sheet with wane.

Another defect that can be detected by the vision system 404 is wane. FIG. 14 shows a veneer sheet with wane 1400. In one grading example, there can be at most 6 square inches of cumulative wane per sheet of veneer to meet the grade.

Figure 15:
FIG. 15 shows an image of a veneer sheet with light mold.
Figure 16:
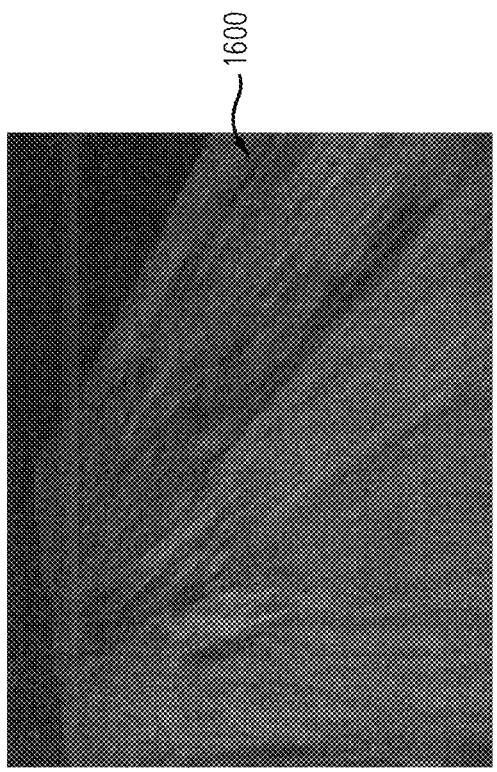
FIG. 16 shows an image of a veneer sheet with heavy mold.
Figure 17:
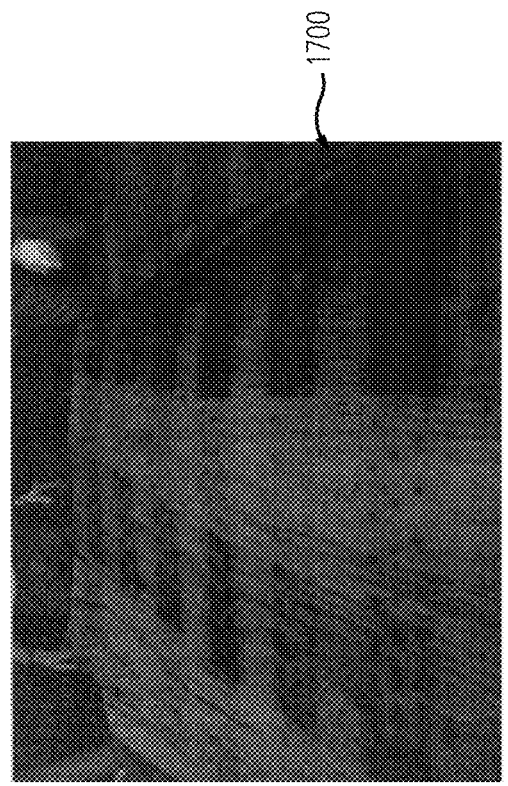
FIG. 17 shows an image of a veneer sheet with charring due to excessive heat.

Another defect that can be detected by the vision system 404 is mold. FIG. 15 shows a veneer sheet that contains light mold. In one grading example, light mold with a transparency of greater than 85% is acceptable. Heavy mold, blue stain or significant discolorations where transparency is less than 85% is not acceptable in this example. FIGS. 16 and 17 show examples of veneer sheets with heavy mold 1600 and charring 1700 due to excessive heat, respectively.

Figure 18:
FIG. 18 shows an image of a veneer sheet with multiple defects of different types.

Another defect that the vision system 404 can detect are critical areas where a cumulative collection of individual defects on a veneer sheet combine to compromise the quality of the veneer sheet. For example, FIG. 18 shows a veneer sheet with a crack across the sheets near closed knots and without 6 inches of clear straight grain space between the knots. This area can be considered a critical area with multiple defects.

Figure 19B:
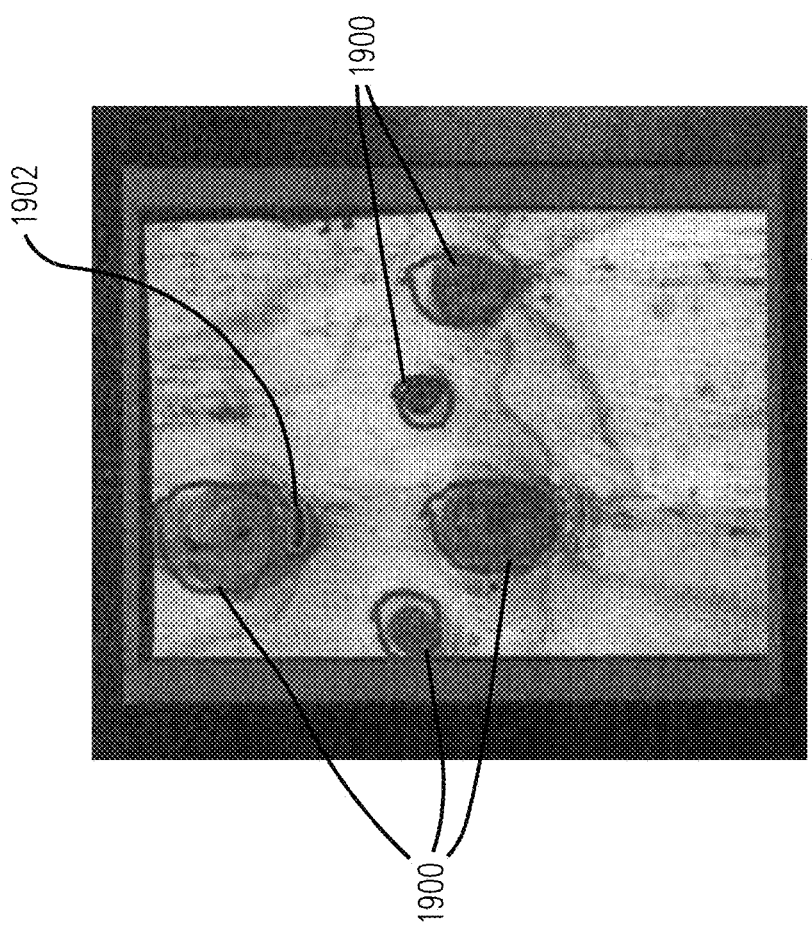
FIG. 19B shows a veneer sheet with knots and pitch.
Figure 19A:
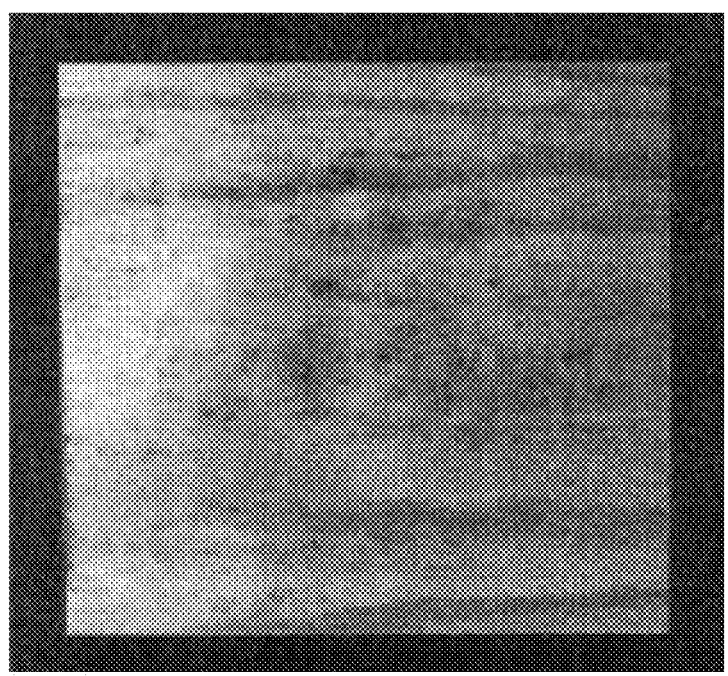
FIG. 19A shows a reference a veneer sheet without any knots or pitch.

FIGS. 19A-19B illustrate an example of how the vision system can utilize color images to differentiate different types of defects. FIG. 19A shows a reference image, while FIG. 19B shows an image of a veneer sheet having both closed knots 1900 and pitch 1902. The deviations in color between the closed knots 1900 and the pitch 1902 allow the vision system 404 to identify and differentiate these two types of defects. Furthermore, the darker the color of a knot in comparison to the reference image can be considered a reduction in material strength and can be considered when assigning a veneer grade based on a magnitude of deviation from the reference.

Figure 21:
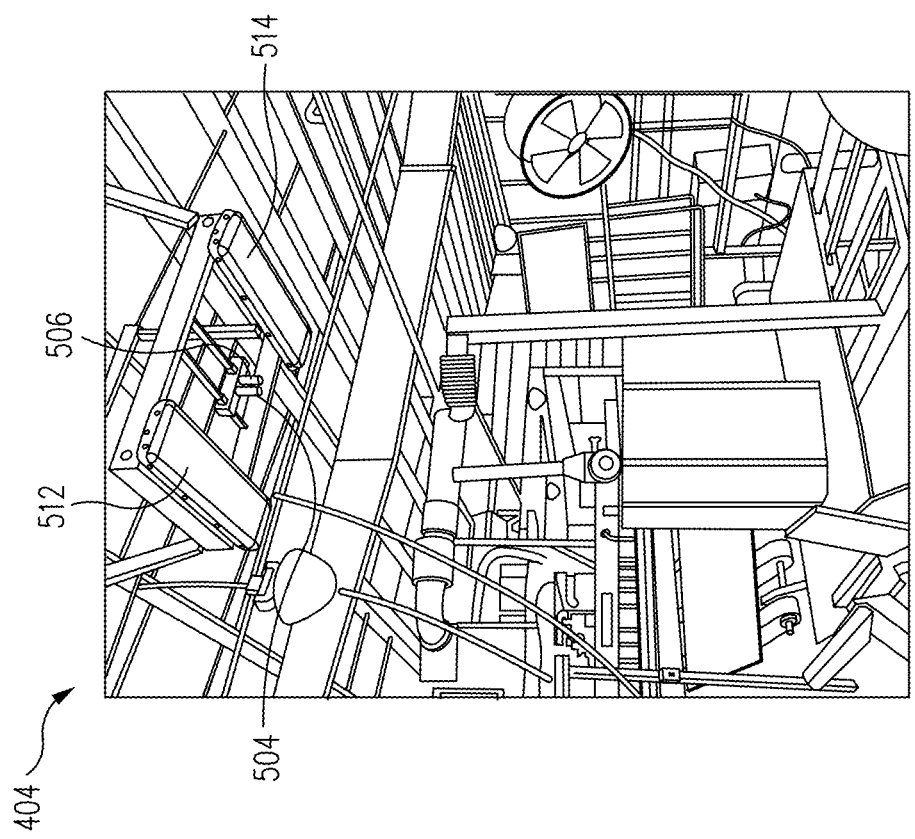
FIGS. 20-21 show images of an installation of the example vision system of FIG. 5.
Figure 20:
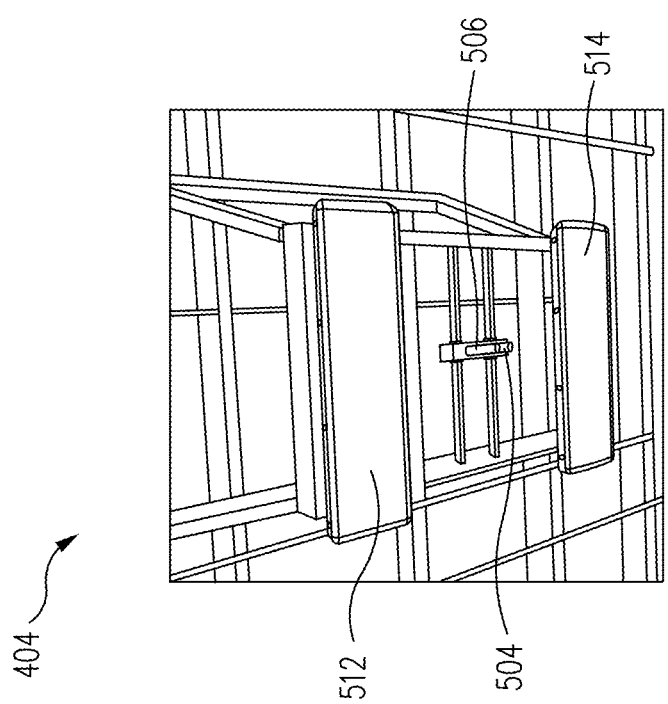

FIGS. 20-21 show various views of portions of an installation of a veneer vision system 404 including lights 512, 514 and cameras, 504, 506.

In some examples, the vision system 404 can determine a plurality of magnitudes of deviation from a reference image for each detected defect on a veneer sheet. In these examples, the various magnitudes of deviation can be combined to determine a grade for the sheet of veneer. For example, the vision system may determine how many open knots are present, what the total size of the open knots is, and how far apart the open knots are separated and combine all these measures in determining a grade for the veneer sheet.

In some examples, the vision system 404 first determines whether a veneer sheet has dimensions within the allowed parameters. If the dimensions are not within the allowable parameters, the sheet can be sent for further processing (e.g., composer or core feeder) or treated as scrap wood. If the dimensions are within the allowable parameters, then the other defects can be detected and/or measured and a grade for the veneer can be determined based on these detected defects. The veneer sheet can then be sorted based on the grade such that the sheet is used in the most cost-effective manner in a manufacturing process.

In some examples, the images of a veneer sheet captured by the cameras 504, 506 are stored along with the grade that the system 404 assigns to the veneer sheet and/or the defects in the sheet detected by the system 404. Then, the stored images can be later compared to the grade assigned or the defects found in the veneer sheet to determine if the system 404 is accurately detecting defects and assigning grades. If, for example, it is discovered that the system 404 is detecting defects in veneer sheets that are not actually present or if the system is not detecting certain defects, the settings of the system can be adjusted to improve future performance.

Figure 22A:
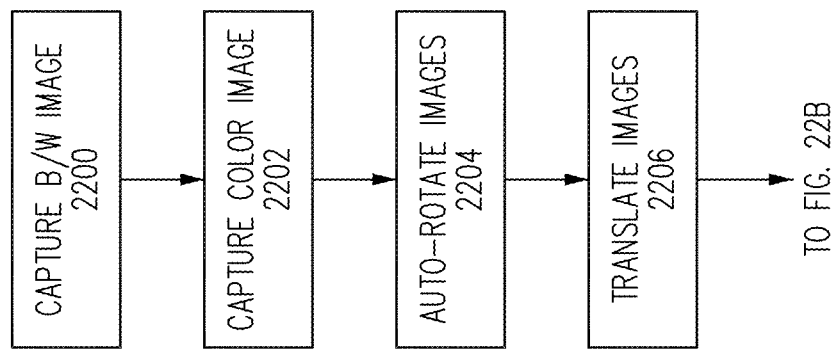
FIGS. 22A and 22B together form a flowchart showing exemplary operations of the exemplary vision system of FIG. 5.
Figure 22B:
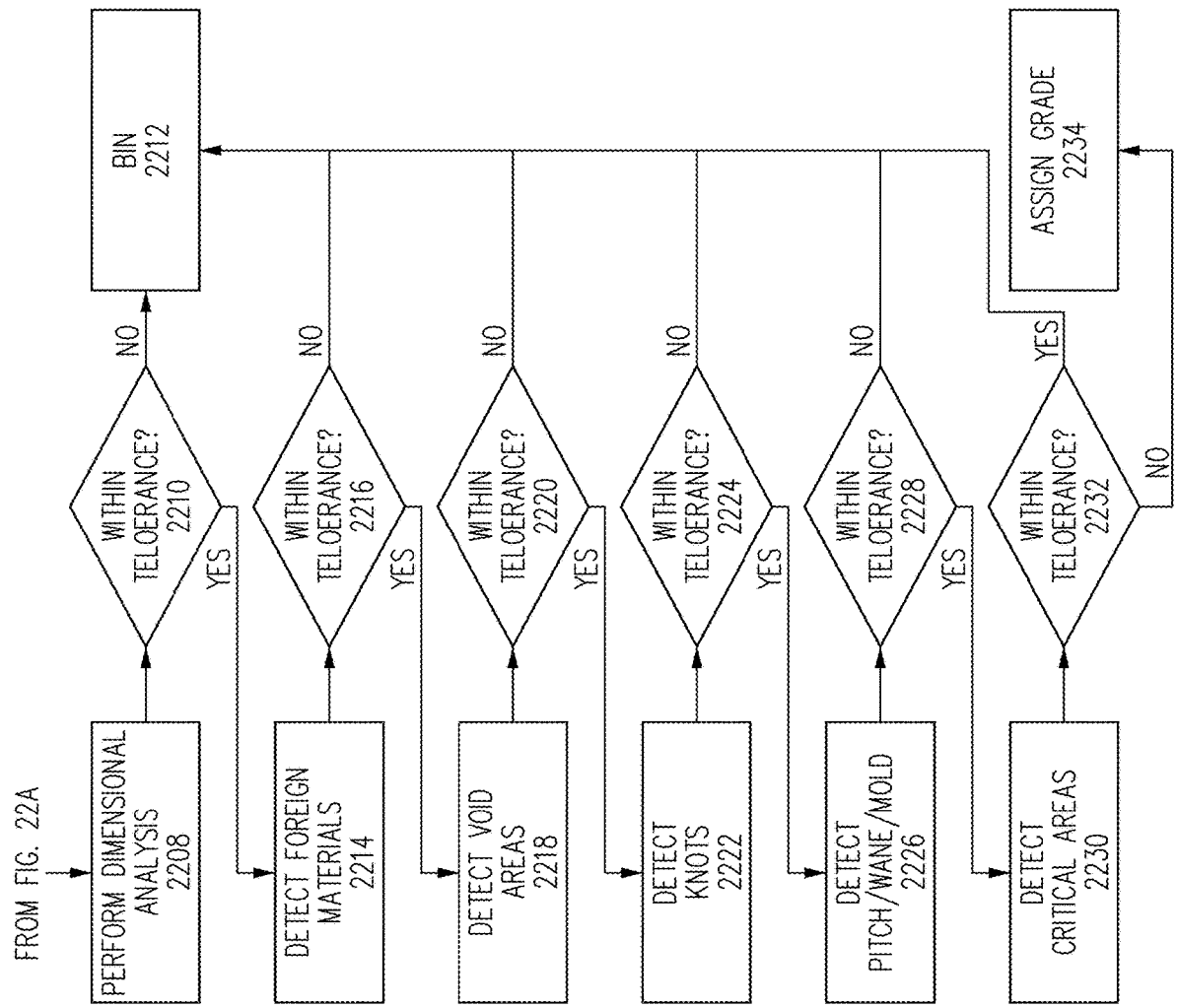

FIGS. 22A and 22B together show a flowchart representative of exemplary operations of the veneer vision system 404. FIG. 22A begins when the black and white camera 504 captures an image of a veneer sheet to be graded (block 2200). The color camera 506 then captures an image of the same veneer sheet (block 2202). In some examples, the black and white camera and the color camera capture images of the veneer sheet simultaneously or in a different sequence.

After the black and white and color images of the veneer sheet are captured, these images are desirably auto rotated and/or centered to match the orientation of a reference image as described above (block 2204). The black and white and color images are then desirably translated such that they are properly aligned with respect to each other as described above (block 2206). Dimensional analysis is then performed by comparing the black and white image to a reference image as described above (block 2208). If the dimensions of the veneer sheet are found to be outside of an allowable range (block 2210), then the veneer sheet is sent to a particular bin (e.g., a location to be further processed, discarded, used as scrap) or assigned some for some other purpose (block 2212). If the dimensions of the veneer sheet are found to be within the allowable range, then control advances to block 2214.

In block 2214, the vision system determines whether any foreign materials are present on the veneer sheet as described above. If the amount of foreign materials are found to be outside of an allowable range (block 2216), then the veneer sheet is binned (i.e., sent to a particular bin). In some examples, this can be the same bin that the materials that failed the dimensional analysis in block 2210 were sent to. In other examples, this can be a different bin. In the example of FIG. 22, any number of bins can be present. If the amount of foreign materials around found to be within the allowable range (block 2216), then control advances to block 2218.

In block 2218, the vision system detects void areas on the veneer sheet as described above. If the amount of void areas is found to be outside of an allowable range (block 2220), then the veneer sheet is binned. If the amount of void areas is within the allowable range, then control advances to block 2222.

In block 2222, the vision system detects knots on the veneer sheet as described above. If the number and size of knots is found to be outside of an allowable range (block 2224), then the veneer sheet is binned. If the number and size of knots is found to be within the allowable range, then control advances to block 2226.

In block 2226, the vision system detects pitch, wane, and mold on the veneer sheet as described above. If the amount of pitch, wane, and mold is found to be outside of an allowable range (block 2228), then the veneer sheet is binned. If the amount of pitch, wane, and mold is found to be within the allowable range, then control advances to block 2230.

In block 2230, the vision system detects critical areas on the veneer sheet where a combination of defects degrade the quality of the veneer sheet as described above. If the number and severity of critical areas on the veneer sheet is found to be outside of an allowable range (block 2232), then the veneer sheet is binned. If the critical areas are found to be within the allowable range, then a grade is assigned to the veneer sheet based on all of the defects detected (block 2234). The example of FIGS. 22A-22B then ends.

In the example of FIGS. 22A-22B, each bin can be assigned to a different purpose. For example, one bin can be for scrap, one bin can be for use of veneer in plywood core, one bin can be for use as I-beam webs, with as many bins being provided as desired. The example of FIGS. 22A-22B shows one series of tests that can be performed. In other examples, any number any variety of tests can be performed in any order. After each test is performed, wood products that fail that particular test can be assigned to a particular bin. In some examples, the tests are performed in an order to detect veneer sheets from the lowest to highest quality. That is, if a veneer sheet fails a first test or set of tests (i.e., the detected parameters are outside of allowable levels), then the veneer sheet can be sent to a bin for the lowest quality veneer (i.e., scrap). If the first set of tests is passed but a subsequent test or set of tests is failed, then the veneer sheet can be sent to a bin for a slightly higher quality of veneer. This can continue any number of times. If a veneer sheet passes every test, then it can be assigned the highest quality grade.

Referring to FIGS. 4C, 22A and 22B, in one embodiment, each bin is a stack 406, 408, 410, or 412 of veneer sheets shown in FIG. 4C. In one embodiment, veneer stack 406 is a first grade, or grade 1, veneer stack that includes veneer sheets that are deemed to be of acceptable appearance and quality to be used for outer veneer layers of a layered wood panel. In one embodiment, veneer stack 408 is a second grade, or grade 2, veneer stack that includes veneer sheets that are deemed to be of acceptable structural quality to be used for inner veneer layers of a layered wood panel but perhaps lack the appearance to be used as outer layers of a layered wood panel. In one embodiment, veneer stack 410 is a third grade, or grade 3, veneer stack that includes veneer sheets that are deemed to have structural anomalies, such as knot holes, and therefore must be sparingly used for inner veneer layers of a layered wood panel and perhaps must be sandwiched between higher grade veneer sheets to provide adequate structural quality for the layered wood panel. Finally, in one embodiment, trash/recycle stack, or bin 412 contains veneer sheets of unacceptable quality.

By grading veneer sheets from veneer stack 403A and stacking the veneer sheets according to grade, the quality of veneer fed into process during feeding operation is determined before resources are expended processing the veneer, i.e., defects can be detected in the veneer sheets, and the veneer sheets can be graded, and allocated for their best use, before significant time and energy is devoted to their use in processed panels.

As discussed above, once the veneer sheets from veneer stack 403A are inspected/graded by vision system 404, and the sheets are placed in appropriate graded veneer stacks 406, 408, 410 and 412 by veneer inspection/grading robot 445, veneer handling robot 451 is directed by control signals from robot control system 402 to retrieve veneer sheet 471 from the appropriate graded veneer stack 406, 408, 410 and place the veneer sheet 471 on green panel stack 360A.

It should be noted that translating the images from the color and black and white cameras is not required if the images are already aligned and overlap when taken. In addition, steps that are used in grading certain defects (e.g., dimensional defects) desirably determined from the black and white image can be performed prior to any translation step with the translation step eliminated if the analysis performed from the black and white image is sufficient to reject the sheet of veneer. However, the most efficient approach is to translate the image from the two cameras such that they overlap one another and then proceed with grading the veneer sheet.

Example Computing Systems

Figure 23:
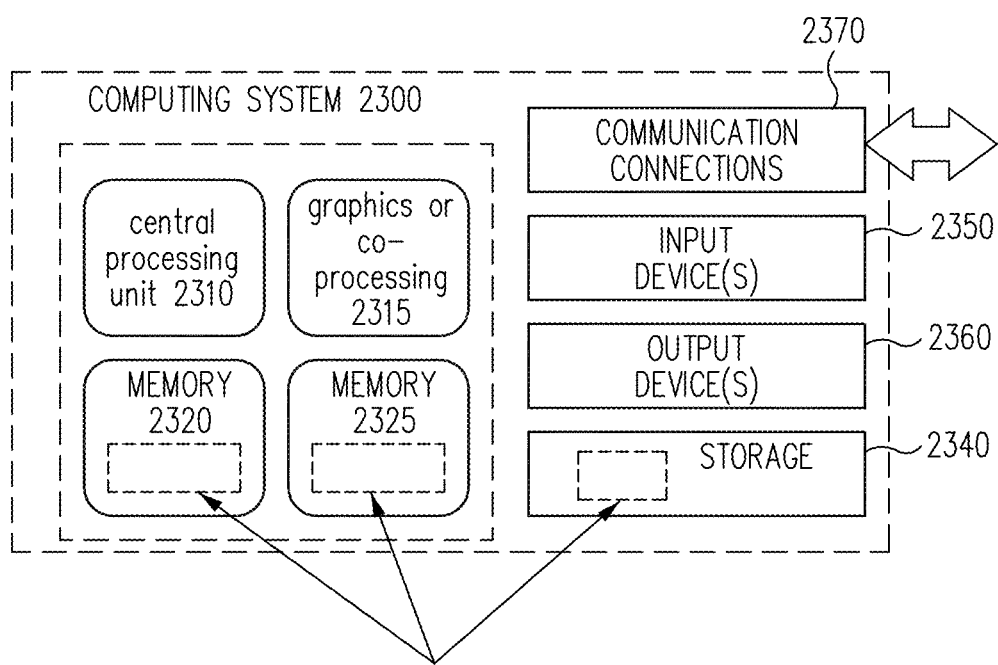
FIG. 23 is a diagram of an example computing system in which some described embodiments can be implemented.

FIG. 23 depicts a generalized example of a suitable computing system 2300 in which the described innovations may be implemented. The computing system 2300 is not intended to suggest any limitation as to scope of use or functionality, as the innovations may be implemented in diverse general-purpose or special-purpose computing systems.

With reference to FIG. 23, the computing system 2300 includes one or more processing units 2310, 2315 and memory 2320, 2325. In FIG. 23 this basic configuration 2330 is included within a dashed line. The processing units 2310, 2315 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 23 shows a central processing unit 2310 as well as a graphics processing unit or co-processing unit 2315. The tangible memory 2320, 2325 may be volatile memory (e.g., registers, cache, RAM), non-volatile memory (e.g., ROM, EEPROM, flash memory, etc.), or some combination of the two, accessible by the processing unit(s). The memory 2320, 2325 stores software 2380 implementing one or more innovations described herein, in the form of computer-executable instructions suitable for execution by the processing unit(s).

A computing system may have additional features. For example, the computing system 2300 includes storage 2340, one or more input devices 2350, one or more output devices 2360, and one or more communication connections 2370. An interconnection mechanism (not shown) such as a bus, controller, or network interconnects the components of the computing system 2300. Typically, operating system software (not shown) provides an operating environment for other software executing in the computing system 2300, and coordinates activities of the components of the computing system 2300.

The tangible storage 2340 may be removable or non-removable, and includes magnetic disks, magnetic tapes or cassettes, CD-ROMs, DVDs, or any other medium which can be used to store information in a non-transitory way and which can be accessed within the computing system 2300. The storage 2340 stores instructions for the software 2380 implementing one or more innovations described herein.

The input device(s) 2350 may be a touch input device such as a keyboard, mouse, pen, or trackball, a voice input device, a scanning device, or another device that provides input to the computing system 2300. For video encoding, the input device(s) 2350 may be a camera, video card, TV tuner card, or similar device that accepts video input in analog or digital form, or a CD-ROM or CD-RW that reads video samples into the computing system 2300. The output device(s) 2360 may be a display, printer, speaker, CD-writer, or another device that provides output from the computing system 2300.

The communication connection(s) 2370 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer and should not be confused with acts performed by a human being. The actual computer operations corresponding to these terms vary depending on implementation.

GENERAL CONSIDERATIONS

For purposes of this description, certain aspects, advantages, and novel features of the embodiments of this disclosure are described herein. The disclosed methods, apparatus, and systems should not be construed as being limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present, or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms may be high-level descriptions of the actual operations that are performed. The actual operations that correspond to these terms may vary depending on the particular implementation.

As used in this application and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically, or chemically) coupled or linked and does not exclude the presence of intermediate elements between the coupled or associated items absent specific contrary language.

As used herein, operations that occur "simultaneously" or "concurrently" occur generally at the same time as one another, although delays in the occurrence of one operation relative to the other due to, for example, spacing, play or backlash between components in a mechanical linkage such as threads, gears, etc., are expressly within the scope of the above terms, absent specific contrary language.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 23, computer-readable storage media include memory 2320 and 2325, and storage 2340. The term computer-readable storage media does not include communication connections (e.g., 2370) such as signals and carrier waves.

Any of the computer-executable instructions for implementing the disclosed techniques as well as any data created and used during implementation of the disclosed embodiments can be stored on one or more computer-readable storage media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

In view of the many possible embodiments to which the principles of the disclosed technology may be applied, it should be recognized that the illustrated embodiments are only preferred examples of the disclosed technology and should not be taken as limiting the scope of the disclosed technology. Rather, the scope of the disclosure is at least as broad as the following claims. We therefore claim all that comes within the scope of these claims.

Figure 25:
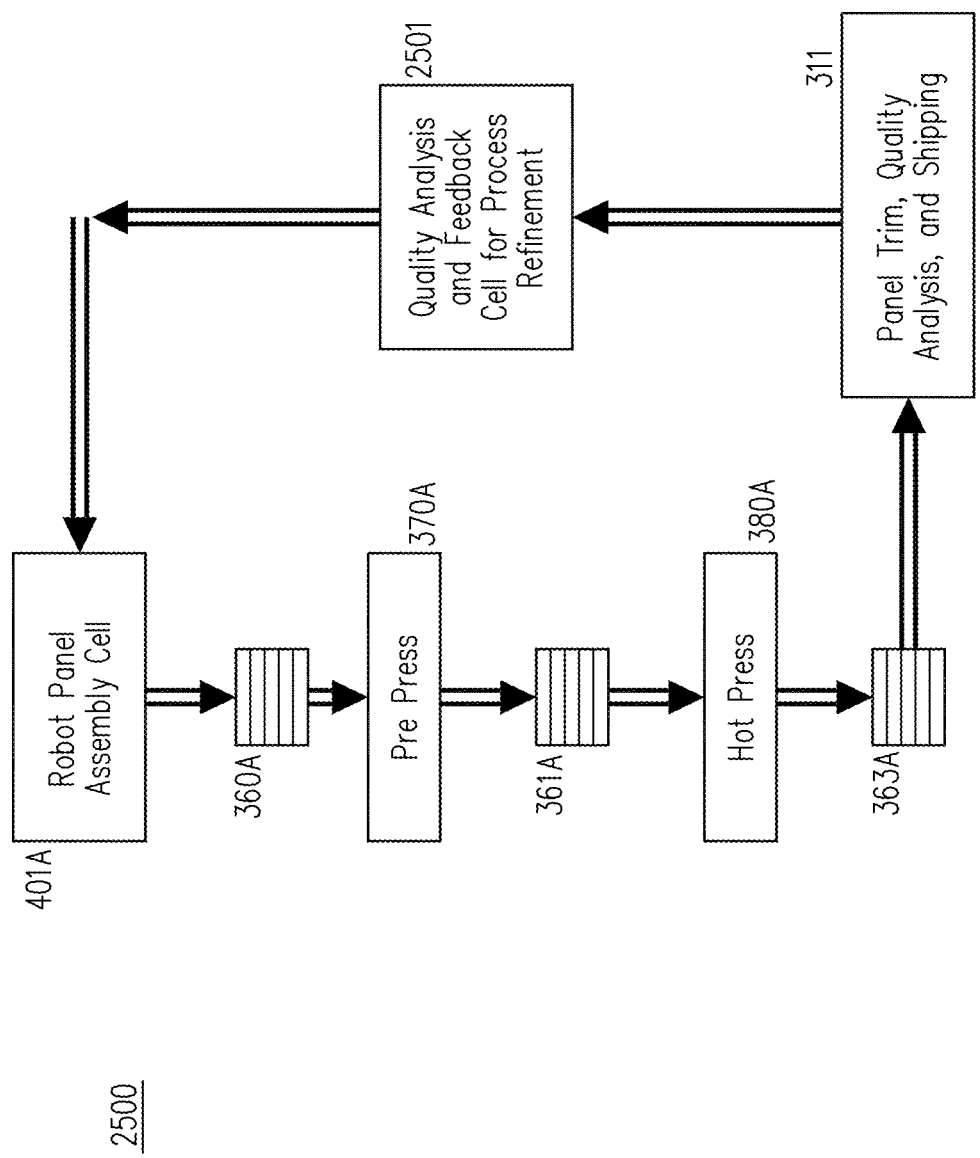
FIG. 25 is a diagram of a local robotic panel assembly and pressing station including a quality analysis and feedback cell for process refinement in accordance with one embodiment.

In some embodiments, a quality analysis and feedback cell for process refinement is included in a local robot panel assembly cell. FIG. 25 is a diagram of a local robotic panel assembly and pressing station 2500 including a quality analysis and feedback cell 2501 for process refinement in accordance with one embodiment.

As seen in FIG. 25, once local robot panel assembly cell 401A creates green panel stack 360A, green panel stack 360A is transferred to pre-press 370A and green panel stack 360A is loaded into pre-press 370A where the green panel stack 360A is subjected to cold pre-pressing. In the pre-press 370A green panel stack 360A is pressed to flatten out the structure and force our any air pockets that may exist in the green panel stack 360A and to create pre-pressed stack 361A by the methods discussed above.

Once pre-pressed stack 361A is created, pre-pressed stack 361A is conveyed to an unstacking mechanism (not shown) which feeds the layered wood structure panels making up pre-pressed stack 361A one at a time into slots of hot press 380A. At hot press 380A the layered wood structure panels making up pre-pressed stack 361A are subjected to further pressure and heat to further flatten and cure the layered wood structure panels making up pre-pressed stack 361A by the methods discussed above. The layered wood structure panels are then re-stacked to form cured layered wood panel product stack 363A.

Cured layered wood panel product stack 363A is then conveyed to panel trim, quality analysis, and shipping area 311 where the individual layered wood panels making up cured layered wood panel product stack 363A are trimmed to size, subjected to quality control analysis, including wood product panel bond analysis, and then shipped to customers.

Figure 26A:
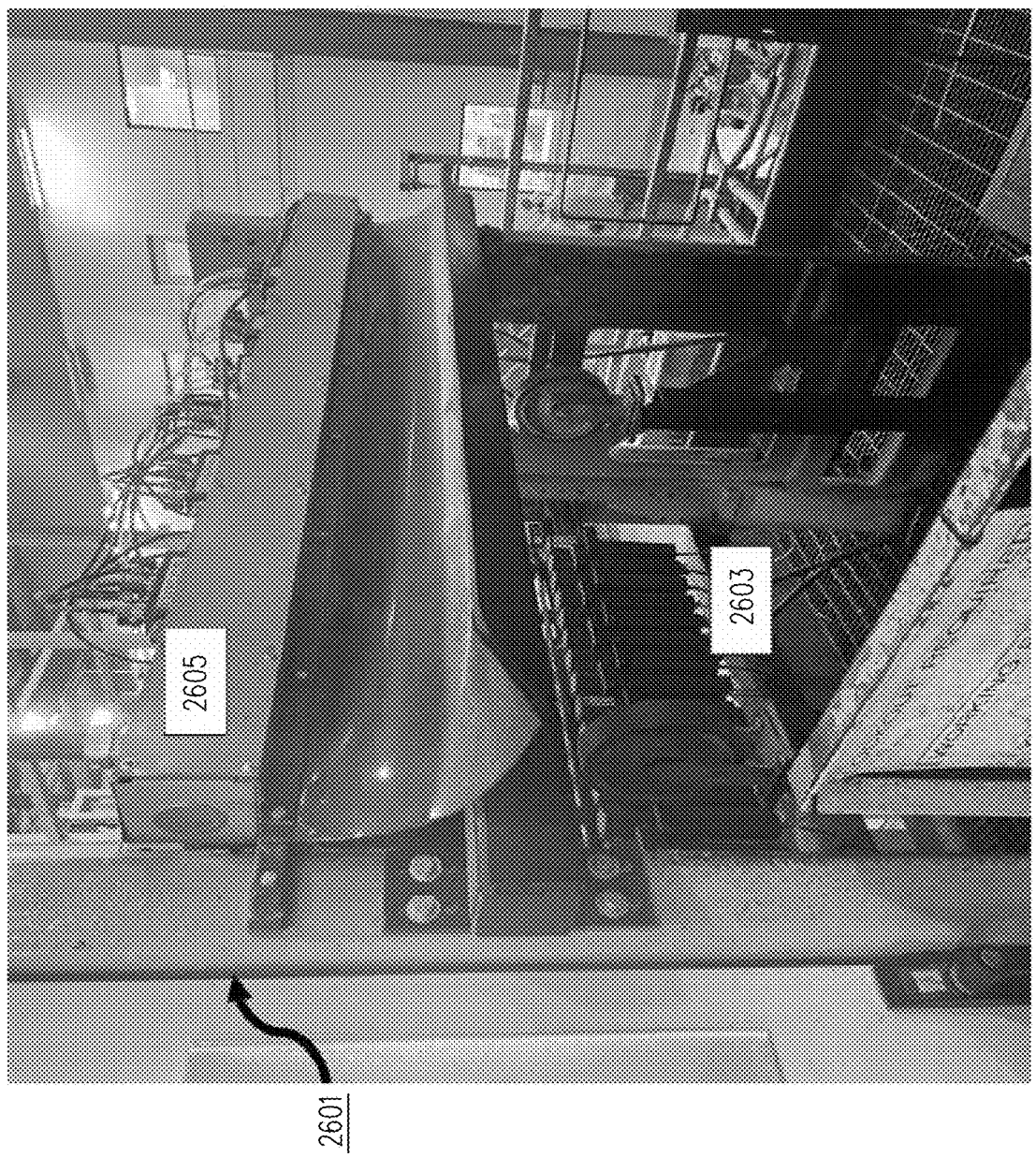
FIG. 26A is a photograph of one type of wood product panel bond analyzer used in accordance with one embodiment.

FIG. 26A is a photograph of one type of wood product panel bond analyzer 2601 used in accordance with one embodiment. In one embodiment, wood product panel bond analyzer 2601 is included as part of panel trim, quality analysis, and shipping area 311.

As seen in FIG. 26A, in one embodiment, wood product panel bond analyzer 2601 includes an array of ultrasonic transmitter/receiver pairs 2603 and 2605 (not visible in FIG. 26A) that send a pulse through the wood panel product. The amplitude of the signal passed through the wood by transmitters 2603 and received by receivers 2605, and the time delay between the transmissions from transmitters 2603 to the receipt of those transmissions by receivers 2605 are recorded and these parameters are utilized to calculate the quality of bond of the wood panel.

Figure 26B:
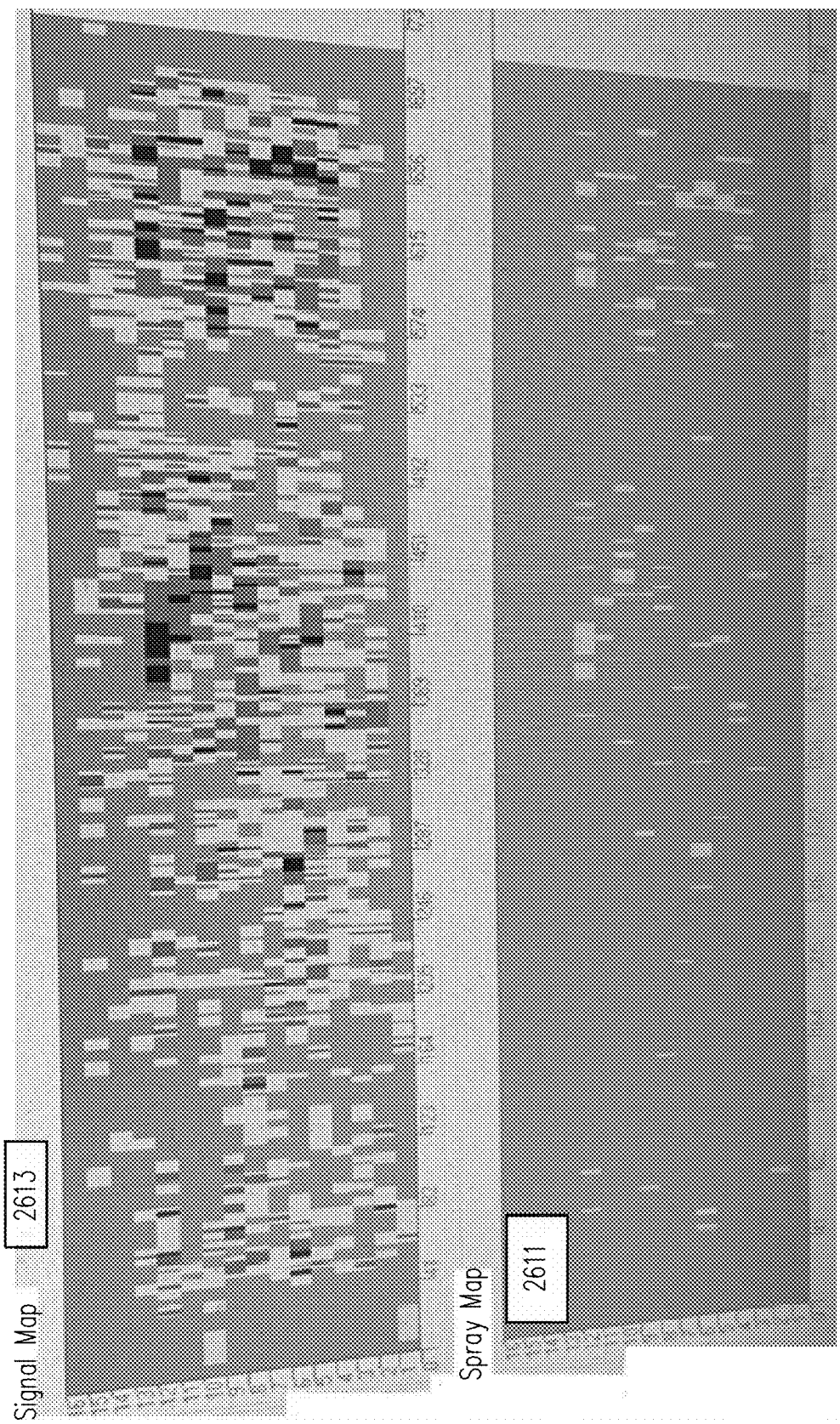
FIG. 26B is a photograph of a structural density analysis report based on the results of processing using one type of wood product panel bond analyzer used in accordance with one embodiment.

FIG. 26B is a photograph of a structural density analysis report 2611 based on the results of processing using one type of wood product panel bond analyzer used in accordance with one embodiment.

As seen in FIG. 26B, in one embodiment, the wood panel exits the press and typically passes through the wood product panel bond analyzer 2601 of FIG. 26A. Typically wood product panel bond analyzer 2601 is configured to analyze and record the reading for each 3"×3" square of the panel as it passes the ultrasonic heads. This size can be configured per customer requirements, with 3" being common in wood products panel manufacturing. For each panel analyzed, the grader prepares a data file and represents it in a visual format. The top image 2613 is typically gray scale and the lower image 2611 being colorized. The customer can define the values required for quality and alert if those thresholds are not met. Numerous combinations of quality and number of adjacent squares can be considered per customer requirements.

Figure 26D:
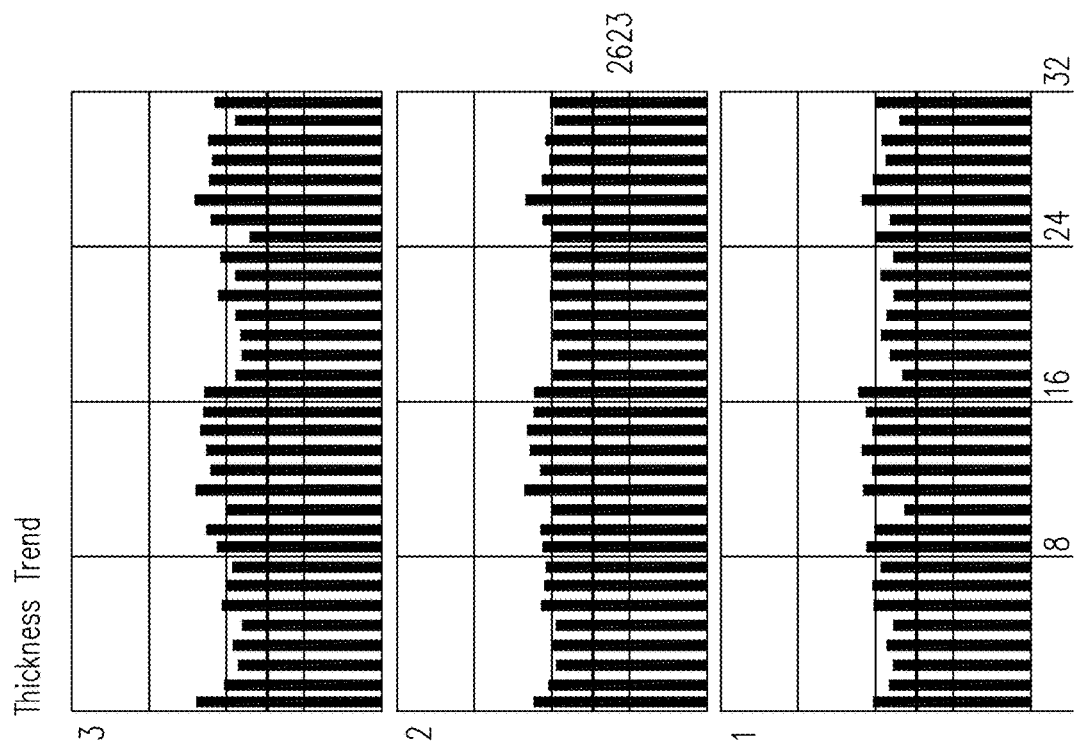
FIG. 26D is a photograph of panel thickness trend analysis report based on the results of processing using one type of wood product panel bond analyzer used in accordance with one embodiment.
Figure 26C:
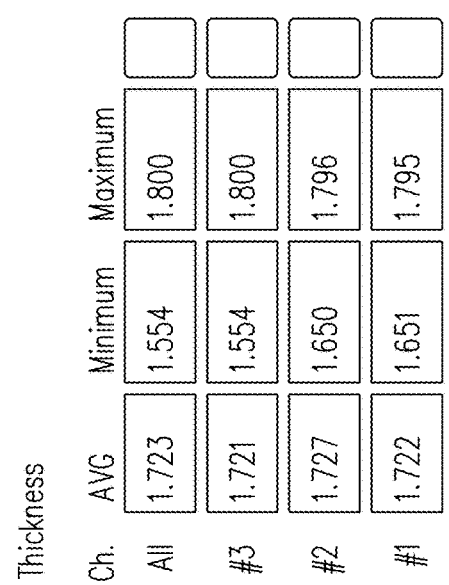
FIG. 26C is a photograph of average panel thickness analysis report based on the results of processing using one type of wood product panel bond analyzer used in accordance with one embodiment.

FIG. 26C is a photograph of average panel thickness analysis report 2621 based on the results of processing using one type of wood product panel bond analyzer used in accordance with one embodiment.

FIG. 26D is a photograph of panel thickness trend analysis report 2623 based on the results of processing using one type of wood product panel bond analyzer used in accordance with one embodiment.

Referring to FIGS. 26C and 26D together, typically each panel is also measured for thickness. Alert points can be configured as to allow alerting when thresholds are exceeded. Panel thickness is often controlled by press pressure and/or press to position instrumentation allowing the press to compress the panel the required amount to produce a completed panel withing selected tolerances.

The pressing and trimming/quality control/shipping process shown in FIG. 25 is virtually identical to the pressing and finishing/quality control/shipping process discussed above with respect to FIG. 3F. Thus, according to one embodiment, once robot panel assembly cell 401A creates green panel stack 360A, green panel stack 360A is processed in the same manner, and using the same equipment, as is used to traditionally process layered wood products. Consequently, existing cold and hot press equipment need not be replaced. Therefore, the use of the disclosed local robotic panel assembly and pressing station 400A results in eliminating the need for hundreds of square feet of floor space, thousands of moving parts, multiple sensors and motors, and dozens of sub-assemblies and human operators of the prior art structure shown in as FIG. 3D and the stack production and processing section 399 of FIG. 3F, while still minimizing the amount of processing equipment that must be replaced.

Referring to FIG. 25, when the individual layered wood panels making up cured layered wood panel product stack 363A are subjected to quality control analysis at panel trim, quality analysis, and shipping area 311, quality parameter data, such as, but not limited to, the data discussed above with respect to FIGS. 4A, 4B, 4C, and 4D, regarding each layered wood panel making up cured layered wood panel product stack 363A is collected.

In various embodiments, this quality parameter data represents results from analysis of specific quality parameters and specific quality parameter values, such as density and thickness as discussed above.

In one embodiment, the specific quality parameters and specific quality parameter values of the quality parameter data obtained from the quality control analysis at panel trim, quality analysis and shipping area 311 is correlated with control signal and production parameter data obtained from robot control system 402 of robot panel assembly cell 401A. In one embodiment, the quality parameter data and control signal and production parameter data are forwarded to quality analysis and feedback cell 2501 for analyzing the quality of cured layered wood product panels. Based on this analysis, the control signals sent from robot control system 402 of robot panel assembly cell 401A to the one or more veneer handling robots, the one or more core handling robots, and the one or more glue application robots is adjusted in order to improve the quality of subsequent cured layered wood product panels.

In one embodiment, the quality analysis and feedback cell 2501 includes an artificial intelligence module (not shown). In one embodiment, the quality analysis and feedback cell 2501 obtains the quality parameter data from the quality analysis of multiple cured layered wood product panels and correlates the quality parameter data associated with each cured layered wood product panel and the control signal and production parameter data associated with the control signals generated by robot control system 402 used to control the one or more veneer handling robots, the one or more glue application robots, and the one or more core handling robots used to produce the cured layered wood product panel.

In one embodiment, the correlated quality data and control signal and production parameter data is then used as training data to generate a trained artificial intelligence module. In one embodiment, the trained artificial intelligence module is then used adjust the control signals used to control the one or more veneer handling robots, the one or more glue application robots, and the one or more core handling robots automatically for subsequent green layered wood product stack production.

Embodiments of the present disclosure provide an effective and efficient technical solution to the long-standing technical problem of providing a method and system for producing layered wood products that is less expensive to operate and more efficient than prior art methods.

In one embodiment, local robotic panel assembly cells including: one or more veneer handling robots; one or more glue application robots; and, in some embodiments, one or more core handling robots, are used to independently produce stacks of layered wood product panels at or near the pressing stations. The local robotic panel assembly cells are used to assemble the stacks at independent static locations local to the pressing stations and as the stacks are required. Consequently, using the disclosed embodiments, the stacks of layered wood product panels are independently built locally at the pressing stations thereby eliminating the need for traditional panel conveyors, traditional layered wood product panel assembly layup lines, and stack press delivery lines. This, in turn, eliminates thousands of moving parts and dozens of people from the layered wood product production process.

The disclosed methods and systems include one or more independently operating local robotic panel assembly and pressing stations that include: a robot panel assembly cell, the robot panel assembly cell producing a stack of green layered wood product panels; a pre-press, the pre-press pressing the stack of green layered wood product panels to produce pre-pressed layered wood product panels; and a hot press, the hot press heating and pressing the pre-pressed layered wood product panels to produce cured layered wood product panels.

In one embodiment, the robot panel assembly cell includes: one or more veneer handling robots, the one or more veneer handling robots retrieving veneer sheets from a stack of veneer sheets and placing the veneer sheets on a green layered wood product panel stack in accordance with received control signals; one or more glue application robots, the one or more glue application robots applying a layer of glue between sheets of veneer in the green layered wood product panel stack in accordance with received control signals; and a robot control system for controlling the one or more veneer handling robots and the one or more glue application robots and directing the one or more veneer handling robots and the one or more glue application robots in the construction of the green layered wood product panel stack via control signals sent to the one or more veneer handling robots and the one or more glue application robots.

In one embodiment, the robot panel assembly cell includes: one or more veneer handling robots, the one or more veneer handling robots retrieving veneer sheets from a stack of veneer sheets and placing the veneer sheets on a green plywood panel stack in accordance with received control signals; one or more core handling robots, the one or more core handling robots retrieving core material from a core material stack and placing the core material on the green plywood panel stack in accordance with received control signals; one or more glue application robots, one or more glue application robots applying a layer of glue between sheets of veneer and core material in the green plywood panel stack in accordance with received control signals; and a robot control system for controlling the one or more veneer handling robots, the one or more core handling robots, and the one or more glue application robots and directing the one or more veneer handling robots, the one or more core handling robots, and the one or more glue application robots in the construction of the green plywood panel stack via control signals sent to the one or more veneer handling robots, the one or more core handling robots, and the one or more glue application robots.

In one embodiment, the robot panel assembly cell includes: one or more veneer handling robots, the one or more veneer handling robots retrieving veneer sheets from a stack of veneer sheets and placing the veneer sheets on a green PLV panel stack in accordance with received control signals; one or more glue application robots, the one or more glue application robots applying a layer of glue between sheets of veneer in the green PLV panel stack in accordance with received control signals; and a robot control system for controlling the one or more veneer handling robots and the one or more glue application robots and directing the one or more veneer handling robots and the one or more glue application robots in the construction of the green PLV panel stack via control signals sent to the one or more veneer handling robots and the one or more glue application robots.

Consequently, using the disclosed embodiments, many of the shortcomings of prior art are minimized or by-passed/resolved. For instance, using the methods and systems for producing layered wood products using local robotic panel assembly cells and vision system analysis disclosed herein there is the no need for traditional panel conveyors, traditional layered wood product panel assembly layup lines, nor stack press delivery lines. Therefore, the large physical size, e.g., hundreds of feet, of factory floor space required by prior art methods and systems are not needed.

In addition, since using the methods and systems for producing layered wood products using local robotic panel assembly cells and vision system analysis disclosed herein there is no need for traditional panel conveyors, traditional layered wood product panel assembly layup lines, nor stack press delivery lines, the thousands of moving parts and sensors required by prior art methods and systems are no longer required nor utilized. This makes the disclosed methods and systems for producing layered wood products much less maintenance intensive.

In addition, since using the methods and systems for producing layered wood products using local robotic panel assembly cells and vision system analysis disclosed herein there is no need for traditional panel conveyors, traditional layered wood product panel assembly layup lines, nor stack press delivery lines, there is no need for the large number of electric motors and substantial power consumption required by prior art methods and systems. This makes the disclosed methods and systems for producing layered wood products less expensive to operate and a less of a drain on the environment.

In addition, since using the methods and systems for producing layered wood products using local robotic panel assembly cells and vision system analysis disclosed herein there is no need for traditional panel conveyors, traditional layered wood product panel assembly layup lines, nor stack press delivery lines, the disclosed methods and systems are less manpower intensive for operation and maintenance. This makes the disclosed methods and systems for producing layered wood products not only less expensive to operate but also less subject to human error and potential injury.

In addition, unlike prior art methods and systems, any failure of any one of the substantially fewer moving parts required by the disclosed methods and systems for producing layered wood products, or any human error introduced, does not result in substantial product waste due to glue degradation, i.e., glue dry out. This is because using the methods and systems for producing layered wood products using local robotic panel assembly cells and vision system analysis disclosed herein the stacks of layered wood product panels are independently built locally at the pressing stations so there is, at most, only one stack that may be lost if there is a failure in the associated pressing station. This means a loss of, at most, forty layered wood product panels, as compared to a potential loss of four hundred or more panels using prior art methods and systems.

In addition, unlike prior art methods and systems, using the methods and systems for producing layered wood products using local robotic panel assembly cells and vision system analysis disclosed herein material and glue systems can be configured to run multiple products at a time, i.e., multiple ply count panel products and/or multiple types of product (plywood or PLV), at a time. This is because using the methods and systems for producing layered wood products using local robotic panel assembly cells and vision system analysis disclosed herein the stacks of layered wood product panels are independently built at the pressing stations. Consequently, each pressing station has its own robot panel assembly cell and each robot panel assembly cell can be directed/controlled by control signals to independently assemble a different product.

In addition, unlike prior art methods and systems, using the methods and systems for producing layered wood products using local robotic panel assembly cells and vision system analysis disclosed herein glue application robots are used to assemble each stack. These glue application robots apply the glue by moving back and forth over the structure, as opposed to having the structure move beneath the glue applicator. Consequently, glue spread rates can be very precisely controlled and it is relatively simple to make fine adjustments to the amount of glue applied to compensate for ambient temperature, line speed changes, etc.

In addition, unlike prior art methods and systems, using the methods and systems for producing layered wood products using local robotic panel assembly cells and vision system analysis disclosed herein the robot panel assembly cells and robot control systems can be used to make a direct correlation between individual panel quality and the assembly process variables used for construction of that specific panel.

In addition, since using the methods and systems for producing layered wood products using local robotic panel assembly cells and vision system analysis disclosed herein there is no need for traditional panel conveyors, traditional layered wood product panel assembly layup lines, nor stack press delivery lines, housekeeping, i.e., keeping the workplace clean and safe, is a much simpler since the assembly locations are static and of relatively small physical size. In addition, since using the methods and systems for producing layered wood products using local robotic panel assembly cells and vision system analysis disclosed herein each robot panel assembly cell can operate a local robot panel assembly and pressing line completely independently of other local robot panel assembly and pressing lines, when keep up is required at one local robot panel assembly and pressing line only that local robot panel assembly and pressing line need to shut down while the other local robot panel assembly and pressing lines continue to operate.

In addition, in one embodiment, the disclosed method and system for producing layered wood products includes a veneer inspection/grading robot and an inspection/grading system which is used to determine the quality of veneer fed into process during feeding operation. Therefore, defects can be detected, and the veneer sheets can be graded before significant time and energy has already been devoted to the panels.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

In addition, the operations shown in the figures, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A local robotic panel assembly and pressing station, the local robotic panel assembly and pressing station comprising:
   a robot panel assembly cell, the robot panel assembly cell producing a stack of green layered wood product panels, the robot panel assembly cell including a vision system for veneer inspection and grading, the vision system for veneer inspection and grading including:
      a first camera to capture a black and white image of an entire surface of a wood product, wherein the first camera has a first field of view, and further wherein the first camera captures a black and white image of the wood product at a first location along a conveyor of a production line, the first location being within the first field of view;
      a second camera to capture a color image of the entire surface of the wood product, wherein the second camera has a second field of view, the second field of view substantially overlapping with the first field of view and further wherein the second camera captures a color image of the wood product at the first location, the first location being within the second field of view; and
      a vision system controller to:
         translate the black and white image from the first camera and the color image from the second camera such that the same portion of the wood product captured by each camera is overlaid in a composite view and the images have the same horizontal spacing;
         perform computer processing of the black and white image to determine one or more of the dimensions of the wood product, the existence of voids within the wood product, and the presence of debris on the wood product;
         perform computer processing of the color image to determine whether colored defects are present in the wood product; and
         assign a grade to the wood product based at least in part on the computer processing of the black and white image and the computer processing of the color image;
   a pre-press, the pre-press pressing the stack of green layered wood product panels to produce pre-pressed layered wood product panels; and
   a hot press, the hot press heating and pressing the pre-pressed layered wood product panels to produce cured layered wood product panels.

2. The local robotic panel assembly and pressing station of claim 1, wherein the first and second cameras of the vision system for veneer inspection and grading are mounted above a conveyor of a production line in a position to capture respective black and white and color images of the wood product at the first location of the wood product along the conveyor.

3. The local robotic panel assembly and pressing station of claim 1, wherein the vision system controller is configured to determine a scaling factor between the wood product and the black and white image based at least in part on known dimensions of a reference image.

4. The local robotic panel assembly and pressing station of claim 1, wherein the vision system controller of the vision system for veneer inspection and grading is configured to auto-rotate the black and white image and the color image such that the black and white image and the color image have the same orientation as a reference image.

5. The local robotic panel assembly and pressing station of claim 1, wherein the vision system controller of the vision system for veneer inspection and grading is configured to translate the black and white image and the color image such that the black and white image and the color image are each oriented to match the orientation of the reference image.

6. The local robotic panel assembly and pressing station of claim 1 wherein the robot panel assembly cell includes:
   one or more veneer inspection and grading robots, the one or more veneer inspection and grading robots retrieving veneer sheets from a stack of veneer sheets and presenting the veneer sheets to the vision system in accordance with received control signals, the vision system inspecting the veneer sheets and assigning a grade to the veneer sheets, the one or more veneer inspection and grading robots then placing the veneer sheets into one of two or more graded veneer stacks according to the grade assigned to the veneer sheets;
   one or more veneer handling robots, the one or more veneer handling robots retrieving veneer sheets from the two or more graded veneer stacks and placing the veneer sheets on a green layered wood product panel stack in accordance with received control signals;
   one or more glue application robots, the one or more glue application robots applying a layer of glue between sheets of veneer in the green layered wood product panel stack in accordance with received control signals; and
   a robot control system for controlling the one or more veneer handling robots and the one or more glue application robots and directing the one or more veneer handling robots and the one or more glue application robots in the construction of the green layered wood product panel stack via control signals sent to the one or more veneer handling robots and the one or more glue application robots.

7. A robot panel assembly cell, the robot panel assembly cell producing a stack of green layered wood product panels, the robot panel assembly cell including:
   a vision system for veneer inspection and grading, the vision system for veneer inspection and grading including:
      a first camera to capture a black and white image of an entire surface of a wood product, wherein the first camera has a first field of view, and further wherein the first camera captures a black and white image of the wood product at a first location along a conveyor of a production line, the first location being within the first field of view;
      a second camera to capture a color image of the entire surface of the wood product, wherein the second camera has a second field of view, the second field of view substantially overlapping with the first field of view and further wherein the second camera captures a color image of the wood product at the first location, the first location being within the second field of view; and
      a vision system controller to:

translate the black and white image from the first camera and the color image from the second camera such that the same portion of the wood product captured by each camera is overlaid in a composite view and the images have the same horizontal spacing;

perform computer processing of the black and white image to determine one or more of the dimensions of the wood product, the existence of voids within the wood product, and the presence of debris on the wood product;

perform computer processing of the color image to determine whether colored defects are present in the wood product; and assign a grade to the wood product based at least in part on the computer processing of the black and white image and the computer processing of the color image;

one or more veneer inspection and grading robots, the one or more veneer inspection and grading robots retrieving veneer sheets from a stack of veneer sheets and presenting the veneer sheets to the vision system in accordance with received control signals, the vision system inspecting the veneer sheets and assigning a grade to the veneer sheets, the one or more veneer inspection and grading robots then placing the veneer sheets into one of two or more graded veneer stacks according to the grade assigned to the veneer sheets;

one or more veneer handling robots, the one or more veneer handling robots retrieving veneer sheets from the two or more graded veneer stacks and placing the veneer sheets on a green layered wood product panel stack in accordance with received control signals;

one or more glue application robots, the one or more glue application robots applying a layer of glue between sheets of veneer in the green layered wood product panel stack in accordance with received control signals; and a robot control system for controlling the one or more veneer handling robots and the one or more glue application robots and directing the one or more veneer handling robots and the one or more glue application robots in the construction of the green layered wood product panel stack via control signals sent to the one or more veneer handling robots and the one or more glue application robots.

8. The robot panel assembly cell of claim 7, wherein the first and second cameras are mounted above a conveyor of a production line in a position to capture respective black and white and color images of the wood product at the first location of the wood product along the conveyor.

9. The robot panel assembly cell of claim 7, wherein the controller is configured to determine a scaling factor between the wood product and the black and white image based at least in part on known dimensions of a reference image.

10. The robot panel assembly cell of claim 7, wherein the controller is configured to auto rotate the black and white image and the color image such that the black and white image and the color image have the same orientation as a reference image.

11. The robot panel assembly cell of claim 7, wherein the controller is configured to translate the black and white image and the color image such that the black and white image and the color image are each oriented to match the orientation of the reference image.

12. A local robotic panel assembly and pressing station, the local robotic panel assembly and pressing station comprising:

a robot panel assembly cell, the robot panel assembly cell producing a stack of green layered wood product panels;

a vision system for veneer inspection and grading the robot panel assembly cell including one or more veneer inspection and grading robots, the one or more veneer inspection and grading robots retrieving veneer sheets from a stack of veneer sheets and presenting the veneer sheets to the vision system in accordance with received control signals, the vision system inspecting the veneer sheets and assigning a grade to the veneer sheets, the one or more veneer inspection and grading robots then placing the veneer sheets into one of two or more graded veneer stacks according to the grade assigned to the veneer sheets, the vision system for veneer inspection and grading including:

a first camera to capture a black and white image of an entire surface of a wood product, wherein the first camera has a first field of view, and further wherein the first camera captures a black and white image of the wood product at a first location along a conveyor of a production line, the first location being within the first field of view;

a second camera to capture a color image of the entire surface of the wood product, wherein the second camera has a second field of view, the second field of view substantially overlapping with the first field of view and further wherein the second camera captures a color image of the wood product at the first location, the first location being within the second field of view; and a vision system controller to:

translate the black and white image from the first camera and the color image from the second camera such that the same portion of the wood product captured by each camera is overlaid in a composite view and the images have the same horizontal spacing;

perform computer processing of the black and white image to determine one or more of the dimensions of the wood product, the existence of voids within the wood product, and the presence of debris on the wood product;

perform computer processing of the color image to determine whether colored defects are present in the wood product; and assign a grade to the wood product based at least in part on the computer processing of the black and white image and the computer processing of the color image;

one or more veneer handling robots, the one or more veneer handling robots retrieving veneer sheets from the two or more graded veneer stacks and placing the veneer sheets on a green layered wood product panel stack in accordance with received control signals;

one or more glue application robots, the one or more glue application robots applying a layer of glue between sheets of veneer in the green layered wood product panel stack in accordance with received control signals;

a robot control system for controlling the one or more veneer handling robots and the one or more glue application robots and directing the one or more veneer handling robots and the one or more glue application robots in the construction of the green layered wood product panel stack via control signals sent to the one or more veneer handling robots and the one or more glue application robots;

a pre-press, the pre-press pressing the stack of green layered wood product panels to produce pre-pressed layered wood product panels;

a hot press, the hot press heating and pressing the pre-pressed layered wood product panels to produce cured layered wood product panels; and a quality analysis and feedback cell, the quality analysis and feedback cell for analyzing the quality of cured layered wood product panels and adjusting the control signals sent to the one or more veneer inspection and grading robots, the one or more veneer handling robots, and the one or more glue application robots in response to the quality analysis in order to improve the quality of subsequent cured plywood panels.

13. The local robotic panel assembly and pressing station of claim 12 wherein the first and second cameras are mounted above a conveyor of a production line in a position to capture respective black and white and color images of the wood product at the first location of the wood product along the conveyor.

14. The local robotic panel assembly and pressing station of claim 12, wherein the vision system controller is configured to determine a scaling factor between the wood product and the black and white image based at least in part on known dimensions of a reference image.

15. The local robotic panel assembly and pressing station of claim 12, wherein the vision system controller is configured to auto rotate the black and white image and the color image such that the black and white image and the color image have the same orientation as a reference image.

16. The local robotic panel assembly and pressing station of claim 12, wherein the vision system controller is configured to translate the black and white image and the color image such that the black and white image and the color image are each oriented to match the orientation of the reference image.

* * * * *